(12) United States Patent
Jung et al.

(10) Patent No.: US 12,120,669 B2
(45) Date of Patent: Oct. 15, 2024

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Byounghoon Jung, Suwon-si (KR); Sangyeob Jung, Suwon-si (KR); Anil Agiwal, Suwon-si (KR); Jaehyuk Jang, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 17/278,235

(22) PCT Filed: Sep. 4, 2019

(86) PCT No.: PCT/KR2019/011372
§ 371 (c)(1),
(2) Date: Mar. 19, 2021

(87) PCT Pub. No.: WO2020/060075
PCT Pub. Date: Mar. 26, 2020

(65) Prior Publication Data
US 2021/0352689 A1  Nov. 11, 2021

(30) Foreign Application Priority Data

Sep. 21, 2018 (KR) .......... 10-2018-0114387
Jan. 25, 2019 (KR) .......... 10-2019-0010071

(51) Int. Cl.
*H04L 1/00* (2006.01)
*H04L 1/1867* (2023.01)
(Continued)

(52) U.S. Cl.
CPC ....... *H04W 72/1268* (2013.01); *H04W 72/23* (2023.01); *H04W 74/0833* (2013.01)

(58) Field of Classification Search
CPC ............. H04W 72/1268; H04W 72/23; H04W 74/0833; H04W 8/24; H04W 16/28;
(Continued)

(56) References Cited
U.S. PATENT DOCUMENTS

2017/0215207 A1* 7/2017 Yi .......................... H04W 28/20
2018/0263048 A1  9/2018 Ingale et al.
(Continued)

FOREIGN PATENT DOCUMENTS

CN         107666722 A  *  2/2018 ............ H04W 48/16
KR   10-2018-0084579 A      7/2018
(Continued)

OTHER PUBLICATIONS

Request for Submission of an Opinion dated Oct. 7, 2022, in connection with Korean Application No. 10-2018-0114387, 8 pages.
(Continued)

*Primary Examiner* — Joseph E Dean, Jr.

(57) ABSTRACT

Provided are a method and apparatus for transmitting and receiving data in a wireless communication system. A method of performing, by a terminal, random access includes: obtaining physical random access channel (PRACH) resource allocation information for the random access; transmitting a random access preamble, based on the PRACH resource allocation information; receiving a random access response (RAR) based on the random access preamble; and transmitting Msg3, which is a radio resource control (RRC) layer message, a plurality of times based on uplink resource allocation information included in the RAR.

14 Claims, 21 Drawing Sheets

(51) Int. Cl.
*H04W 72/1268* (2023.01)
*H04W 72/23* (2023.01)
*H04W 74/0833* (2024.01)

(58) Field of Classification Search
CPC .... H04W 24/10; H04L 1/0003; H04L 1/0009; H04L 1/08; H04L 1/1893
See application file for complete search history.

(56) References Cited

U.S. PATENT DOCUMENTS

| | | | |
|---|---|---|---|
| 2018/0368189 A1* | 12/2018 | Narasimha | ......... H04W 56/001 |
| 2019/0223157 A1 | 7/2019 | Hwang et al. | |
| 2021/0120463 A1 | 4/2021 | Kim et al. | |

FOREIGN PATENT DOCUMENTS

| | | |
|---|---|---|
| WO | 2010126245 A2 | 11/2010 |
| WO | 2017222327 A1 | 12/2017 |
| WO | 2018/194338 A1 | 10/2018 |

OTHER PUBLICATIONS

Written Decision on Registration dated Apr. 3, 2023, in connection with Korean Application No. 10-2018-0114387, 11 pages.
Written Opinion of the International Searching Authority dated Dec. 12, 2019 in connection with International Patent Application No. PCT/KR2019/011372, 7 pages.
International Search Report and Written Opinion of the International Searching Authority in connection with International Application No. PCT/KR2019/011372 dated Dec. 12, 2019, 10 pages.
Ericsson, "Remaining Details of RACH Procedure," R1-1806425, 3GPP TSG-RAN WG1 Meeting #93, Busan, Korea, May 21-25, 2018, 10 pages.
Ericsson, "Support of quality report in Msg3 in LTE-MTC," Tdoc R1-1808038, 3GPP TSG-RAN WG1 Meeting #94, Goteborg, Sweden, Aug. 20-24, 2018, 5 pages.
3GPP TS 38.133 V15.2.0 (Jun. 2018), Technical Specification, 3rd Generation Partnership Project; Technical Specification Group Radio Access Network; NR; Requirements for support of radio resource management (Release 15), Jun. 2018, 79 pages.
3GPP TS 38.213 V15.2.0 (Jun. 2018), Technical Specification, 3rd Generation Partnership Project; Technical Specification Group Radio Access Network; NR; Physical layer procedures for control (Release 15), Jun. 2018, 99 pages.
Notice of Non-Final Rejection dated Apr. 1, 2022, in connection with Korean Application No. 10-2018-0114387, 7 pages.

* cited by examiner

METHOD AND APPARATUS FOR TRANSMITTING AND RECEIVING DATA IN WIRELESS COMMUNICATION SYSTEM

CROSS-REFERENCE TO RELATED APPLICATIONS

This application is a 371 National Stage of International Application No. PCT/KR2019/011372, filed Sep. 4, 2019, which claims priority to Korean Patent Application No. 10-2018-0114387, filed Sep. 21, 2018, and Korean Patent Application No. 10-2019-0010071, filed Jan. 25, 2019, the disclosures of which are herein incorporated by reference in their entirety.

BACKGROUND

1. Field

The present disclosure relates to wireless communication systems, and in particular, to methods and apparatuses for smoothly providing services in wireless communication systems. More particularly, the present disclosure relates to methods and apparatuses for transmitting and receiving data in wireless communication systems.

2. Description of Related Art

To meet increasing demand with respect to wireless data traffic after the commercialization of $4^{th}$ generation (4G) communication systems, efforts have been made to develop 5th generation (5G) or pre-5G communication systems. For this reason, 5G or pre-5G communication systems are called 'beyond 4G network' communication systems or 'post Long Term Evolution (post-LTE)' systems. A 5G communication system defined in the 3GPP is called a new radio (NR) system. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas have been studied and applied to the NR system. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communications such as sensor networks, M2M communication, and MTC are being implemented by using various schemes such as beamforming, MIMO, and array antennas. Application of cloud RAN as the above-described big data processing technology may be an example of convergence of 5G communication technology and IoT technology.

As various services may be provided according to the foregoing and the development of mobile communication systems, methods for effectively providing such services are required.

SUMMARY

Described embodiments provide apparatuses and methods capable of effectively providing services in mobile communication systems.

According to an embodiment of the disclosure, a method of performing, by a terminal, random access includes: obtaining physical random access channel (PRACH) resource allocation information for the random access; transmitting a random access preamble based on the PRACH resource allocation information; receiving a random access response (RAR) based on the random access preamble; and transmitting Msg3, which is a radio resource control (RRC) layer message, a plurality of times based on uplink resource allocation information included in the RAR.

The method may further include receiving at least one synchronization signal block (SSB), wherein the PRACH resource allocation information may include information of resources for transmitting the random access preamble in a PRACH occasion indicated by at least one of the at least one SSB.

The PRACH occasion may correspond to at least one PRACH slot on which a resource is allocated to transmit the Msg3 a plurality of times, from among a plurality of PRACH slots.

The PRACH resource allocation information may include information of resources for transmitting the random access preamble in a PRACH occasion indicated by an SSB having a signal strength equal to or greater than a preconfigured threshold value, among the at least one SSB.

The RAR may include modulation and coding scheme (MCS) information, the transmitting of the Msg3 the plurality of times may include modulating and coding the Msg3 based on the MCS information, and the modulated and coded Msg3 may be transmitted a plurality of times based on the uplink resource allocation information.

A method of allocating, by a base station, a resource for random access may include: transmitting physical random access channel (PRACH) resource allocation information for the random access; receiving a random access preamble based on the PRACH resource allocation information; transmitting a random access response (RAR) based on the random access preamble; and receiving Msg3, which is a radio resource control (RRC) layer message, a plurality of times based on uplink resource allocation information included in the RAR.

The PRACH resource allocation information may include information of resources for receiving the random access preamble in a PRACH occasion that corresponds to at least one PRACH slot on which a resource is allocated to transmit the Msg3 a plurality of times, from among a plurality of PRACH slots.

A terminal performing random access may include: a transceiver; and at least one processor connected to the transceiver, wherein the at least one processor is configured to obtain physical random access channel (PRACH) resource allocation information for the random access, transmit a random access preamble based on the PRACH resource allocation information, receive a random access response (RAR) based on the random access preamble, and transmit Msg3 a plurality of times based on uplink resource allocation information included in the RAR.

The at least one processor may be further configured to receive at least one synchronization signal block (SSB), and the PRACH resource allocation information may include information of resources for transmitting the random access preamble in a PRACH occasion indicated by at least one of the at least one SSB.

The PRACH occasion may correspond to at least one PRACH slot on which a resource is allocated to transmit the Msg3 a plurality of times, from among a plurality of PRACH slots.

The PRACH resource allocation information may include information of resources for transmitting the random access preamble in a PRACH occasion indicated by an SSB having a signal strength equal to or greater than a preconfigured threshold value, among the at least one SSB.

The RAR may include modulation and coding scheme (MCS) information, and the at least one processor may be further configured to modulate and code the Msg3 based on the MCS information and transmit the modulated and coded Msg3 a plurality of times based on the uplink resource allocation information.

A base station allocating a resource for random access may include: a transceiver; and at least one processor connected to the transceiver, wherein the at least one processor is configured to transmit physical random access channel (PRACH) resource allocation information for the random access, receive a random access preamble based on the PRACH resource allocation information, transmit a random access response (RAR) based on the random access preamble, and receive Msg3 a plurality of times based on uplink resource allocation information included in the RAR.

The PRACH resource allocation information may include information of resources for receiving the random access preamble in a PRACH occasion that corresponds to at least one PRACH slot on which a resource is allocated to transmit the Msg3 a plurality of times, from among a plurality of PRACH slots.

Also, according to an embodiment of the disclosure, a computer-readable recording medium stores therein a program for executing the above method, on a computer.

DETAILED DESCRIPTION

Figure 1:
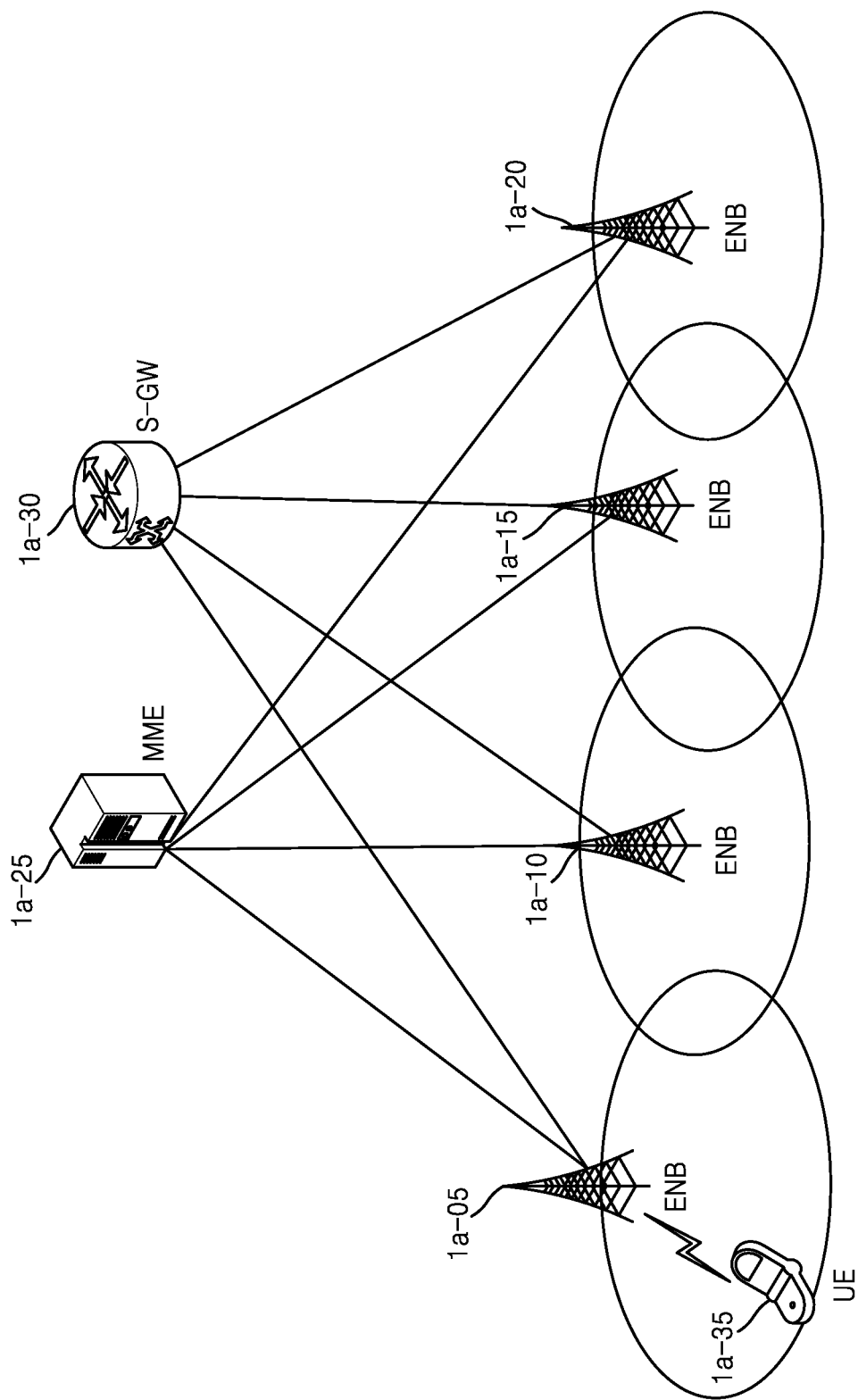
FIG. 1 is a diagram illustrating a structure of a long term evolution (LTE) system according to an embodiment.

According to an embodiment of the disclosure, a method of performing, by a terminal, random access includes: obtaining physical random access channel (PRACH) resource allocation information for the random access; transmitting a random access preamble based on the PRACH resource allocation information; receiving a random access response (RAR) based on the random access preamble; and transmitting Msg3, which is a radio resource control (RRC) layer message, a plurality of times based on uplink resource allocation information included in the RAR.

Also, the method may further include receiving at least one synchronization signal block (SSB), wherein the PRACH resource allocation information may include information of resources for transmitting the random access preamble in a PRACH occasion indicated by at least one of the at least one SSB.

The PRACH occasion may correspond to at least one PRACH slot on which a resource is allocated to transmit the Msg3 a plurality of times, from among a plurality of PRACH slots.

The PRACH resource allocation information may include information of resources for transmitting the random access preamble in a PRACH occasion indicated by an SSB having a signal strength equal to or greater than a preconfigured threshold value, among the at least one SSB.

The RAR may include modulation and coding scheme (MCS) information, the transmitting of the Msg3 the plurality of times may include modulating and coding the Msg3 based on the MCS information, and the modulated and coded Msg3 may be transmitted a plurality of times based on the uplink resource allocation information.

According to an embodiment of the disclosure, a method of allocating, by a base station, a resource for random access includes: transmitting physical random access channel (PRACH) resource allocation information for the random access; receiving a random access preamble based on the PRACH resource allocation information; transmitting a random access response (RAR) based on the random access preamble; and receiving Msg3, which is a radio resource control (RRC) layer message, a plurality of times based on uplink resource allocation information included in the RAR.

The PRACH resource allocation information may include information of resources for receiving the random access preamble in a PRACH occasion that corresponds to at least one PRACH slot on which a resource is allocated to transmit the Msg3 a plurality of times, from among a plurality of PRACH slots.

According to an embodiment of the disclosure, a terminal performing random access includes: a transceiver; and at least one processor connected to the transceiver, wherein the at least one processor is configured to obtain physical random access channel (PRACH) resource allocation information for the random access, transmit a random access preamble based on the PRACH resource allocation information, receive a random access response (RAR) based on the random access preamble, and transmit Msg3 a plurality of times based on uplink resource allocation information included in the RAR.

The at least one processor may be further configured to receive at least one synchronization signal block (SSB), and the PRACH resource allocation information may include information of resources for transmitting the random access preamble in a PRACH occasion indicated by at least one of the at least one SSB.

The PRACH occasion may correspond to at least one PRACH slot on which a resource is allocated to transmit the Msg3 a plurality of times, from among a plurality of PRACH slots.

The PRACH resource allocation information may include information of resources for transmitting the random access preamble in a PRACH occasion indicated by an SSB having a signal strength equal to or greater than a preconfigured threshold value, among the at least one SSB.

The RAR may include modulation and coding scheme (MCS) information, and the at least one processor may be further configured to modulate and code the Msg3 based on the MCS information and transmit the modulated and coded Msg3 a plurality of times based on the uplink resource allocation information.

According to an embodiment of the disclosure, a base station allocating a resource for random access includes: a transceiver; and at least one processor connected to the transceiver, wherein the at least one processor is configured to transmit physical random access channel (PRACH) resource allocation information for the random access, receive a random access preamble based on the PRACH resource allocation information, transmit a random access response (RAR) based on the random access preamble, and receive Msg3 a plurality of times based on uplink resource allocation information included in the RAR.

The PRACH resource allocation information may include information of resources for receiving the random access preamble in a PRACH occasion that corresponds to at least one PRACH slot on which a resource is allocated to transmit the Msg3 a plurality of times, from among a plurality of PRACH slots.

According to an embodiment of the disclosure, a computer-readable recording medium stores a program that, when executed by a computer, performs the above method.

Hereinafter, embodiments of the disclosure will be described in detail with reference to the accompanying drawings. In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the disclosure and the accomplishing methods thereof will become apparent from the embodiments of the disclosure described below in detail with reference to the accompanying drawings. The disclosure may, however, be embodied in many different forms and should not be construed as being limited to the embodiments of the disclosure described below; rather, the present embodiments are provided to complete the disclosure and fully convey the scope of the disclosure to those of ordinary skill in the art and the disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "~ unit" used in the present embodiments may refer to a software component or a hardware component such as a field programmable gate array (FPGA) or an application specific integrated circuit (ASIC) and the "~ unit" may perform certain functions. However, the "~ unit" is not-limited to software or hardware. The "~ unit" may be configured to be in an addressable storage medium or may be configured to operate one or more processors. Thus, as an example, the "~ unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "~ units" or may be further divided into additional components and "~ units". In addition, the components and "~ units" may be implemented to operate one or more central processing units (CPUs) in a device or a security multimedia card. Also, in embodiments, the "~ unit" may include one or more processors.

In the disclosure, the downlink (DL) may refer to a wireless transmission path of a signal transmitted from the base station to the terminal, and the uplink (UL) may refer to a wireless transmission path of a signal transmitted from the terminal to the base station. Also, hereinafter, a Long Term Evolution (LTE) or LTE-A system may be described as an example; however, embodiments of the disclosure may also be applied to other communication systems having similar technical backgrounds or channel types. For example, $5^{th}$ generation mobile communication technology (5G) (or new radio (NR)) developed after LTE-A may be included in systems to which embodiments of the disclosure may be applied, and the following 5G may be a concept including the existing LTE, LTE-A, and other similar services. Also, the disclosure may also be applied to other communication systems through some modifications without departing from the scope of the disclosure by the judgment of those of ordinary skill in the art.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

In the following description, terms and names defined in the $3^{rd}$ Generation Partnership Project Long Term Evolution (3GPP LTE) standards may be used for convenience of description. However, the disclosure is not limited to those terms and names and may also be similarly applied to systems according to other standards.

Hereinafter, the base station may be an agent performing terminal resource allocation and may be at least one of a gNode B (gNB), an eNode (eNB) B, a Node B (NB), a base station (BS), a radio access unit, a base station controller, or a node on a network. Examples of the terminal may include a user equipment (UE), a mobile station (MS), a cellular phone, a smartphone, a computer, or a multimedia system capable of performing a communication function. However, the disclosure is not limited thereto.

Particularly, the disclosure may be applied to 3GPP NR (5G mobile communication standards). Also, the disclosure may be applied to intelligent services (e.g., smart home, smart building, smart city, smart car or connected car, health care, digital education, retailing, security, and safety services) based on 5G communication technology and IoT technology. In the disclosure, eNB may be used interchangeably with gNB for convenience of description. That is, a base station described as an eNB may represent a gNB. Also, the term "terminal" may refer to other wireless communication devices in addition to mobile phones, NB-IoT devices, and sensors.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), and LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The uplink may refer to a radio link for transmitting data or a control signal from a terminal (e.g., a user equipment (UE) or a mobile station (MS)) to a base station (e.g., an eNode B (eNB) or a base station (BS)), and the downlink may refer to a radio link for transmitting data or a control signal from the base station to the terminal. The above-described multiple access schemes identify data or control information of different users by allocating time-frequency resources for carrying the data or control information of the users not to overlap each other, that is, to achieve orthogonality therebetween.

As post-LTE systems, 5G systems may have to support services capable of simultaneously satisfying various requirements because they may have to freely reflect various requirements of users, service providers, and the like. Services considered for the 5G systems may include enhanced mobile broadband (eMBB), massive machine-type communication (mMTC), and ultra-reliability low-latency communication (URLLC) services.

According to an embodiment of the disclosure, the eMBB may aim to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system may have to provide an increased user-perceived data rate of a terminal while providing a peak data rate. In order to satisfy this requirement, the 5G communication system may require the improvement of various transmission/reception technologies including a more improved Multi Input Multi Output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as Internet of Thing (IoT) in 5G communication systems. In order to efficiently provide the IoT, the mMTC may require the support for access of large terminals in a cell, improved terminal coverage, improved battery time, reduced terminal cost, and the like. Because the IoT is attached to various sensors and various devices to provide a communication function, it should be able to support a large number of terminals (e.g., 1,000,000 terminals/km$^2$) in a cell. Also, because a terminal supporting the mMTC is likely to be located in a shadow area failing to be covered by the cell, such as the basement of a building, due to the characteristics of the service, it may require wider coverage than other services provided by the 5G communication systems. The terminal supporting the mMTC should be configured as a low-cost terminal and may require a very long battery life time of about 10 years to about 15 years because it is difficult to frequently replace the battery of the terminal.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting the URLLC should satisfy an air interface latency of less than 0.5 milliseconds and simultaneously may have a requirement for a packet error rate of $10^{-5}$ or less. Thus, for the service supporting the URLLC, the 5G system should provide a smaller transmit time interval (TTI) than other services and simultaneously may have a design requirement for allocating wide resources in frequency bands in order to secure the reliability of communication links.

The above three services of eMBB, URLLC, and mMTC considered in the 5G communication systems may be multiplexed and transmitted in one system. In this case, different transmission/reception techniques and transmission/reception parameters may be used between services in order to satisfy different requirements of the respective services. However, the above-described mMTC, URLLC, and eMBB are merely examples of different service types, and the service types to which the disclosure is applied are not limited thereto.

Also, although embodiments of the disclosure will be described below by using an LTE, LTE-A, LTE Pro, or 5G (or NR, next-generation mobile communication) as an example, the embodiments of the disclosure may also be applied to other communication systems having similar technical backgrounds or channel forms. Also, embodiments of the disclosure may also be applied to other communication systems through some modifications without materially departing from the scope of the disclosure by the judgment of those of ordinary skill in the art.

In the following description of the disclosure, detailed descriptions of well-known functions or configurations will be omitted because they would unnecessarily obscure the subject matters of the disclosure. Hereinafter, embodiments of the disclosure will be described with reference to the accompanying drawings.

FIG. 1 is a diagram illustrating a structure of an LTE system according to an embodiment.

Referring to FIG. 1, a radio access network of the LTE system may include next-generation base stations (e.g., evolved Node Bs (eNBs), Node Bs (NBs), or base stations (BSs)) 1a-05, 1a-10, 1a-15, and 1a-20, a mobility management entity (MME) 1a-25, and a serving-gateway (S-GW) 1a-30. A user terminal (e.g., a user equipment (UE) or a terminal) 1a-35 may access an external network through the eNBs 1a-05 to 1a-20 and the S-GW 1a-30.

In FIG. 1, the eNBs 1a-05 to 1a-20 may correspond to the existing Node Bs of a Universal Mobile Telecommunication System (UMTS) system. The eNB may be connected to the UE 1a-35 through a radio channel and may perform a more complex function than the existing Node B. In the LTE system, all user traffic including real-time services such as Voice over IP (VoIP) through the Internet protocol may be serviced on a shared channel. Thus, a device for collecting and scheduling state information such as the buffer states of UEs, available transmission power states, and channel states may be required, which may be performed by the eNBs 1a-05 to 1a-20. One eNB may generally control a plurality of cells. For example, in order to implement a transmission rate of 100 Mbps, the LTE system may use Orthogonal Frequency Division Multiplexing (OFDM) as a radio access technology in a 20 MHz bandwidth. Also, an adaptive modulation & coding (AMC) scheme may be applied to determine a modulation scheme and a channel coding rate according to the channel state of a terminal. The S-GW 1a-30 may be an apparatus for providing a data bearer and may generate or remove a data bearer under the control of the MME 1a-25. The MME 1a-25 may be an apparatus for performing various control functions as well as a mobility management function for a terminal and may be connected to a plurality of base stations.

Figure 2:
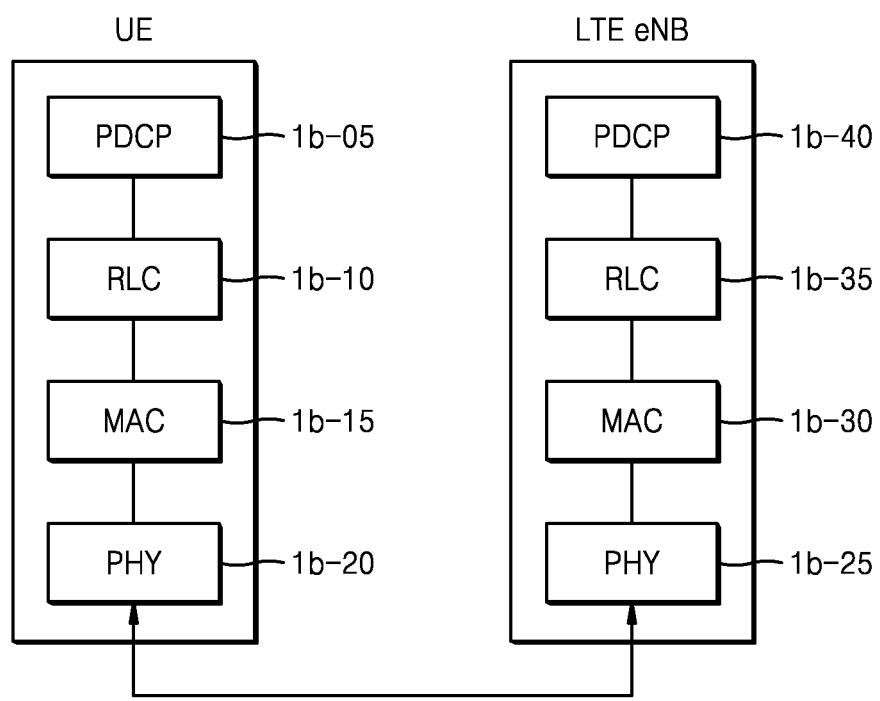
FIG. 2 is a diagram illustrating a radio protocol architecture in an LTE system to which an embodiment is applied.

FIG. 2 is a diagram illustrating a radio protocol architecture in an LTE system to which an embodiment is applied.

Referring to FIG. 2, the radio protocol of the LTE system may include Packet Data Convergence Protocol (PDCP) 1b-05 and 1b-40, Radio Link Control (RLC) 1b-10 and 1b-35, and Medium Access Control (MAC) 1b-15 and 1b-30 in each of a terminal and an eNB. The PDCP may perform operations such as IP header compression/decompression. The main functions of the PDCP may be summarized as follows.

Header compression and decompression function (Header compression and decompression: ROHC only)
    User data transmission function (Transfer of user data)
    Sequential transmission function (In-sequence delivery of upper layer PDUs at PDCP re-establishment procedure for RLC Acknowledged Mode (AM))
    Reordering function (For split bearers in DC (only support for RLC AM): PDCP PDU routing for transmission and PDCP PDU reordering for reception)
    Duplicate detection function (Duplicate detection of lower layer SDUs at PDCP re-establishment procedure for RLC AM)
    Retransmission function (Retransmission of PDCP SDUs at handover and, for split bearers in DC, of PDCP PDUs at PDCP data-recovery procedure, for RLC AM)
    Ciphering and deciphering function (Ciphering and deciphering)
    Timer-based SDU discard function (Timer-based SDU discard in uplink)

The RLC 1b-10 and 1b-35 may reconfigure a PDCP packet data unit (PDU) in a suitable size to perform an automatic repeat request (ARQ) operation or the like. The main functions of the RLC may be summarized as follows.

Data transmission function (Transfer of upper layer PDUs)
    ARQ function (Error Correction through ARQ (only for AM data transfer))
    Concatenation, segmentation, and reassembly function (Concatenation, segmentation, and reassembly of RLC SDUs (only for UM and AM data transfer))
    Re-segmentation function (Re-segmentation of RLC data PDUs (only for AM data transfer))
    Reordering function (Reordering of RLC data PDUs (only for UM and AM data transfer))
    Duplicate detection function (Duplicate detection (only for UM and AM data transfer))
    Error detection function (Protocol error detection (only for AM data transfer))
    RLC SDU discard function (RLC SDU discard (only for UM and AM data transfer))
    RLC re-establishment function (RLC re-establishment)

The MAC 1b-15 and 1b-30 may be connected to several RLC entities configured in one terminal and may perform an operation of multiplexing RLC PDUs into MAC PDUs and demultiplexing RLC PDUs from MAC PDUs. The main functions of the MAC may be summarized as follows.

Mapping function (Mapping between logical channels and transport channels)
    Multiplexing and demultiplexing function (Multiplexing/demultiplexing of MAC SDUs belonging to one or different logical channels into/from transport blocks (TB) delivered to/from the physical layer on transport channels)
    Scheduling information report function (Scheduling information reporting)
    HARQ function (Error correction through hybrid automatic repeat request (HARQ))
    Priority handling function between logical channels (Priority handling between logical channels of one UE)
    Priority handling function between terminals (Priority handling between UEs by means of dynamic scheduling)
    MBMS service identification function (MBMS service identification)
    Transport format selection function (Transport format selection)
    Padding function (Padding)

Physical (PHY) layers 1b-20 and 1b-25 may channel-code and modulate upper layer data, generate OFDM symbols, and transmit the same through radio channels or may demodulate and channel-decode OFDM symbols received through radio channels and transmit the result thereof to the upper layer.

Figure 3:
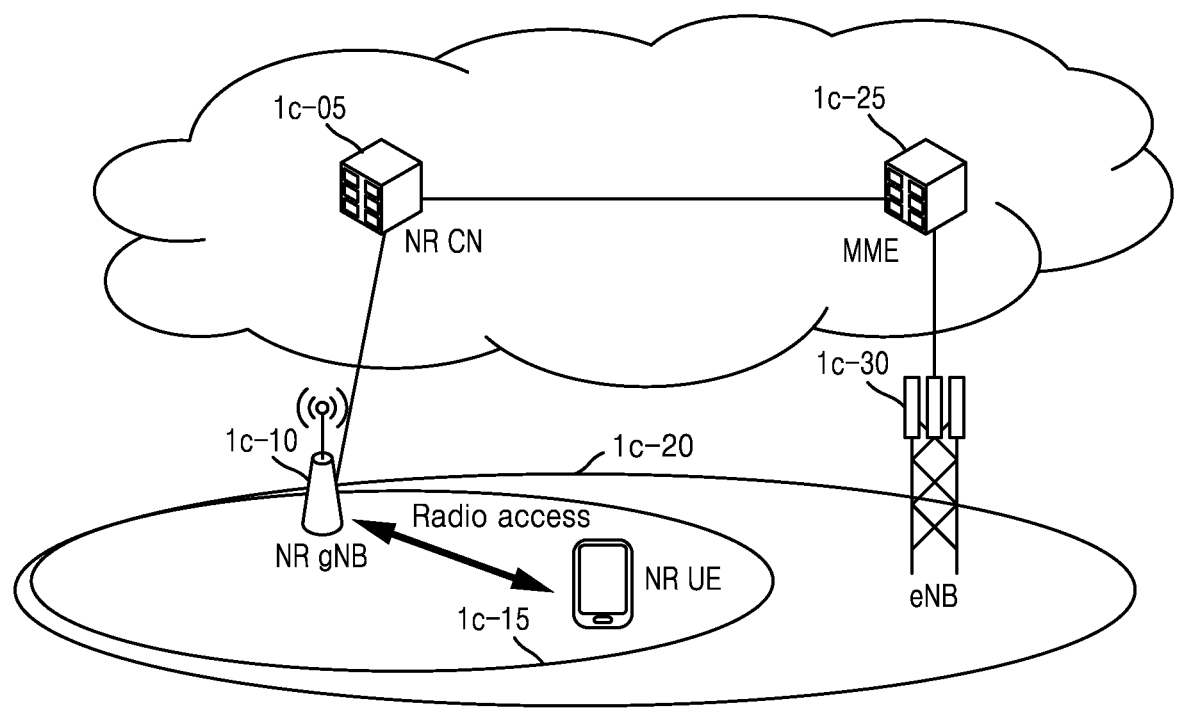
FIG. 3 is a diagram illustrating a structure of a next-generation mobile communication system to which an embodiment is applied.

FIG. 3 is a diagram illustrating a structure of a next-generation mobile communication system to which an embodiment is applied.

Referring to FIG. 3, a radio access network of the next-generation mobile communication system (hereinafter NR or 5G) may include a next-generation base station (new radio Node B) (hereinafter NR gNB or NR base station) 1c-10 and a next-generation radio core network (new radio core network (NR CN)) 1c-05. A next-generation radio user terminal (new radio user equipment (NR UE) or terminal) 1c-15 may access an external network through the NR gNB 1c-10 and the NR CN 1c-05.

In FIG. 3, the NR gNB 1c-10 may correspond to an evolved Node B (eNB) of the existing LTE system. The NR gNB 1c-10 may be connected to the NR UE 1c-15 through a radio channel and may provide a better service than the existing Node B. In the next-generation mobile communication system, all user traffic may be serviced on a shared channel. Thus, a device for collecting and scheduling state information such as the buffer states of UEs, available transmission power states, and channel states may be required, which may be performed by the NR gNB 1c-10. One NR gNB 1c-10 may control a plurality of cells. In the next-generation mobile communication system, a bandwidth larger than or equal to the current maximum bandwidth may be applied to implement ultra-high-speed data transmission compared to the current LTE. Also, a beamforming technology may be additionally combined by using Orthogonal Frequency Division Multiplexing (OFDM) as a radio access technology. Also, an adaptive modulation & coding (AMC) scheme may be applied to determine a modulation scheme and a channel coding rate according to the channel state of a terminal.

The NR CN 1c-05 may perform functions such as mobility support, bearer configuration, and Quality of Service (QoS) configuration. The NR CN 1c-05 may be an apparatus for performing various control functions as well as a mobility management function for a terminal and may be connected to a plurality of base stations. Also, the next-generation mobile communication system may also be linked with the existing LTE system, and the NR CN 1c-05 may be connected to an MME 1c-25 through a network interface. The MME 1c-25 may be connected to an eNB 1c-30 that is an existing base station.

Figure 4:
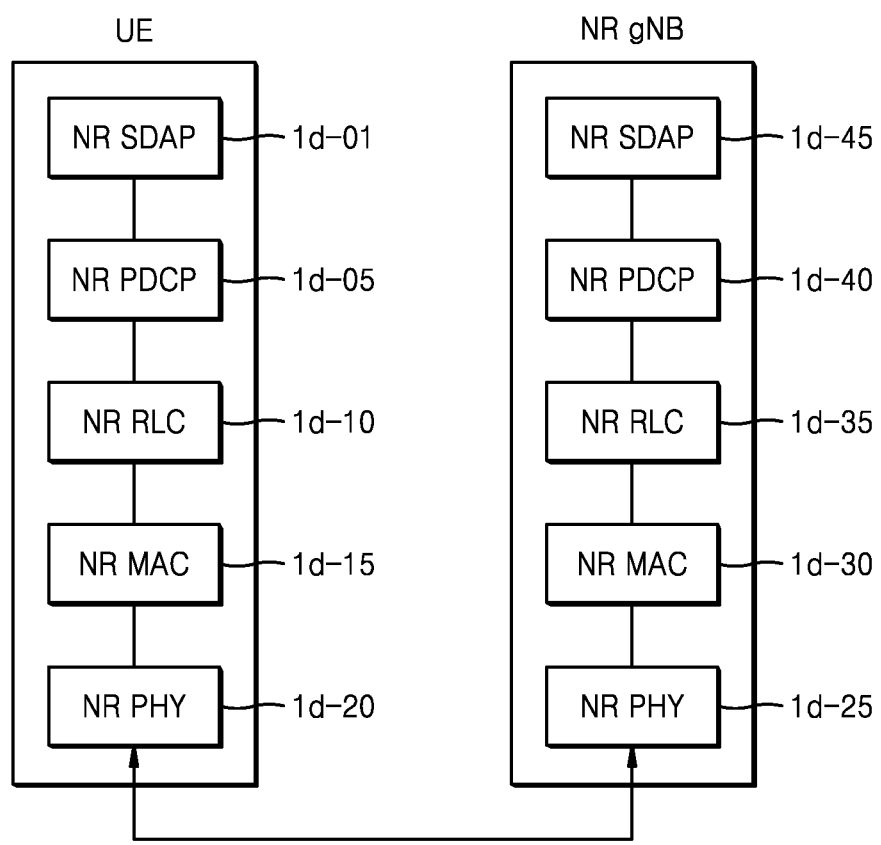
FIG. 4 is a diagram illustrating a radio protocol architecture of a next-generation mobile communication system to which an embodiment is applied.

FIG. 4 is a diagram illustrating a radio protocol architecture of a next-generation mobile communication system to which an embodiment is applied.

Referring to FIG. 4, the radio protocol of the next-generation mobile communication system may include NR Service Data Adaptation Protocol (SDAP) 1d-01 and 1d-45, NR PDCP 1d-05 and 1d-40, NR RLC 1d-10 and 1d-35, and NR MAC 1d-15 and 1d-30 in each of a terminal and an NR base station.

The main functions of the NR SDAP 1d-01 and 1d-45 may include some of the following functions.

User data transmission function (Transfer of user plane data)

Function of mapping between QoS flow and data bearer for uplink and downlink (Mapping between a QoS flow and a DRB for both DL and UL)

Function of marking QoS flow ID for uplink and downlink (Marking QoS flow ID in both DL and UL packets)

Function of mapping reflective QoS flow to data bearer for uplink SDAP PDUs (Reflective QoS flow to DRB mapping for the UL SDAP PDUs)

As for an SDAP entity, the terminal may be configured with a Radio Resource Control (RRC) message for each PDCP entity, for each bearer, or for each logical channel whether to use a header of the SDAP entity or whether to use a function of the SDAP entity. When an SDAP header is configured, a 1-bit non-access stratum (NAS) reflective Quality of Service (QoS) (NAS reflective QoS) configuration indicator and a 1-bit access stratum (AS) reflective QoS (AS reflective QoS) configuration indicator of the SDAP header may indicate the terminal to update or reconfigure mapping information between a QoS flow and a data bearer for the uplink and the downlink. The SDAP header may include QoS flow ID information representing the QoS. The QoS information may be used as data processing priority and scheduling information or the like to support a smooth service.

The main functions of the NR PDCP 1d-05 and 1d-40 may include some of the following functions.

Header compression and decompression function (Header compression and decompression: ROHC only)

User data transmission function (Transfer of user data)

Sequential transmission function (In-sequence delivery of upper layer PDUs)

Non-sequential transmission function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

In the above, the reordering function of the NR PDCP entity may mean a function of reordering the PDCP PDUs received from the lower layer in order based on a PDCP sequence number (SN). The reordering function of the NR PDCP entity may include at least one of a function of transmitting data to the upper layer in the reordered order, a function of directly transmitting data without considering the order, a function of rearranging the order and recording the missing PDCP PDUs, a function of reporting the state of the missing PDCP PDUs to the transmitting side, and a function of requesting retransmission of the missing PDCP PDUs.

The main functions of the NR RLC 1d-10 and 1d-35 may include some of the following functions.

Data transmission function (Transfer of upper layer PDUs)

Sequential transmission function (In-sequence delivery of upper layer PDUs)

Non-sequential transmission function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

In the above, the sequential transmission (in-sequence delivery) function of the NR RLC entity may mean a function of sequentially transmitting the RLC SDUs received from the lower layer to the upper layer. When one original RLC SDU is divided into multiple RLC SDUs and then received, the sequential transmission (in-sequence delivery) function of the NR RLC entity may include a function of reassembling and then transmitting the same.

The sequential transmission (in-sequence delivery) function of the NR RLC entity may include a function of rearranging the received RLC PDUs based on the RLC sequence number (SN) or the PDCP sequence number (SN) and may include at least one of a function of rearranging the order and recording the missing RLC PDUs, a function of reporting the state of the missing RLC PDUs to the transmitting side, and a function of requesting retransmission of the missing RLC PDUs.

The sequential transmission (in-sequence delivery) function of the NR RLC entity may include a function of sequentially transmitting, when there is a missing RLC SDU, only the RLC SDUs up to before the missing RLC SDU to the upper layer. Also, the sequential transmission (in-sequence delivery) function of the NR RLC entity may include a function of sequentially transmitting all RLC SDUs received before the start of a timer to the upper layer, when a certain timer has expired even when there is a missing RLC SDU. Also, the sequential transmission (in-sequence delivery) function of the NR RLC entity may include a function of sequentially transmitting all RLC SDUs received up to now to the upper layer, when a certain timer has expired even when there is a missing RLC SDU.

The NR RLC entity may process the RLC PDUs in the order of reception regardless of the sequence number (out-of-sequence delivery) and transmit the same to the NR PDCP entity.

In the case of receiving segments, the NR RLC entity may receive segments stored in a buffer or to be received, reconfigure the segments into a single RLC PDU, and then transmit the same to the NR PDCP entity.

The NR RLC layer may not include the concatenation function, and this function may be performed in the NR MAC layer or may be replaced with the multiplexing function of the NR MAC layer.

In the above, the non-sequential transmission (out-of-sequence delivery) function of the NR RLC entity may mean a function of directly transmitting the RLC SDUs received from the lower layer to the upper layer regardless of the order thereof. When one original RLC SDU is divided into multiple RLC SDUs and then received, the non-sequential transmission (out-of-sequence delivery) function of the NR RLC entity may include a function of reassembling and then transmitting the same. The non-sequential transmission (out-of-sequence delivery) function of the NR RLC entity may include a function of storing the RLC SN or PDCP SN of the received RLC PDUs, arranging the order thereof, and recording the missing RLC PDUs.

The NR MAC 1d-15 and 1d-30 may be connected to multiple NR RLC entities configured in one terminal, and the main functions of the NR MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

NR PHY layers 1d-20 and 1d-25 may channel-code and modulate upper layer data, generate OFDM symbols, and transmit the same on radio channels or may demodulate and channel-decode OFDM symbols received on radio channels and transmit the results thereof to the upper layer.

Also, the NR PHY layer may also use an HARQ for additional error correction, and a receiving end may transmit information about whether the packet transmitted by a transmitting end is received, in 1 bit. This may be referred to as HARQ acknowledgement (ACK)/non-acknowledgement (NACK) information. In the case of LTE, downlink HARQ ACK/NACK information for uplink data transmission may be transmitted through a physical hybrid-ARQ indicator channel (PHICH) physical channel. Also, in the case of NR, downlink HARQ ACK/NACK information for uplink data transmission may be used to determine, through the scheduling information of the terminal, whether retransmission or new transmission is to be performed through a physical dedicated control channel (PDCCH) that is a channel through which downlink/uplink resource allocation or the like is transmitted. This may be because an asynchronous HARQ is applied in the NR. Uplink HARQ ACK/NACK information for downlink data transmission may be transmitted through a physical uplink control channel (PUCCH) or physical uplink shared channel (PUSCH) physical channel. The above PUCCH may be generally transmitted in the uplink of a PCell described below; however, when it is supported by a terminal, it may be additionally transmitted to the terminal in a SCell described below, which may be referred to as a PUCCH SCell.

Moreover, the above NR PHY layer may include one frequency/carrier or a plurality of frequencies/carriers, and a technology of simultaneously configuring and using a plurality of frequencies will be referred to as carrier aggregation (CA). The CA may be a technology that may significantly increase the transmission amount by the number of secondary carriers by using one primary carrier and one secondary carrier or a plurality of secondary carriers instead of using only one carrier for communication between a terminal (or UE) and a base station (or E-UTRAN Node B or eNB). Moreover, in the LTE, a cell in a base station using a primary carrier may be referred to as a main cell or a primary cell (PCell), and a cell in a base station using a secondary carrier may be referred to as a subcell or a secondary cell (SCell).

Figure 5:
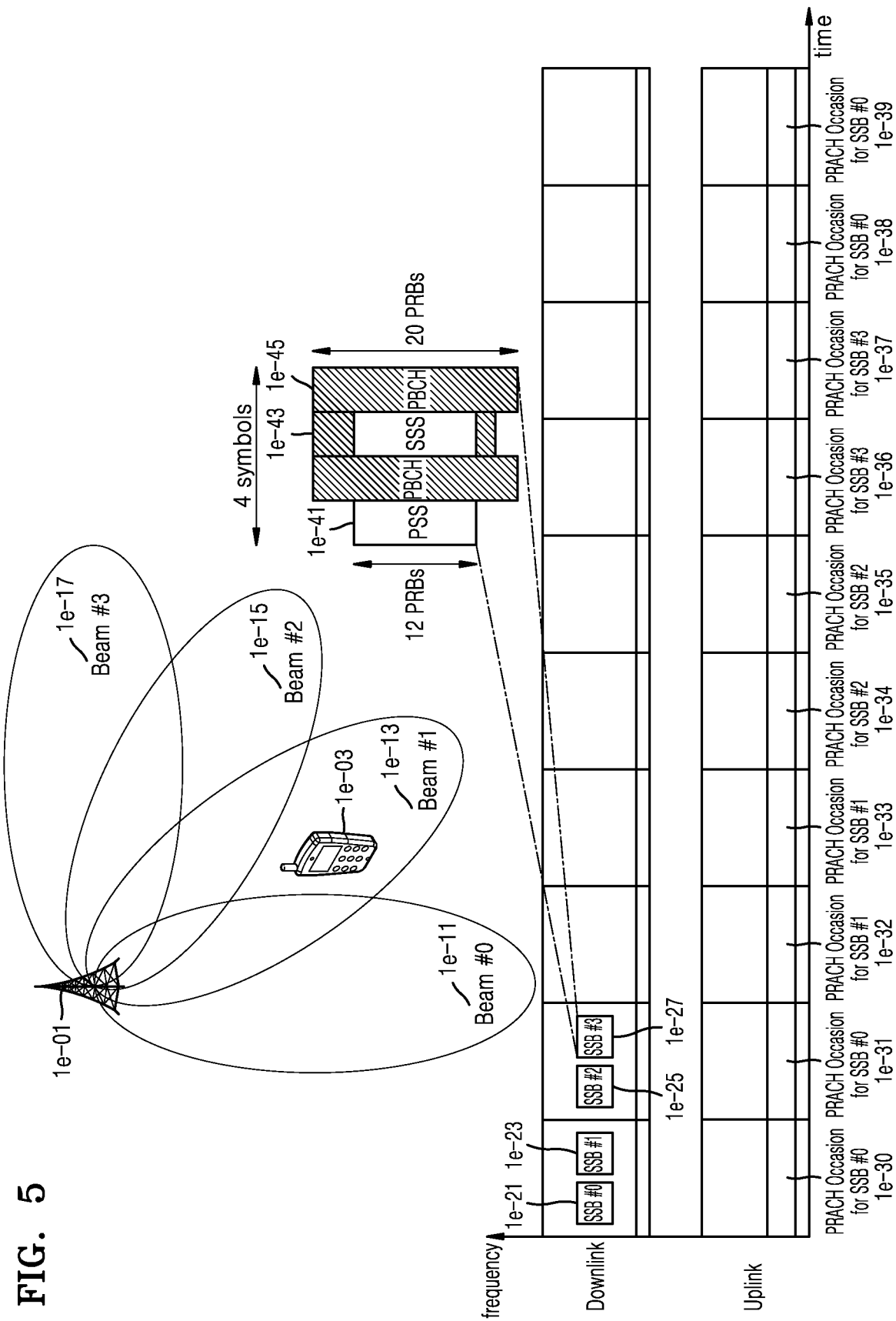
FIG. 5 is a diagram illustrating a downlink and uplink channel frame structure of a next-generation mobile communication system to which an embodiment is applied.

FIG. 5 is a diagram illustrating a downlink and uplink channel frame structure of a next-generation mobile communication system to which an embodiment is applied. More particularly, FIG. 5 is a diagram illustrating a downlink and uplink channel frame structure when communication is performed based on beams in a next-generation mobile communication system to which an embodiment of the disclosure is applied.

Referring to FIG. 5, a base station 1e-01 may transmit signals in the form of beams in order to transmit wider-coverage or stronger signals (1e-11, 1e-13, 1e-15, and 1e-17). Accordingly, a terminal 1e-03 in a cell may have to transmit and receive data by using a particular beam (e.g., beam #1 (1e-13) in the present drawing) transmitted by the base station.

Moreover, depending on whether the terminal is connected to the base station 1e-01, the state of the terminal may be divided into an RRC idle mode, an RRC inactive mode, and an RRC connected mode. Accordingly, the base station 1e-01 may not be able to know the position of the terminal in the RRC idle mode or the RRC inactive mode.

When the terminal in the RRC idle mode or the RRC inactive mode is to transition to the RRC connected mode, the terminal may receive synchronization signal blocks (SSBs) 1e-21, 1e-23, 1e-25, and 1e-27 transmitted by the base station 1e-01. The SSB may be an SSB signal periodically transmitted according to a period configured by the base station 1e-01. The base station 1e-01 may configure the period of the SSB through system information (e.g., SIB1 and SIB2) or dedicated RRC message signaling. Each SSB may be divided into a primary synchronization signal (PSS) 1e-41, a secondary synchronization signal (SSS) 1e-43, and a physical broadcast channel (PBCH) 1e-45.

In FIG. 5, as an example, a scenario in which an SSB is transmitted for each beam is assumed. For example, a case where SSB #0 (1e-21) is transmitted by using beam #0 (1e-11), SSB #1 (1e-23) is transmitted by using beam #1 (1e-13), SSB #2 (1e-25) is transmitted by using beam #2 (1e-15), and SSB #3 (1e-27) is transmitted by using beam #3 (1e-17) is assumed. However, the disclosure is not limited thereto and may also be applied to various other scenarios.

In FIG. 5, as an example, a situation in which the terminal 1e-03 in the RRC idle mode or the RRC inactive mode is located in beam #1 (1e-13) is assumed, and accordingly, the terminal 1e-03 may receive SSB #1 (1e-23) transmitted in beam #1 (1e-13). Upon receiving SSB #1 (1e-23), the terminal may obtain a physical cell identifier (PCI) of the base station through the PSS and the SSS. Also, by receiving the PBCH, the terminal may determine not only an identifier (i.e., #1) of the currently received SSB and at which position in a 10 ms frame the current SSB is received but also at which system frame number (SFN) in an SFN having a period of 10.24 seconds it is.

Also, a master information block (MIB) may be included in the above PBCH, and the MIB may indicate at which position system information block type 1 (SIB1) for broadcasting more detailed cell configuration information may be received. Upon receiving the SIB1, the terminal may know the total number of SSBs transmitted by the base station and may determine a physical random access channel (PRACH) occasion capable of transmitting a preamble that is a physical signal specially designed for uplink synchronization.

In FIG. 5, a scenario in which PRACH occasions 1e-30 to 1e-39 are allocated every 1 ms is assumed. In addition, based on the above information, the terminal may detect which PRACH occasion among the PRACH occasions is mapped to which SSB index. For example, in FIG. 5, a scenario in which a PRACH occasion is allocated every 1 ms is assumed, and a scenario in which ½ SSB is allocated per PRACH occasion (i.e., 2 PRACH occasions per SSB) is assumed. Accordingly, in FIG. 5, a scenario in which two PRACH occasions are allocated for each SSB from the start of a PRACH occasion started according to an SFN value is illustrated.

That is, as an example, the PRACH occasions 1*e*-30 and 1*e*-31 may be allocated for SSB #0, the PRACH occasions 1*e*-32 and 1*e*-33 may be allocated for SSB #1, the PRACH occasions 1*e*-34 and 1*e*-35 may be allocated for SSB #2, and the PRACH occasions 1*e*-36 and 1*e*-37 may be allocated for SSB #3. After the PRACH occasions are allocated for all the SSBs, the PRACH occasions 1*e*-38 and 1*e*-39 may be allocated for the first SSB.

Accordingly, the terminal may recognize the position of the PRACH occasions 1*e*-32 and 1*e*-33 for SSB #1 and may transmit a random access preamble as the earliest PRACH occasion (e.g., 1*e*-32) at the current point among the PRACH occasions 1*e*-32 and 1*e*-33 corresponding to SSB #1. Because the base station has received the preamble in the PRACH occasion 1*e*-32, the base station may detect that the terminal has transmitted the preamble by selecting SSB #1, and accordingly, data may be transmitted and received through the corresponding beam when subsequent random access is performed.

Figure 6:
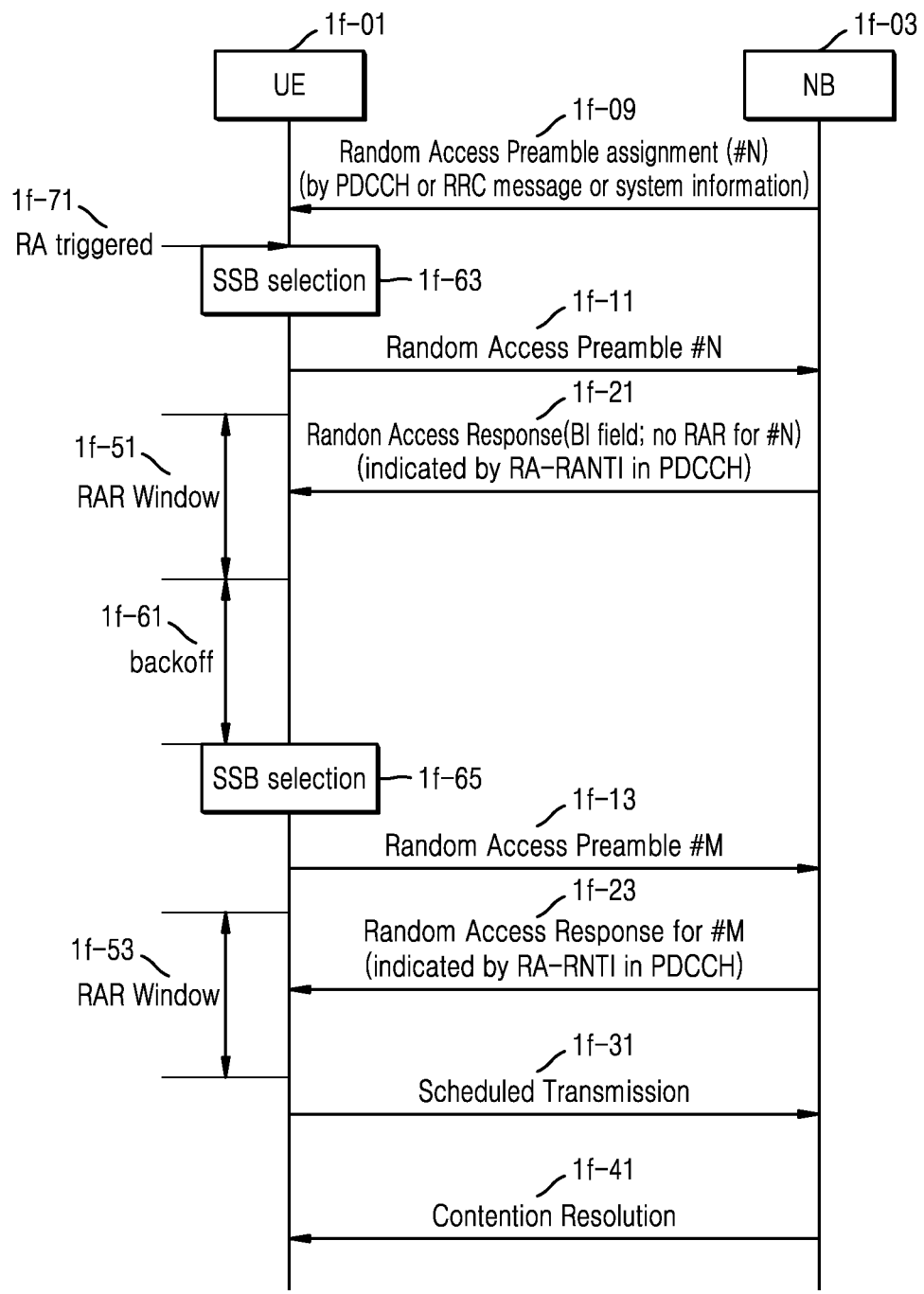
FIG. 6 is a diagram for describing a procedure of repeatedly transmitting Message 3 (Msg3) when a terminal performs random access to a base station in a next-generation mobile communication system to which an embodiment is applied.

FIG. 6 is a diagram for describing a procedure of repeatedly transmitting Message 3 (Msg3) when a terminal performs random access to a base station in a next-generation mobile communication system to which an embodiment is applied. More particularly, FIG. 6 is a diagram for describing a procedure of repeatedly transmitting Msg3 when a terminal in an RRC idle mode or an RRC inactive mode performs random access to a base station in a next-generation mobile communication system, according to an embodiment of the disclosure.

In the present drawing, a contention-based random access procedure will be mainly described. Moreover, in a contention-free random access procedure, in order for a base station (NB) 1*f*-03 to get a terminal (UE) 1*f*-01 to perform contention-free random access, in operation 1*f*-09, a procedure of allocating a dedicated random access resource may be performed.

In embodiments of the disclosure, when the terminal in the RRC idle mode or the RRC inactive mode performs random access, the base station may include, in system information (e.g., MIB1, SIB1, and SIB2), an indicator or information element for requesting to repeatedly transmit a random access preamble or an indicator or information element for requesting to repeatedly transmit Msg3. When there is the above indicator or information element, the terminal may repeatedly transmit a random access preamble or may repeatedly transmit Msg3 (TTI bundling, uplink bundling repetition). Also, in embodiments of the disclosure, the base station may allocate a separate dedicated random access resource for repeatedly transmitting Msg3 when the terminal in the RRC idle mode or the RRC inactive mode performs random access. In embodiments, information about a proposed separate dedicated random access resource may include one or more of the following.

1. Separate dedicated PRACH occasions (separate/dedicated PRACH occasions for transmission of Msg3 during random access)
2. A particular preamble index (ra-PreambleIndex for transmission of Msg3 during random access)
3. A new or dedicated random access preamble group (new or dedicated random access preamble group for transmission of Msg3 during random access)
4. A PRACH resource on a particular time/frequency for repeatedly transmitting Msg3 when performing random access
5. An information element (IE) indicating how many times a random access preamble may be repeatedly transmitted or an indicator indicating whether a random access preamble may be repeatedly transmitted a fixed number of times The base station may allocate information about the proposed separate dedicated random access resource to the terminal through a PDCCH, transmit the same through a message of an RRC layer, or broadcast the same through system information. Accordingly, when there is the above separate dedicated random access resource allocated from the base station for the random access procedure currently performed by the terminal in the RRC idle mode or the RRC inactive mode, the terminal may transmit a random access preamble through the random access resource. In embodiments of the disclosure, the terminal in the RRC idle mode or the RRC inactive mode may repeatedly transmit a random access preamble through the random access resource. The above embodiments may be similarly applied to a contention-based random access procedure described below. In the contention-free random access, when there is the above preamble transmitted by the terminal in an RAR message described below, it may be determined that the random access has been successfully completed and the random access procedure may be ended.

Hereinafter, a contention-based random access procedure will be described.

First, in operation 1*f*-71, the terminal 1*f*-01 in the RRC idle mode or the RRC inactive mode may trigger random access (RA) for access to the base station 1*f*-03.

When the random access is triggered, in operation 1*f*-63, the terminal 1*f*-01 may first determine through which beam data transmission/reception including the random access should be performed as described with reference to FIG. 5 and may select an SSB accordingly. An SSB selecting method according to the present embodiment may be one of the following.

1. Among the received SSBs, the terminal may randomly select one of the SSBs having a signal strength exceeding a certain threshold configured by the base station with the above system information or the message of the RRC layer.
2. Among the received SSBs, the terminal may select an SSB having the greatest signal strength among the SSBs having a signal strength exceeding a certain threshold configured by the base station with the above system information or the message of the RRC layer.
3. Among the received SSBs, the terminal may randomly select one of the SSBs or may select an SSB having the greatest signal strength among the SSBs, which have a signal strength exceeding a certain threshold configured by the base station with the above system information or the message of the RRC layer and match one SSB index or a plurality of SSB indexes separately indicated to repeatedly transmit Msg3.

For example, in FIG. 5, the terminal may receive all of SSB #0, SSB #1, and SSB #2; however, when only the signal strength of SSB #1 exceeds the above threshold and the signal strength of SSB #0 and SSB #2 does not exceed the above threshold, the terminal may select SSB #1. In embodiments described with reference to FIG. 6, the base station may transmit, to the terminal, system information (e.g., MIB1, SIB1, and SIB2) or a message of an RRC layer (e.g., an RRCRelease message, an RRCReconfiguration message, or an RRCReestablishment message) including a separate threshold for repeatedly transmitting Msg3. In this case, the base station may indicate the above information or message as a value of Reference Signal Received Power (RSRP) of SSB or RSRP of Channel State Information-Reference Signal (CSI-RS) like rsrp-thresholdSSB or rsrp-ThresholdCSI-RS.

When the SSB is selected as described above, the terminal 1f-01 may know a separate dedicated PRACH occasion for repeatedly transmitting Msg3 mapped to the selected SSB. Accordingly, in operation 1f-11, the terminal 1f-01 may transmit a random access preamble to the base station in the PRACH occasion. In embodiments, the operation of operation 1f-11 may include one or more of the following.

1. One random access preamble may be transmitted in a separate dedicated PRACH occasion.
2. When the system information includes an information element (IE) indicating how many times a random access preamble may be repeatedly transmitted or an indicator indicating whether a random access preamble may be repeatedly transmitted a fixed number of times, a random access preamble may be transmitted in a separate dedicated PRACH occasion based on the information.
3. When a new or separate random access preamble group is configured from the system information, one random access preamble may be transmitted in the random access preamble group.

Under the above condition, a case where one or more terminals simultaneously transmit a random access preamble in a PRACH occasion may also occur. The PRACH resource may span one subframe, or only some symbols in one subframe may be used. Also, the random access preamble may include a plurality of preamble identifiers (indexes) according to a particular sequence standard specially designed to enable reception even when transmitted before being completely synchronized with the base station. When there are a plurality of preamble identifiers, the preamble transmitted by the terminal may be randomly selected by the terminal or may be a particular preamble designated by the base station.

Moreover, when the terminal already in the connected mode performs random access, when the base station has configured a particular signal to be measured, a process of selecting the above SSB may include an operation of selecting a PRACH occasion based on the particular signal to be measured, instead of the above SSB. The above particular signal to be measured may be an SSB or a channel state information reference signal (CSI-RS). For example, in the case of performing a handover to another base station due to the movement of the terminal or the like, a handover command may be used to select a PRACH occasion mapped to the SSB or CSI-RS of a target base station, and accordingly, the terminal may measure the configured signal to determine in which PRACH occasion the random access preamble is to be transmitted.

When the base station receives the above preamble (or the preamble transmitted by another terminal), in operation 1f-21, the base station 1f-03 may transmit a random access response (RAR) message thereof to the terminal 1f-01. In embodiments described with reference to FIG. 6, the time point at which the base station 1f-03 transmits the RAR message to the terminal 1f-01 may be one of the following.

1. When the first preamble is received, a random access response message thereof may be transmitted to the terminal.
2. When the last preamble is received, a random access response message thereof may be transmitted to the terminal.
3. When any preamble is received, a random access response message thereof may be transmitted to the terminal.

The RAR message may include at least one of identifier information of the preamble used in operation 1f-11, uplink transmission timing correction information, uplink resource allocation information to be used in a later operation (e.g., operation 1f-31), and temporary terminal identifier information. For example, when a plurality of terminals transmit different preambles to attempt random access in operation 1f-1l, the identifier information of the preamble may be transmitted to indicate to which preamble the RAR message is a response message. The uplink resource allocation information may be detailed information of the resource to be used by the terminal 1f-01 to repeatedly transmit Msg3 in operation 1f-31 described below, and may include the physical position and size of the resource, a decoding and coding method (a modulation and coding scheme (MCS)) used for transmission, power adjustment information for transmission, and the like.

Also, the base station 1f-03 may include, in the RAR message, a 1-bit indicator for the terminal 1f-01 to repeatedly transmit Msg3, together with the uplink resource allocation information to be used by the terminal 1f-01 to repeatedly transmit Msg3. Also, the base station 1f-03 may transmit the RAR message including a value indicating how many times Msg3 may be repeatedly transmitted by the terminal.

When the terminal having transmitted the preamble performs initial access, because the terminal does not have the identifier allocated by the base station for communication with the base station 1f-03, the temporary terminal identifier information may be a value transmitted for use in this case.

Moreover, for example, based on the energy amount of the received PRACH or the number of preambles received through the PRACH for a certain time, when it is determined that the number of preambles received through the PRACH for a certain time is equal to or greater than a certain number, the base station 1f-03 may determine that there are too many terminals performing random access. In this case, the base station 1f-03 may receive a subheader including backoff indicator information in the RAR message. The subheader may be located at the first portion of the RAR message. The backoff indicator may have a size of 4 bits and may have the following values.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |

TABLE 1-continued

| Index | Backoff Parameter value (ms) |
|---|---|
| 12 | 960 |
| 13 | 1920 |
| 14 | Reserved |
| 15 | Reserved |

When the terminal fails to receive a response to the transmitted preamble within an 'RAR window' (1f-51) period and receives only the backoff indicator information, the terminal may select a random number between 0 and the received value in preamble retransmission to delay the preamble retransmission time by the selected time (1f-61).

The RAR message should be transmitted within a certain period starting from a certain time after transmitting the above preamble, and the certain period will be referred to as an 'RAR window' (1f-51, 1f-53). In embodiments described with reference to FIG. 6, the start point of the RAR window may be as follows.

1. The RAR window may start from a time point at which a certain time elapses after the first preamble is transmitted.
2. The RAR window may start from a time point at which a certain time elapses after the last preamble is transmitted.
3. The RAR window may start from a time point at which a certain time elapses after each preamble is transmitted.

The certain time may have a subframe unit (2 ms) or a smaller value. Also, the length of the RAR window may be a certain value configured by the base station for each PRACH resource or for each PRACH resource set in the system information broadcast by the base station. Also, the start point of the RAR window may be included in the system information broadcast by the base station.

Moreover, when the RAR message is transmitted, the base station may schedule the RAR message through the PDCCH and the scheduling information thereof may be scrambled by using a random access-radio network temporary identifier (RA-RNTI). The RA-RNTI may be mapped to the PRACH resource used to transmit a message in operation 1f-11. The terminal having transmitted a preamble in a particular PRACH resource may attempt to receive a PDCCH based on the RA-RNTI to determine whether there is a corresponding RAR message. That is, when the RAR message is a response to the preamble transmitted in operation 1f-11 by the terminal as illustrated in FIG. 6, the RA-RNTI used in the RAR message scheduling information may include information about the transmission in operation 1f-11. For this purpose, the RA-RNTI may be calculated as the following equation:

$$\text{RA-RNTI}=1+s\_id+14\times t\_id+14\times 80\times f\_id+14\times 80\times 8\times \text{ul\_carrier\_id} \quad \text{[Equation 1]}$$

In Equation 1, s_id may be an index corresponding to the first OFDM symbol in which transmission of the preamble transmitted in operation 1f-11 is started, and may have a value of $0 \le s\_id < 14$ (i.e., a maximum number of OFDM symbols in one slot). Also, t_id may be an index corresponding to the first slot in which transmission of the preamble transmitted in operation 1f-11 is started, and may have a value of $0 \le t\_id < 80$ (i.e., a maximum number of slots in one system frame (20 ms)). Also, f_id may indicate which ordinal number of PRACH resource the preamble transmitted in operation 1f-11 is transmitted on frequency, and may have a value of $0 \le f\_id < 8$ (i.e., a maximum number of PRACHs on the frequency within the same time). Also, ul_carrier_id may be, when two carriers are used in the uplink for one cell, a factor for identifying whether the preamble is transmitted in a normal uplink (NUL) (0 in this case) or whether the preamble is transmitted in a supplementary uplink (SUL) (1 in this case).

In FIG. 6, a scenario is assumed in which the terminal receives the RAR message with the RA-RNTI corresponding to the preamble transmission in operation 1f-11 but the identifier corresponding to the transmitted preamble is not included. That is, for example, the terminal may transmit preamble #7 among a total of 64 preamble identifiers but the RAR message received from the base station may include only a response to preamble #4. Accordingly, as described above, when there is a BI value received in preamble retransmission, the terminal may delay the same by a value randomly selected from the corresponding value (1f-61). Also, in order to retransmit the preamble, in operation 1f-65, the terminal may select the SSB again at the corresponding time point.

In operation 1f-13, the terminal may retransmit the preamble in a PRACH occasion corresponding to the selected SSB. Also, the terminal may wait for a response thereto in operation 1f-53 and receive the same in operation 1f-23. When there are many terminals performing random access, the preamble transmission may be distributed in time as described above and thus the random access success probability may be increased.

In addition, when the terminal retransmits the preamble in operation 1f-13, the preamble may be retransmitted with the transmission power increased from the previous preamble transmission power in operation 1f-11 by the corresponding power according to a value (preamblePowerRampingStep) configured from the base station (power ramping). Accordingly, as the number of retransmissions increases, the transmission power may continue to increase until the maximum transmission power of the terminal is reached, and thus the probability of the signal reaching the base station may be increased.

In operation 1f-31, the terminal having receiving the RAR message with respect to the transmitted preamble may transmit other messages according to the above various purposes in the resources allocated to the RAR message. Referring to FIG. 6, the third transmitted message may be referred to as Msg3 (i.e., the preamble of operation 1f-11 or 1f-13 may be referred to as Msg1, and the RAR of operation 1f-21 may be referred to as Msg2). The terminal may repeatedly transmit Msg3 based on system information, a message of an RRC layer, or information about how many times Msg3 should be repeatedly transmitted in the RRC message. Also, when the terminal has transmitted a random access preamble to the base station in a separate dedicated PRACH resource, the terminal may repeatedly transmit Msg3 to the base station.

The Msg3 transmitted by the terminal may be, for example, an RRCSetupRequest message or an RRCResumeRequest message, which is a message of an RRC layer, in the case of initial access, may be, for example, an RRCReestablishmentRequest message in the case of re-access, and may be, for example, an RRCReconfigurationComplete message in case of handover. Alternatively, a buffer status report (BSR) message for resource request or the like may be transmitted. Logical channels through which the terminal transmits Msg3 to the base station may include a common control channel CCCH and a common control channel CCCH1. Thus, the procedure according to the present embodiment may be applied only to the CCCH, may be applied only to the CCCH1, or may be applied to both the CCCH and the CCCH1. The terminal may configure Msg3 according to the above condition and transmit the same to the base station. For example, when the terminal repeatedly transmits Msg3 in operation 1f-31, the terminal may start a ra-ContentionResolutionTimer. In embodiments, the start time point proposed in the disclosure may be one of the following.

1. The ra-ContentionResolutionTimer may start at the time point when Msg3 is first transmitted.
2. The ra-ContentionResolutionTimer may start at the time point when the most recent Msg3 is transmitted.
3. The ra-ContentionResolutionTimer may start whenever Msg3 is transmitted.

Moreover, the reasons for performing random access for different terminals may be different from each other. As described above, there may be various reasons such as initial access (initial access for high-priority traffic may also be included), handover, and reconfiguration due to RRC layer connection failure, and in addition, random access may also be used in the case of recovering a beam failure in which transmission fails because the direction of a transmission beam does not match the direction of a terminal in a system using high frequencies. In the case of recovering a handover and beam failure, faster random access may be required. This may be to minimize user inconvenience because the terminal is disconnected while already communicating.

Accordingly, when the terminal performs random access to recover a handover or beam failure, the backoff indicator and the power ramping value may be different from those in general random access. For example, when a shorter value is used for the backoff indicator and a greater value is used for the power ramping value, the random access success time and probability may be further increased. As such, parameters for giving a high priority will be collectively referred to as a high-priority access parameter (HighPriorityAccess (HPA)).

Also, in the case of beam failure recovery, the terminal may perform a corresponding operation not only in the PCell but also in the SCell, and accordingly, the HPA parameter described above may be commonly signaled and applied to all serving cells. Other general random access parameters (the RAR window size, the power ramping size, and the maximum number of preamble transmissions described above) may be separately configured for each serving cell by the base station.

Figure 7:
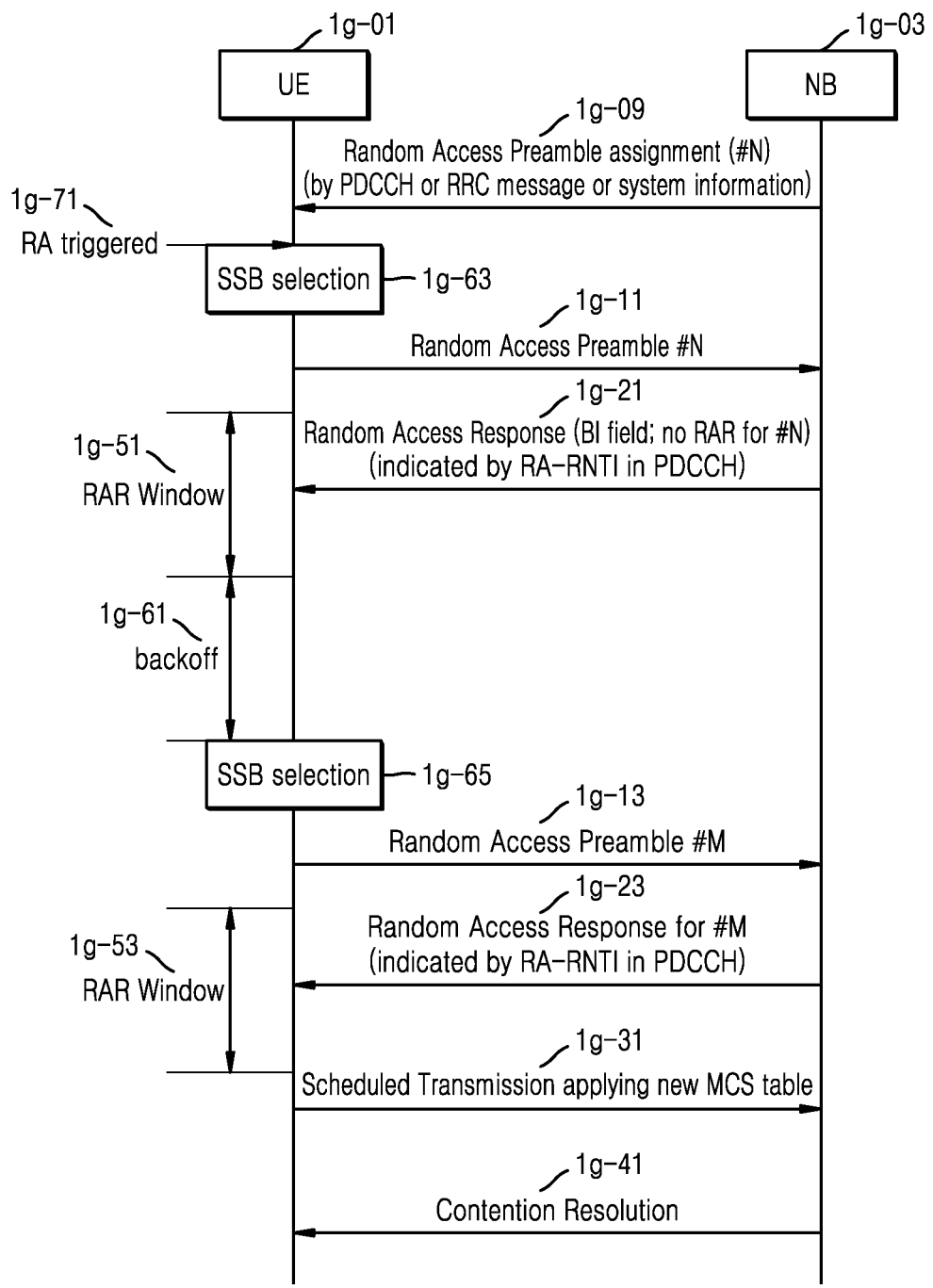
FIG. 7 is a diagram for describing a procedure of transmitting Msg3 when a terminal performs random access to a base station in a next-generation mobile communication system to which an embodiment is applied.

FIG. 7 is a diagram for describing a procedure of transmitting Msg3 when a terminal performs random access to a base station in a next-generation mobile communication system to which an embodiment is applied. More particularly, FIG. 7 is a diagram for describing a procedure of transmitting Msg3 by applying an MCS introduced for a URLLC service when a terminal in an RRC idle mode or an RRC inactive mode performs random access to a base station in a next-generation mobile communication system, according to an embodiment of the disclosure.

In embodiments, an MCS table that supports 64 QAM and is introduced for a URLLC service may be as follows.

TABLE 2

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |

TABLE 2-continued

| MCS Index $I_{MCS}$ | Modulation Order $Q_m$ | Target code Rate R × [1024] | Spectral efficiency |
|---|---|---|---|
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

In FIG. 7, a contention-based random access procedure will be mainly described. In a contention-free random access procedure, in order for a base station (NB) 1g-03 to get a terminal (UE) 1g-01 to perform contention-free random access, in operation 1g-09, a procedure of allocating a dedicated random access resource may be performed before random access.

In embodiments described with reference to FIG. 7, the base station may include, in system information (e.g., MIB1, SIB1, and SIB32), an indicator or information element for requesting to repeatedly transmit a random access preamble when the terminal in the RRC idle mode or the RRC inactive mode performs random access. When there is a corresponding indicator or information element, the terminal may repeatedly transmit a random access preamble accordingly. Also, in embodiments of FIG. 7, the base station may allocate a separate dedicated random access resource for transmitting Msg3 by applying an MCS introduced for a URLLC service when the terminal in the RRC idle mode or the RRC inactive mode performs random access. In embodiments, information about the separate dedicated random access resource may include one or more of the following.

1. Separate dedicated PRACH occasions (separate/dedicated PRACH occasions for transmission of Msg3 applying new MCS table during random access)
2. A particular preamble index (ra-PreambleIndex for transmission of Msg3 applying new MCS table during random access)
3. A new or dedicated random access preamble group (new or dedicated random access preamble group for transmission of Msg3 applying new MCS table during random access)
4. A PRACH resource on a particular time/frequency for transmitting Msg3 by applying an MCS introduced for a URLLC service when performing random access
5. An information element (IE) indicating how many times a random access preamble may be repeatedly transmitted or an indicator indicating whether a random access preamble may be repeatedly transmitted a fixed number of times The base station may allocate information about the proposed separate dedicated random access resource to the terminal through a PDCCH, transmit the same through a message of an RRC layer, or broadcast the same through system information. Accordingly, when there is the (above) separate dedicated random access resource allocated from the base station for the random access procedure currently performed by the terminal in the RRC idle mode or the RRC inactive mode, the terminal may transmit a random access preamble through the random access resource. In embodiments of FIG. 7, the terminal in the RRC idle mode or the RRC inactive mode may repeatedly transmit a random access preamble through the random access resource. The above embodiments may be similarly applied to a contention-based random access procedure described below. Moreover, in the contention-free random access, when there is the above preamble transmitted by the terminal in an RAR message described below, it may be determined that the random access has been successfully completed and the random access procedure may be ended.

Hereinafter, a contention-based random access procedure will be described.

First, in operation 1g-71, the terminal 1g-01 in the RRC idle mode or the RRC inactive mode may trigger random access (RA) for access to the base station 1g-03. When the random access is triggered, in operation 1g-63, as described above, the terminal may first determine through which beam the data transmission/reception including the random access should be performed, and select an SSB accordingly. An SSB selecting method according to embodiments may be one of the following.

1. Among the received SSBs, the terminal may randomly select one of the SSBs having a signal strength exceeding a certain threshold configured by the base station with the above system information or the message of the RRC layer.
2. Among the received SSBs, the terminal may select an SSB having the greatest signal strength among the SSBs having a signal strength exceeding a certain threshold configured by the base station with the above system information or the message of the RRC layer.
3. Among the received SSBs, the terminal may randomly select one of the SSBs or may select an SSB having the greatest signal strength among the SSBs, which have a signal strength exceeding a certain threshold configured by the base station with the above system information or the message of the RRC layer and match one SSB index or a plurality of SSB indexes separately indicated to transmit Msg3 by applying an MCS introduced for a URLLC service.

For example, in FIG. 5, the terminal may receive all of SSB #0, SSB #1, and SSB #2; however, when only the signal strength of SSB #1 exceeds the above threshold and the signal strength of SSB #0 and SSB #2 does not exceed the above threshold, the terminal may select SSB #1. In embodiments described with reference to FIG. 7, the base station may transmit, to the terminal, system information (e.g., MIB1, SIB1, and SIB2) or a message of an RRC layer (e.g., an RRCRelease message, an RRCReconfiguration message, or an RRCReestablishment message) including a separate threshold for transmitting Msg3 by applying MCS Table 3. In this case, the base station may indicate the above information or message as a value of RSRP of SSB or RSRP of CSI-RS like rsrp-thresholdSSB or rsrp-ThresholdCSI-RS.

When the SSB is selected as described above, the terminal may know a separate dedicated PRACH occasion for transmitting Msg3 mapped to the selected SSB by applying an MCS introduced for a URLLC service. In embodiments, an operation of transmitting, by the terminal, a random access preamble to the base station in the PRACH occasion (operation 1g-11) may be one or more of the following.

1. One random access preamble may be transmitted in a separate dedicated PRACH occasion.
2. When the system information includes an information element (IE) indicating how many times a random access preamble may be repeatedly transmitted or an indicator indicating whether a random access preamble may be repeatedly transmitted a fixed number of times, a random access preamble may be transmitted in a separate dedicated PRACH occasion based on the information.
3. When a new or separate random access preamble group is configured from the system information, one random access preamble may be transmitted in the random access preamble group.

Under the above condition, a case where one or more terminals simultaneously transmit a random access preamble in a PRACH occasion may also occur. The PRACH resource may span one subframe, or only some symbols in one subframe may be used. Also, the random access preamble may include a plurality of preamble identifiers (indexes) according to a particular sequence standard specially designed to enable reception even when transmitted before being completely synchronized with the base station. When there are a plurality of preamble identifiers, the preamble transmitted by the terminal may be randomly selected by the terminal or may be a particular preamble designated by the base station.

Moreover, when the terminal already in the connected mode performs random access, when the base station has configured a particular signal to be measured, a process of selecting the above SSB may include an operation of selecting a PRACH occasion based on the particular signal to be measured, instead of the above SSB. In embodiments, the particular signal to be measured may be an SSB or a channel state information reference signal (CSI-RS). For example, in the case of performing a handover to another base station due to the movement of the terminal or the like, a handover command may be used to select a PRACH occasion mapped to the SSB or CSI-RS of a target base station, and accordingly, the terminal may measure the configured signal to determine in which PRACH occasion the random access preamble is to be transmitted.

When the base station receives the preamble (or the preamble transmitted by another terminal), in operation 1g-21, a random access response (RAR) message thereto may be transmitted to the terminal. In embodiments described with reference to FIG. 7, the time point at which the base station transmits the RAR message to the terminal may be one of the following.

1. When the first preamble is received, a random access response message thereof may be transmitted to the terminal.
2. When the last preamble is received, a random access response message thereof may be transmitted to the terminal.
3. When any preamble is received, a random access response message thereof may be transmitted to the terminal.

The RAR message may include at least one of identifier information of the preamble used in operation 1g-11, uplink transmission timing correction information, uplink resource allocation information to be used in a later operation (e.g., operation 1g-31), and temporary terminal identifier information. For example, when a plurality of terminals transmit different preambles to attempt random access in operation 1g-11, the identifier information of the preamble may be transmitted to indicate to which preamble the RAR message is a response message. The uplink resource allocation information may be detailed information of the resource to be used by the terminal to transmit Msg3 in operation 1f-31 by applying an MCS table introduced for a URLLC service, and may include the physical position and size of the resource, a decoding and coding method (a modulation and coding scheme (MCS)) used for transmission, power adjustment information for transmission, and the like.

Also, the base station may include, in the RAR message, a 1-bit indicator for requesting the terminal to repeatedly transmit Msg3, together with the uplink resource allocation information to be used by the terminal for transmission by applying an MCS table introduced for a URLLC service. Also, the base station may transmit the RAR message including a value indicating how many times Msg3 may be repeatedly transmitted by the terminal.

When the terminal having transmitted the preamble performs initial access, because the terminal does not have the identifier allocated by the base station for communication with the base station, the temporary terminal identifier information may be a value transmitted for use in this case.

Moreover, for example, based on the energy amount of the received PRACH or the number of preambles received through the PRACH for a certain time, when it is determined that the number of preambles received through the PRACH for a certain time is equal to or greater than a certain number, the base station may determine that there are too many terminals performing random access. In this case, the base station may receive a subheader including backoff indicator information in the RAR message. The subheader may be located at the first portion of the RAR message. The backoff indicator may have a size of 4 bits and may have the following values.

TABLE 3

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

When the terminal fails to receive a response to the transmitted preamble within an 'RAR window' (1g-51) period and receives only the backoff indicator information, the terminal may select a random number between 0 and the received value in preamble retransmission to delay the preamble retransmission time by the selected time (1g-61).

The RAR message should be transmitted within a certain period starting from a certain time after transmitting the above preamble, and the certain period will be referred to as an 'RAR window' (1g-51, 1g-53). In embodiments described with reference to FIG. 7, the start point of the RAR window may be as follows.

1. The RAR window may start from a time point at which a certain time elapses after the first preamble is transmitted.
2. The RAR window may start from a time point at which a certain time elapses after the last preamble is transmitted.
3. The RAR window may start from a time point at which a certain time elapses after each preamble is transmitted.

The certain time may have a subframe unit (2 ms) or a smaller value. Also, the length of the RAR window may be a certain value configured by the base station for each PRACH resource or for each PRACH resource set in the system information broadcast by the base station. Also, the start point of the RAR window may be included in the system information broadcast by the base station.

Moreover, when the RAR message is transmitted, the base station may schedule the RAR message through the PDCCH and the scheduling information thereof may be scrambled by using a random access-radio network temporary identifier (RA-RNTI). The RA-RNTI may be mapped to the PRACH resource used to transmit a message in operation 1g-11. The terminal having transmitted a preamble in a particular PRACH resource may attempt to receive a PDCCH based on the RA-RNTI to determine whether there is a corresponding RAR message. That is, when the RAR message is a response to the preamble transmitted in operation 1g-11 by the terminal as illustrated in FIG. 7, the RA-RNTI used in the RAR message scheduling information may include information about the transmission in operation 1g-11. For this purpose, the RA-RNTI may be calculated as the following equation:

$$\text{RA-RNTI}=1+s\_id+14 \times t\_id+14 \times 80 \times f\_id+14 \times 80 \times 8 \times ul\_carrier\_id \quad \text{[Equation 2]}$$

In Equation 2, s_id may be an index corresponding to the first OFDM symbol in which transmission of the preamble transmitted in operation 1g-11 starts, and may have a value of $0 \leq s\_id < 14$ (i.e., the maximum number of OFDM symbols in one slot). Also, t_id may be an index corresponding to the first slot in which transmission of the preamble transmitted in operation 1g-11 is started, and may have a value of $0 \leq t\_id < 80$ (i.e., the maximum number of slots in one system frame (20 ms)). Also, f_id may indicate which ordinal number of PRACH resource the preamble transmitted in operation 1g-11 is transmitted on frequency, and may have a value of $0 \leq f\_id < 8$ (i.e., the maximum number of PRACHs on the frequency within the same time). Also, ul_carrier_id may be, when two carriers are used in the uplink for one cell, a factor for identifying whether the preamble is transmitted in a normal uplink (NUL) (0 in this case) or whether the preamble is transmitted in a supplementary uplink (SUL) (1 in this case).

In FIG. 7, a scenario is assumed in which the terminal receives the RAR message with the RA-RNTI corresponding to the preamble transmission in operation 1g-11 but the identifier corresponding to the transmitted preamble is not included. That is, for example, the terminal may transmit preamble #7 among a total of 64 preamble identifiers but the RAR message received from the base station may include only a response to preamble #4. Accordingly, as described above, when there is a BI value received in preamble retransmission, the terminal may delay the same by a value randomly selected from the corresponding value in operation 1g-61 and may select the SSB again at the corresponding time point in operation 1g-65 in order to retransmit the preamble. Also, the terminal may retransmit the preamble in the PRACH occasion corresponding thereto according to the selected SSB in operation 1g-13, may wait for a response thereto in operation 1g-53, and may receive a response in operation 1g-23. Accordingly, when there are many terminals performing random access, the preamble transmission may be distributed in time and thus the random access success probability may be increased.

In addition, when the terminal retransmits the preamble in operation 1g-31, the preamble may be retransmitted with the transmission power increased from the previous preamble transmission power in operation 1g-11 by the corresponding power according to a value (preamblePowerRampingStep) configured from the base station (power ramping). Accordingly, as the number of retransmissions increases, the preamble transmission power may continue to increase until the maximum transmission power of the terminal is reached, and thus the probability of the signal reaching the base station may be increased.

In operation 1g-31, the terminal having receiving the RAR message with respect to the transmitted preamble may transmit other messages according to the above various purposes in the resources allocated to the RAR message. Referring to FIG. 7, the third transmitted message may be referred to as Msg3 (i.e., the preamble of operation 1g-11 or 1g-13 may be referred to as Msg1, and the RAR of operation 1g-21 may be referred to as Msg2). When there is information about a request for transmitting Msg3 by applying system information, a message of an RRC layer, or an MCS table introduced for a URLLC service in the RAR message to the Msg3, the terminal may transmit Msg3 by applying the MCS table introduced for the URLLC service. Also, when the terminal has transmitted a random access preamble to the base station in a separate dedicated PRACH resource, the terminal may transmit Msg3 to the base station by applying the MCS table introduced for the URLLC service. The Msg3 transmitted by the terminal may be, for example, an RRCSetupRequest message or an RRCResumeRequest message, which is a message of an RRC layer, in the case of initial access, may be, for example, an RRCReestablishmentRequest message in the case of re-access, and may be, for example, an RRCReconfigurationComplete message in case of handover. Alternatively, a buffer status report (BSR) message for resource request or the like may be transmitted. Logical channels through which the terminal transmits Msg3 to the base station may include a common control channel CCCH and a common control channel CCCH1. Thus, the above procedure may be applied only to the CCCH, may be applied only to the CCCH1, or may be applied to both the CCCH and the CCCH1. The terminal may configure Msg3 according to the above condition and transmit the same to the base station.

In operation 1g-31, the terminal may start a ra-ContentionResolutionTimer in the case of repeatedly transmitting Msg3, transmitting Msg3 by applying the MCS table introduced for the URLLC service, or repeatedly transmitting Msg3 by applying the MCS table introduced for the URLLC service. The start time point proposed in the disclosure may be one of the following.

1. The ra-ContentionResolutionTimer may start at the time point when Msg3 is first transmitted.
2. The ra-ContentionResolutionTimer may start at the time point when the most recent Msg3 is transmitted.
3. The ra-ContentionResolutionTimer may start whenever Msg3 is transmitted.

Moreover, the reasons for performing random access for different terminals may be different from each other. As described above, there may be various reasons such as initial access (initial access for high-priority traffic may also be included), handover, and reconfiguration due to RRC layer connection failure, and in addition, random access may also be used in the case of recovering a beam failure in which transmission fails because the direction of a transmission beam does not match the direction of a terminal in a system using high frequencies. In the case of recovering a handover and beam failure, faster random access may be required. This may be to minimize user inconvenience because the terminal is disconnected while already communicating.

Accordingly, when the terminal performs random access to recover a handover or beam failure, the backoff indicator and the power ramping value may be different from those in general random access. For example, when a shorter value is used for the backoff indicator and a greater value is used for the power ramping value, the random access success time and probability may be further increased. As such, parameters for giving a high priority will be collectively referred to as a high-priority access parameter (HighPriorityAccess (HPA)).

Also, in the case of the beam failure recovery, the terminal may perform a corresponding operation not only in the PCell but also in the SCell, and accordingly, the HPA parameter described above may be commonly signaled and applied to all serving cells. Other general random access parameters (the RAR window size, the power ramping size, and the maximum number of preamble transmissions described above) may be separately configured for each serving cell by the base station.

The embodiments described with reference to FIGS. 6 and 7 may not be mutually exclusive and may be applied together.

Figure 8:
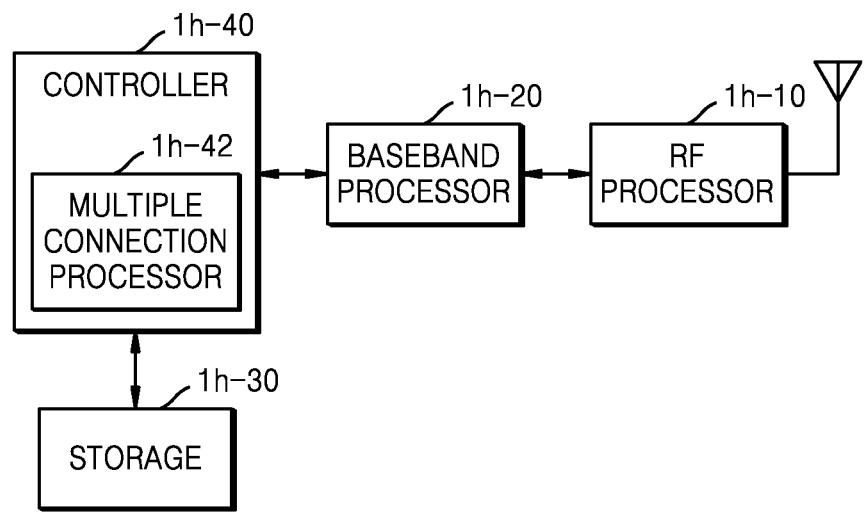
FIG. 8 is a block diagram illustrating a structure of a terminal according to an embodiment.

FIG. 8 is a block diagram illustrating a structure of a terminal according to an embodiment of the disclosure.

The terminal may include a radio frequency (RF) processor 1h-10, a baseband processor 1h-20, a storage 1h-30, and a controller 1h-40.

According to an embodiment of the disclosure, the RF processor 1h-10 may perform functions for transmitting or receiving signals through radio channels, such as band conversion and amplification of signals. That is, the RF processor 1h-10 may up-convert a baseband signal provided from the baseband processor 1h-20 into an RF band signal and transmit the same through an antenna and may down-convert an RF band signal received through the antenna into a baseband signal. For example, the RF processor 1h-10 may include a transmission filter, a reception filter, an amplifier, a mixer, an oscillator, a digital-to-analog converter (DAC), and an analog-to-digital converter (ADC).

Although only one antenna is illustrated in FIG. 8, the terminal may include a plurality of antennas.

Also, the RF processor 1h-10 may include a plurality of RF chains. In addition, the RF processor 1h-10 may perform beamforming. For beamforming, the RF processor 1h-10 may adjust the phase and magnitude of each of the signals transmitted or received through a plurality of antennas or antenna elements. Also, the RF processor 1h-10 may perform multiple-input multiple-output (MIMO) and may receive multiple layers when performing a MIMO operation. Under the control of the controller 1h-40, the RF processor 1h-10 may perform reception beam sweeping by suitably configuring a plurality of antennas or antenna elements or may adjust the direction and width of a reception beam such that the reception beam may be coordinated with a transmission beam.

The baseband processor 1h-20 may perform a conversion function between a baseband signal and a bit string according to the physical layer standard of the system. For example, during data transmission, the baseband processor 1h-20 may generate complex symbols by encoding and modulating a transmission bit string. Also, during data reception, the baseband processor 1h-20 may restore a reception bit string by demodulating and decoding the baseband signal provided from the RF processor 1h-10. For example, according to an OFDM scheme, during data transmission, the baseband processor 1h-20 may generate complex symbols by encoding and modulating a transmission bit string, map the complex symbols to subcarriers, and then configure OFDM symbols through an inverse fast Fourier transform (IFFT) operation and cyclic prefix (CP) insertion. Also, during data reception, the baseband processor 1h-20 may divide the baseband signal provided from the RF processor 1h-10 into OFDM symbol units, restore signals mapped to the subcarriers through a fast Fourier transform (FFT) operation, and then restore a reception bit string through demodulation and decoding.

The baseband processor 1h-20 and the RF processor 1h-10 may transmit and receive signals as described above. Accordingly, the baseband processor 1h-20 and the RF processor 1h-10 may be referred to as a transmitter, a receiver, a transceiver, or a communicator. In addition, at least one of the baseband processor 1h-20 and the RF processor 1h-10 may include a plurality of communication modules to support a plurality of different radio access technologies. Also, at least one of the baseband processor 1h-20 and the RF processor 1h-10 may include a plurality of communication modules to process signals of different frequency bands. For example, the different radio access technologies may include LTE networks, NR networks, and the like. Also, the different frequency bands may include a super high frequency (SHF) (e.g., 2.2 GHz or 2 GHz) band and a millimeter wave (e.g., 60 GHz) band. The terminal may transmit/receive signals to/from the base station by using the baseband processor 1h-20 and the RF processor 1h-10. Here, the signals may include control information and data.

The storage 1h-30 may store data such as a basic program, an application program, or configuration information for operation of the terminal. The storage 1h-30 may provide the stored data at the request of the controller 1h-40.

The controller 1h-40 may control overall operations of the terminal. For example, the controller 1h-40 may transmit or receive signals through the baseband processor 1h-20 and the RF processor 1h-10. Also, the controller 1h-40 may write/read data into/from the storage 1h-30. For this purpose, the controller 1h-40 may include at least one processor. For example, the controller 1h-40 may include a communication processor (CP) for performing control for communication and an application processor (AP) for controlling an upper layer such as an application program.

Figure 9:
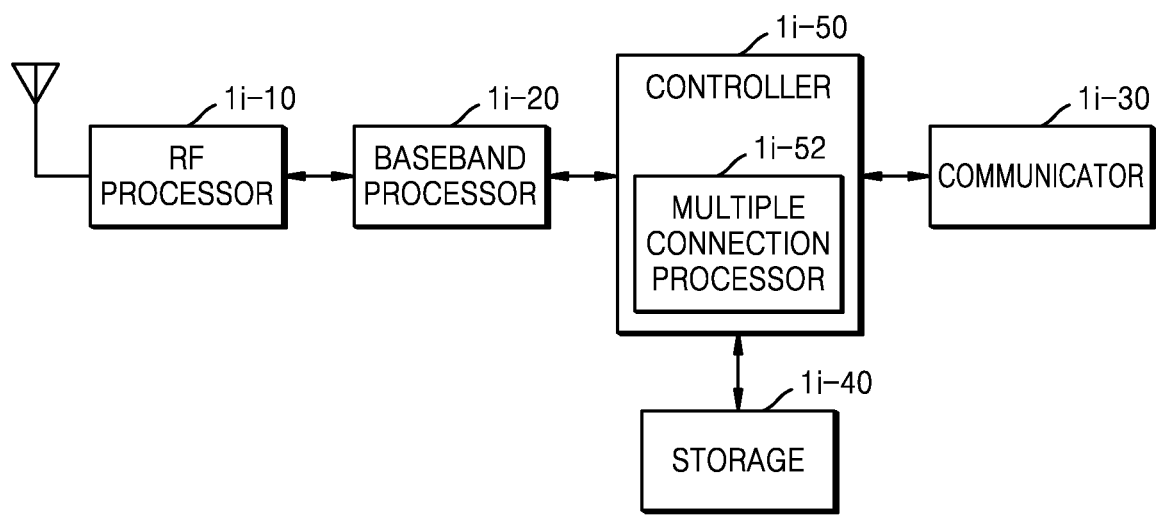
FIG. 9 is a block diagram illustrating a structure of a base station according to an embodiment.

FIG. 9 is a block diagram of a base station according to an embodiment.

According to an embodiment of the disclosure, the base station may include one or more transmission reception points (TRPs). According to an embodiment of the disclosure, the base station may include an RF processor 1i-10, a baseband processor 1i-20, a communicator 1i-30, a storage 1i-40, and a controller 1i-50.

The RF processor 1i-10 may perform functions for transmitting or receiving signals through radio channels, such as band conversion and amplification of signals. That is, the RF processor 1i-10 may up-convert a baseband signal provided from the baseband processor 1i-20 into an RF band signal and transmit the same through an antenna and may down-convert an RF band signal received through the antenna into a baseband signal. For example, the RF processor 1i-10 may include a transmission filter, a reception filter, an amplifier, a mixer, an oscillator, a DAC, and an ADC.

Although only one antenna is illustrated in FIG. 9, the base station may include a plurality of antennas.

Also, the RF processor 1i-10 may include a plurality of RF chains. In addition, the RF processor 1i-10 may perform beamforming. For beamforming, the RF processor 1i-10 may adjust the phase and magnitude of each of the signals transmitted/received through a plurality of antennas or antenna elements. The RF processor 1i-10 may perform a downlink MIMO operation by transmitting one or more layers.

The baseband processor 1i-20 may perform a conversion function between a baseband signal and a bit string according to the physical layer standard of a first radio access technology. For example, during data transmission, the baseband processor 1i-20 may generate complex symbols by encoding and modulating a transmission bit string. Also, during data reception, the baseband processor 1i-20 may restore a reception bit string by demodulating and decoding the baseband signal provided from the RF processor 1i-10. For example, according to the OFDM scheme, during data transmission, the baseband processor 1i-20 may generate complex symbols by encoding and modulating a transmission bit string, map the complex symbols to subcarriers, and then configure OFDM symbols through an IFFT operation and CP insertion. Also, during data reception, the baseband processor 1i-20 may divide the baseband signal provided from the RF processor 1i-10 into OFDM symbol units, restore signals mapped to the subcarriers through an FFT operation, and then restore a reception bit string through demodulation and decoding. The baseband processor 1i-20 and the RF processor 1i-10 may transmit and receive signals as described above.

Accordingly, the baseband processor 1i-20 and the RF processor 1i-10 may be referred to as a transmitter, a receiver, a transceiver, a communicator, or a wireless communicator.

The communicator 1i-30 may provide an interface for communicating with other nodes in the network. That is, the communicator 1i-30 may convert a bit string transmitted from a main base station to another node, for example, an auxiliary base station, a core network, or the like, into a physical signal and may convert a physical signal received from another node into a bit string. The base station may transmit/receive signals to/from the terminal by using the baseband processor 1i-20 and the RF processor 1i-10. Here, the signals may include control information and data.

The storage 1i-40 may store data such as a basic program, an application program, or configuration information for operation of the main base station. Particularly, the storage 1i-40 may store information about a bearer allocated to a connected terminal, a measurement result reported from the connected terminal, or the like. Also, the storage 1i-40 may store information that is a reference for determining whether to provide or terminate a multiple connection to the terminal. The storage 1i-40 may provide the stored data at the request of the controller 1i-50. The storage 1i-40 may include a storage medium or a combination of storage media such as ROM, RAM, hard disk, CD-ROM, and DVD. Also, the storage 1i-40 may include a plurality of memories. In an embodiment, the storage 1i-40 may store a program for supporting beam-based cooperative communication.

The controller 1i-50 may control overall operations of the main base station. For example, the controller 1i-50 may transmit or receive signals through the baseband processor 1i-20 and the RF processor 1i-10 or through the communicator 1i-30. Also, the controller 1i-50 may write/read data into/from the storage 1i-40. For this purpose, the controller 1i-50 may include at least one processor.

Moreover, in order to achieve high data rates considered in the disclosure, the implementation of 5G communication systems in an ultra-high-frequency or millimeter-wave (mm-Wave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

Also, in order to improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), unlicensed band utilization, and interference cancellation have been developed.

In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

A Licensed Assisted Access unlicensed system LAA has been researched and standardized, but unlicensed band application of a licensed band system mainly aimed at supporting an unlicensed band needs to be further researched. Scenarios that may be considered may include a system for accessing an unlicensed band through support of a licensed band, a system capable of independently operating an unlicensed band, and the like.

The present embodiment may be applied to a next-generation wireless communication system, and may provide a system, method, and apparatus in which a base station and a terminal having to perform channel sensing before transmission for coexistence with wireless transmission technologies using other unlicensed bands effectively detect an unsolvable problem related to in-device coexistence and transmit and receive such information, in a system including one or more base stations and one or more terminals and using an unlicensed band.

Also, the present embodiment may provide a system, method, and apparatus in which a terminal detects an unsolvable in-device coexistence (IDC) problem related to an NR-unlicensed band and reports the same to the network, in a system including one or more base stations and one or more terminals.

In embodiments, the terminal may transmit any information structure (information element) to inform the network of its capability, and the information structure may include an indicator indicating that the terminal may determine an IDC problem related to an NR-unlicensed band and transmit information about the IDC problem to the network.

Because a system performing wireless communication in an unlicensed band inevitably shares the frequency band with other unlicensed wireless communication terminals and base stations (e.g., WLAN, Bluetooth, or LTE LAA terminals), wireless transmission in the unlicensed band may require contention for resource occupancy. Thus, in order to prevent a collision caused by transmission of different terminals in such contention, Listen-Before-Talk (LBT) may be used to check channel conditions before transmission. Due to the channel occupancy of other terminals and the LBT performance of the terminal, in the unlicensed band, it may not be easy to definitively succeed in transmission at the corresponding transmission time even when a particular future transmission time is reserved. Thus, in order to solve this problem, it may be desirable to reserve a certain window duration starting from a particular time point and attempt transmission and reception in the corresponding window duration, instead of reserving a certain time point between a transmitting end and a receiving end.

Figure 10:
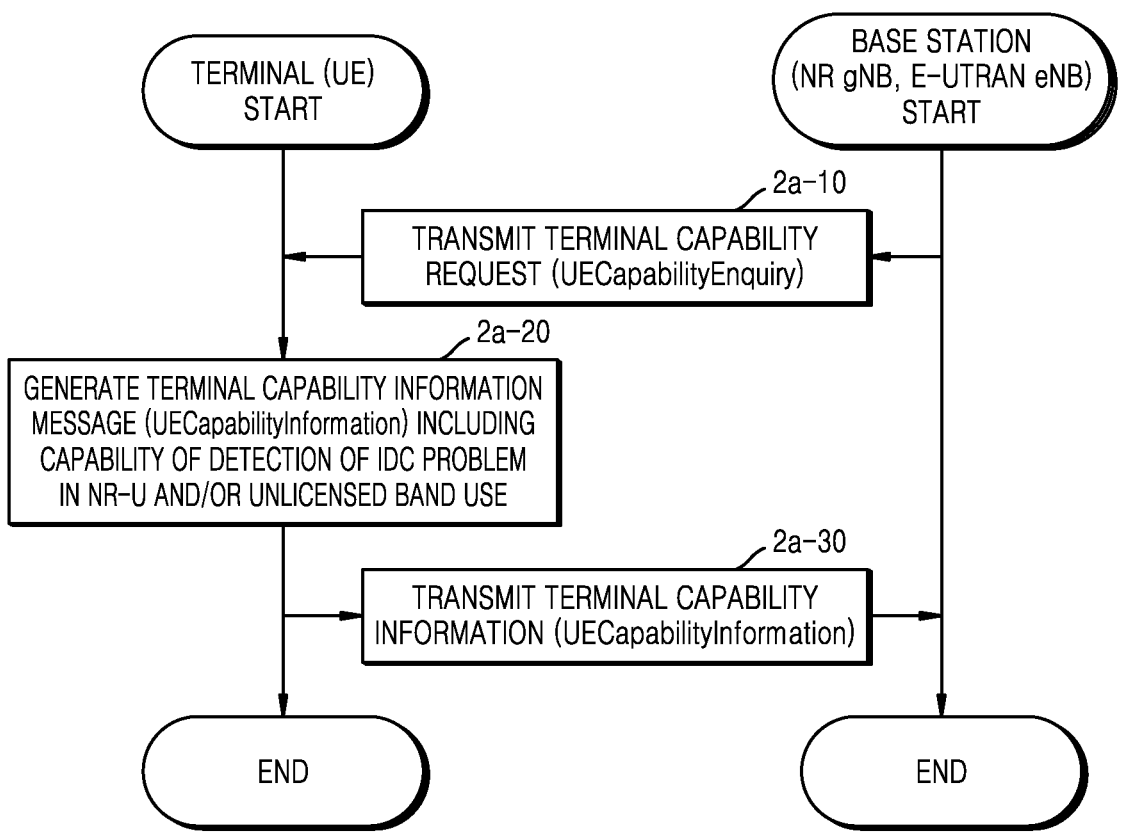
FIG. 10 is a diagram illustrating a procedure of transmitting, by a terminal, capability information to a network, according to an embodiment.

FIG. 10 is a diagram illustrating a procedure of transmitting, by a terminal, capability information to a network, according to an embodiment.

In operation 2a-10, the network (e.g., an NR base station or a 5G unlicensed band (NR-unlicensed (NR-U)) base station) may transmit a UECapabilityEnquiry signal for requesting to transmit terminal capability information to the terminal in an RRC_CONNECTED state.

The terminal having receiving the UECapabilityEnquiry signal may generate a UECapabilityInforamtion signal including various terminal capability information in operation 2a-20 and transmit the same to the network in operation 2a-30. In embodiments, the terminal may generate the UECapabilityInformation signal including a message indicating that it has the capability to detect an IDC problem in the case of using unlicensed band support information, NR-U or (e)LAA support information, and such unlicensed radio access technologies. Also, the terminal may generate the UECapabilityInformation signal including the following messages and transmit the same to the base station in order to inform that the terminal has the capability to report the IDC-related problem to the network.

The UECapabilityInforamtion signal may include various capability information supported by the terminal. In embodiments, the terminal capable of detecting an IDC problem that may occur in a DC structure may generate a UECapabilityInforamtion signal including a message with inDeviceCoexInd-UL-DC configured as 'supported', as in Table 4.

TABLE 4

| Other-Parameters ::= | SEQUENCE { | |
|---|---|---|
| inDeviceCoexInd-NRU | ENUMERATED {supported} | OPTIONAL, |
| } | | |

In embodiments, inDeviceCoexInd-NRU may be configured only when the terminal supports NR-U, for example, when the terminal includes inDeviceCoexInd in the UECapabilityInforamtion signal.

TABLE 5 inDeviceCoexInd-NRU

An indicator indicating whether the terminal supports NR-Unlicensed-related in-device coexistence (IDC) problem existence indicator information signal transmission. This field may be supported and included only when inDeviceCoexInd, which is an indicator indicating whether the UE supports in-device coexistence (IDC) problem existence indicator information signal transmission, is included (supported). The terminal supports inDeviceCoexInd-NRU in the same duplexing modes as inDeviceCoexInd.
Indicates whether the UE supports NR-U related in-device coexistence indication. This field can be included only if inDeviceCoexInd is included. The UE supports inDeviceCoexInd-NRU in the same duplexing modes as it supports inDeviceCoexInd.

In embodiments, the UECapabilityInforamtion signal may include various capability information supported by the terminal. The terminal may be configured to report IDC for one or more of various radio access technologies (RATs) using an unlicensed band, for example, NR-U, LTE (e)LAA, WLAN, Bluetooth, ZigBee, and Global Navigation Satellite System (GNSS), and the terminal may detect an unsolvable IDC problem in such multiple RATs. In the case of a terminal capable of detecting such an IDC problem, the terminal may report an IDC problem related to the RAT, in which an IDC problem is detected, to the network. In embodiments, the terminal may inform the network that the terminal has the capability to report such an IDC problem related to a multiple RAT using an unlicensed band, by transmitting a UECapabilityInforamtion signal including the following message to the network as in Table 6

TABLE 6

```
Other-Parameters::=              SEQUENCE {
    inDeviceCoexInd-HardwareSharingInd-NRU    ENUMERATED {supported}
    OPTIONAL,
}
```

In embodiments, inDeviceCoexInd-HardwareSharingInd-NRU may be configured only when the terminal supports IDC, for example, when the terminal includes inDeviceCoexInd in the UECapabilityInforamtion signal.

TABLE 7 inDeviceCoexInd-HardwareSharingInd-NRU
An indicator indicating whether the terminal supports uplink (UL) multiple BWP-related in-device coexistence (IDC) problem existence indicator information signal transmission. This field may be supported and included only when inDeviceCoexInd, which is an indicator indicating whether the UE supports in-davice coexistance (IDC) problem existence indicator information signal transmission, is included (supported)
Indicates whether the UE supports indicating hardware sharing problems when sending the InDeviceCoexIndication, as well as omitting the TDM assistance information. A UE that supports hardware sharing indication shall also indicate support of NR-U and/or LAA operation.

Figure 11:
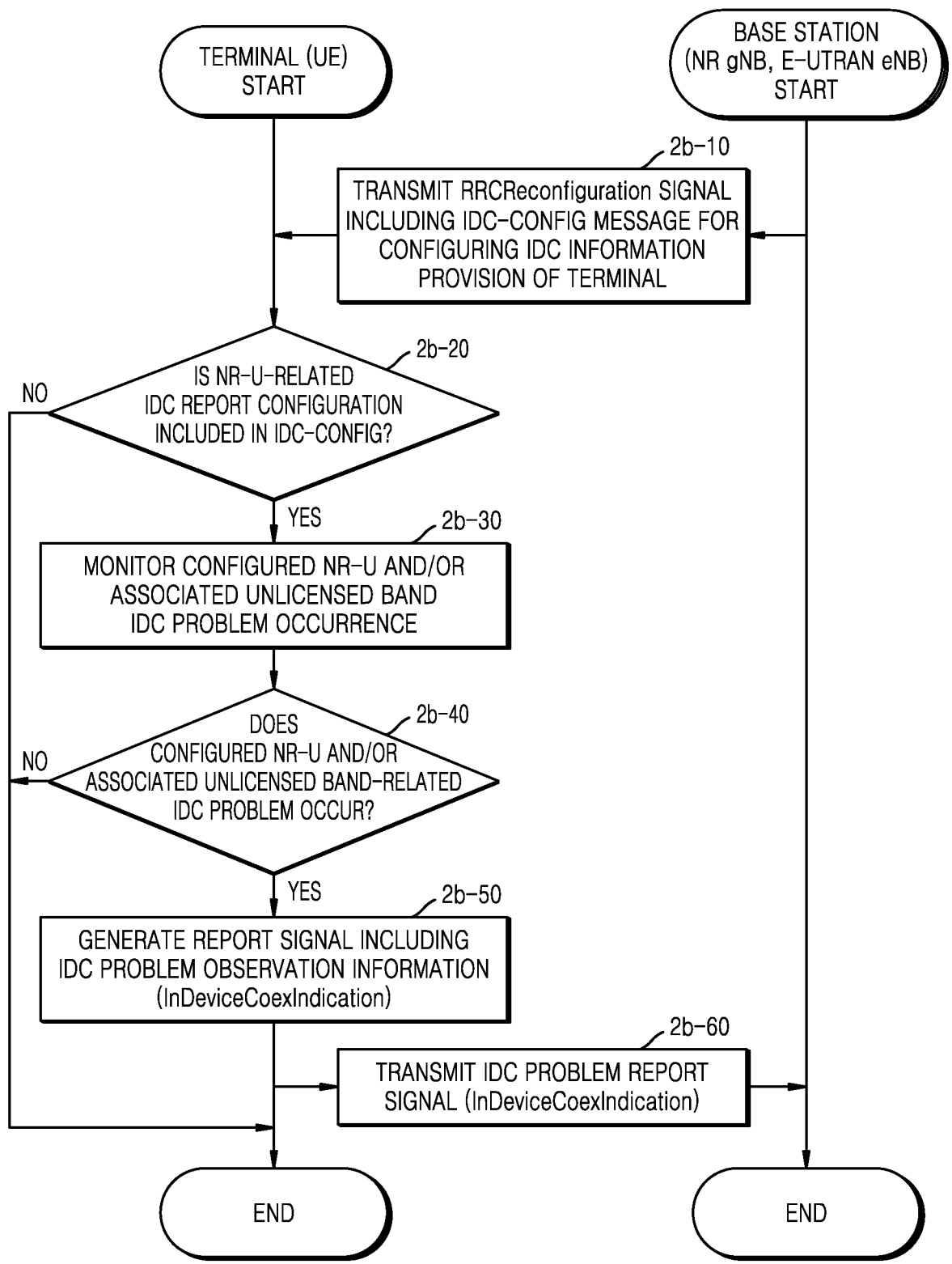
FIG. 11 is a diagram illustrating a procedure of transmitting, by a terminal, capability information to a network, according to an embodiment.

FIG. 11 is a diagram illustrating a procedure of transmitting, by a terminal, capability information to a network, according to an embodiment. Referring to FIG. 11, the terminal supporting IDC information provision may provide UECapabilityInforamtion to the network to inform the network of the terminal capability, and in operation 2b-10, the network knowing the terminal capability may configure IDC information provision to the terminal through an RRC signal. The terminal configured with IDC information provision in operation 2b-20 may monitor whether a configured IDC problem occurs in operation 2b-30, generate a report signal including related information in operation 2b-50 when the IDC problem occurs (2b-40), and report the same to the network in operation 2b-60. The terminal operation related thereto may be as shown in Table 8 below:

TABLE 8

The terminal may operate as follows.
1> Determines if idc-Config is included in received RRCConfig signal:
2> If idc-Config is included in RRCConfig signal (i.e., configured as setup):
3> The terminal recognizes (considers) that it has been configured to transmit an IDC indication and may perform an IDC indication-related procedure;
...
3> If idc-Indication-NRU is included in idc-Config (i.e., configured as setup):
4> The terminal recognizes (considers) that it has been configured to transmit an IDC indication including NR-U-related information and may perform an IDC indication-related procedure;
2> Otherwise (i.e., if idc-Config is not included in RRCConfig signal):
3> The terminal recognizes that it has been configured not to transmit an IDC indication;

In embodiments, the terminal may receive an RRCConfig message (e.g., otherConfig) including idc-Config and may determine whether idc-Indication is configured in the received RRCConfig message. When the idc-Indication is configured (e.g., configured as Setup), the terminal may recognize that it is configured to provide IDC information to the network. When idc-Indication-NRU is configured in the RRCConfig message, the terminal may recognize that it is configured to provide NR-Unlicensed-related IDC information to the network. Also, when the HardwareSharingIndication-NRU is configured in the RRCConfig message, the terminal may recognize that the terminal is configured to provide information about the occurrence of an unsolvable hardware problem in the in-terminal unlicensed RAT using the same unlicensed band as the NR-U. In embodiments, idc-Config configuration information may have a structure shown in Table 9 below.

TABLE 9

```
IDC-Config ::=                        SEQUENCE {
    idc-Indication                        ENUMERATED{setup}        OPTIONAL,        -- Need OR
    autonomousDenialParameters            SEQUENCE {
        autonomousDenialSubframes             ENUMERATED {n2, ..., n30, spare2, spare1},
        autonomousDenialValidity              ENUMERATED {sf200,...,f2000, spare4,...,spare1}
    }                                                              OPTIONAL        -- Need OR
    ...,
    idc-Indication-NRU                    ENUMERATED{setup}        OPTIONAL -- Cond idc-Ind,
    idc-HardwareSharingIndication-NRU     ENUMERATED{setup}        OPTIONAL -- Need OR
}
```

In embodiments, the terminal may monitor IDC for each resource and connection in real time according to the configured information. Also, when any unsolvable IDC problem that the terminal may not solve by itself is observed with respect to the resource and connection or other IDC problem information transmission conditions are satisfied, the terminal may trigger and start an operation of transmitting information about the IDC problem to the network as in the operation shown in Table 10 below.

TABLE 10

The terminal having the capability to provide an IDC indication and configured to provide an IDC indication may start the following procedures according to the change state of IDC problem information.
The terminal may start following operation according to the change of of the procedure.
1> If the terminal is configured to provide IDC indications:
2> If the terminal never transmits an InDeviceCoexIndication signal after configured to provide IDC indications:
3> If one or more frequencies are configured as measObjectNR and the terminal experiences an IDC problem that is unsolvable by itself; or
3> If one or more frequencies are configured as measObjectNRU and the terminal experiences an IDC problem that is unsolvable by itself; or
3> If it is configured to provide IDC indications related to NR-U (NR-Unlicensed) and the terminal experiences an IDC problem that is unsolvable by itself with respect to NR-U combinations related to carrier frequencies configured with one or more measurement objects:
4> The terminal starts transmission of an InDeviceCoexIndication message.
2> Otherwise (i.e., if the terminal never transmits an InDeviceCoexIndication signal after configured to provide IDC indications:
3> If one or more frequencies are configured as measObjectNR and a set of frequences, at which the terminal experiences and IDC problem that is unsolvable by itself, is different from a set indicated by an InDevinceCoexIndication message that has been most recently transmited; or
3> If one ore more frequencies are configured as measObjectNR and a set of frequencies, at which the terminal experiences an IDC problem that is unsolvable by itself, is different from a set indicated by an InDeviceCoexIndication message that has been most recently transmitted; or
3> If with respect to one ore more frequencies among a set of previously reported frequencies, an interferenceDirection value is different from an interferenceDirection value included in an InDeviceCoexIndication message that has been most recently transmitted by the terminal; or
3> If with respect to one or more frequencies among a set of previously reported frequencies, an AffectedDINRUBWPList value is different from an value included in an AffectedDINRUBWPList value included in an InDeviceCoexIndication message that has been most transmitted by the terminal; or
3> If with respect to one or more frequencies among a set of previously reported frequencies, an AffectedDINRUBWPList value is different from an AffectedDINRUBWPList value indicated in an InDeviceCoexIndication message that has been most recently transmitted by the terminal; or
3> If with respect to one or more frequencies among a set of previously reported frequencies, an SUL-id value is different from a SUL-id where indicated in an InDeviceCoexIndication message that has been recently transmitted by the terminal; or
3> If TDM assistance information is different from TDM assistance information included in an InDeviceCoexIndication message that has been most recently transmitted by the terminal; or
3> If it is configured to provide IDC indications related to NR-U and victimSystemType value
is different from a victimSystemType value included in an InDeviceCoexIndication message that has been most recently transmitted by the terminal; or
3> If it is configured to provide IDC indications related to NR-U and affectedCarrierFreqCombListNRU is different from an affectedCarrierFreqCombListNRU value included in an InDeviceCoexIndication message that has been most recently transmitted by the terminal or
3> If it is configured to provide IDC indications related to NR-U and AffectedUINRUBWPList is different from an AffectedUINRUBWPLis value included in an InDeviceCoexIndication message that has been most recently transmitted; or
3> If it is configured to provide IDC indications related to NR-U and BWP-Id is different from a BWP id value included in an InDeviceCoexIndication message that has been most recently transmitted by the terminal;
4> The terminal starts transmission of an InDeviceCoexIndication message;

Various types of information may be included in an IDC information signal (InDeviceCoexIndication) generated by the terminal and reported to the network, which is considered in an IDC transmission signal generation procedure of the terminal. In embodiments, the IDC information signal may include information shown in Table 11 below.

TABLE 11

```
InDeviceCoexIndication ::=              SEQUENCE {
    affectedCarrierFreqListNR               AffectedCarrierFreqListNR                                      OPTIONAL,
    affectedCarrierFreqListNRU              AffectedCarrierFreqListNRU                                     OPTIONAL,
    tdm-AssistanceInfo                      TDM-AssistanceInfo                                             OPTIONAL,
    ul-CA-AssistanceInfo                    SEQUENCE {
        affectedCarrierFreqCombListNR           AffectedCarrierFreqCombListNR                              OPTIONAL,
        victimSystemType                        VictimSystemType
    }
    nru-AssistanceInfo                      SEQUENCE {
        affectedCarrierFreqCombListNRU          AffectedCarrierFreqCombListNRU                             OPTIONAL,
        victimSystemType                        VictimSystemType
    }
    affectedCarrierFreqCombListNR           AffectedCarrierFreqCombListNR                                  OPTIONAL,
    affectedCarrierFreqCombListNRU          AffectedCarrierFreqCombListNRU                                 OPTIONAL,
    hardwareSharingProblem                  ENUMERATED {true}                                              OPTIONAL,
    hardwareSharingProblemNR                ENUMERATED {true}                                              OPTIONAL,
    hardwareSharingProblemNRU               ENUMERATED {true}                                              OPTIONAL,
}
AffectedCarrierFreqListNR               ::= SEQUENCE (SIZE (1..maxFreqIDCNR)) OF AffectedCarrierFreqNR
AffectedCarrierFreqListNRU              ::= SEQUENCE (SIZE (1..maxFreqIDCNRU)) OF AffectedCarrierFreqNRU
AffectedCarrierFreqNR ::=               SEQUENCE {
    carrierFreq                             CHOICE {
        servingCellFreq                         ENUMERATED {MeasObjectId, ARFCN-Value},
        nonServingCellFreq                      ENUMERATED {MeasObjectId, ARFCN-Value},
    },
    interferenceDirection                   ENUMERATED {NR, eutra, nru, laa, wlan, other, all, spare, SUL}
    AffectedDlBWPList                       SEQUENCE (SIZE(1..maxNrofIDCAffectedDlBWPs)) OF BWP-Id         optional
    AffectedUlBWPList                       SEQUENCE (SIZE(1..maxNrofIDCAffectedUlBWPs)) OF BWP-Id         optional
}
AffectedCarrierFreqNRU ::=               SEQUENCE {
    carrierFreq                             CHOICE {
        servingCellFreq                         ENUMERATED {MeasObjectId, ARFCN-Value, Unlicensed_channel_Id},
        nonServingCellFreq                      ENUMERATED {MeasObjectId, ARFCN-Value, Unlicensed_channel_Id},
    },
    interferenceDirection                   ENUMERATED {NR, eutra, nru, laa, wlan, other, all, spare, SUL}
    AffectedDlNRUBWPList                    SEQUENCE (SIZE(1..maxNrofIDCAffectedDlNRUBWPs)) OF BWP-Id      optional
    AffectedUlNRUBWPList                    SEQUENCE (SIZE(1..maxNrofIDCAffectedULNRUBWPs)) OF BWP-Id      optional
}
```

In embodiments, maxFreqIDCNRU may be a maximum unlicensed frequency that may be affected by IDC in the NR. MaxFreqIDCNRU may have the same value as maxFreqIDCNR, and in this case, maxFreqIDCNR and maxFreqIDCNRU may be replaced with one constant (maxFreqIDC).

In embodiments, the carrier frequency may allow the terminal to specify a frequency through a Measurement Object Id or Absolute Radio-Frequency Channel Number (ARFCN) value for an NR-U serving cell and a non-serving cell.

InterferenceDirection may be used to indicate a victim radio system affected by interference due to IDC. AffectedDINRUBWPList may be used to indicate victim downlink BWPs affected by interference due to IDC. AffectedDIN-RUBWPList may be used to indicate victim uplink BWPs affected by interference due to IDC.

In embodiments, lists such as AffectedDINRUBWPList and AffectedUINRUBWPList may be provided in the following form, such as AffectedDINRUBWP and AffectedU-INRUBWP, to configure only one value as shown in Table 12.

TABLE 12

| AffectedDINRUBWP | BWP-Id | optional |
| AffectedUINRUBWP | BWP-Id | optional |

Moreover, the IDC information signal (InDeviceCoex-Indication) generated by the terminal and reported to the network, which is considered in the IDC transmission signal generation procedure of the terminal, may include assistance information affected by NR-U-related IDC as shown in Table 13.

TABLE 13

```
nru-AssistanceInfo                      SEQUENCE {
    affectedCarrierFreqCombListNRU          AffectedCarrierFreqCombListNRU
        OPTIONAL,
    victimSystemType                        VictimSystemType
}
```

In embodiments, the NR-U-related assistance information may include information about a combination of carrier frequencies affected by the IDC detected in the NR-U, as a field "affectedCarrierFreqCombListNRU", which may include frequency combinations (AffectedCarrierFreqCombNRU) affected by the maximum maxCombIDCNRU number.

Also, AffectedCarrierFreqCombNRU may include two or more, up to maxServCell or less pieces of uplink (UL) frequency information (AffectedCarrierFreqULNRU). Here, the UL frequency information (AffectedCarrierFreqULNRU) may include a carrier frequency, a SUL indicator, AffectedUINRUBWPList, and the like.

TABLE 14

```
AffectedCarrierFreqCombListNRU    ::= sequence (size (1..maxCombIDCNRU)) OF
AffectedCarrierFreqCombNRU
AffectedCarrierFreqCombNRU    ::=  SEQUENCE (SIZE (2..maxServCell)) OF
AffectedCarrierFreqULNRU
AffectedCarrierFreqULNRU   ::=     SEQUENCE {
    carrierFreq                       CHOICE {
            servingCellFreq              ENUMERATED {MeasObjectId, ARFCN-Value,
Unlicensed_channel_Id },
            nonServingCellFreq           ENUMERATED {MeasObjectId, ARFCN-Value,
Unlicensed_channel_Id },
    },
    SUL indicator                 Enumerated{FFS}      OPTIONAL,  --Cond UL
CA
    AffectedUlNRUBWPList          EQUENCE(SIZE; (1..maxNrofIDCAffectingULBWPs)
) OF BWP-Id     OPTIONAL,
}
```

In embodiments, UL CA-related assistance information may include victimSystemType damaged due to the IDC detected in the UL CA, which may be as shown in Table 15.

TABLE 15

```
VictimSyStemType ::= SEQUENCE {
    NR         ENUMERATED{true}       OPTIONAL,
    eutra      ENUMERATED{true}       OPTIONAL,
    nru        ENUMERATED{true}       OPTIONAL,
    laa        ENUMERATED{true}        OPTIONAL,
    gps        ENUMERATED{true}       OPTIONAL,
    glonass    ENUMERATED{true}       OPTIONAL,
    bds        ENUMERATED{true}       OPTIONAL,
    gallileo   ENUMERATED{true}       OPTIONAL,
    wlan       ENUMERATED{true}       OPTIONAL,
    bluetooth  ENUMERATED{true}       OPTIONAL,
}
```

The terminal may transmit the IDC information signal (InDeviceCoexIndication) to the network. In embodiments, a procedure of generating, by the terminal, the IDC information signal may be as shown in Table 16 below.

TABLE 16

The terminal may generate an InDeviceCoexIndication signal as follows.

1> If an NR-U carrier frequency configured with one or more measurement object NRUs experiences an IDC problem:

2> Includes an affectedCarrierFreqListNRU field with respect to an NR-U carrier frequency configured with each measurement object NRU affected by IDC problems;

2> Includes and configures an interferenceDirection field with respect to an NR-U carrier frequency included in each affectedCarrierFreqListNRU;

1> If the terminal is configured to provide NR-U information and there is an NR-U combination configured with one or more measurement object NRUs affected by IDC problems:

TABLE 16-continued

2> Includes victimSystemType in nru-AssistanceInfo;
2> If the terminal configures victimSystemType as nru or laa or wlan or
Bluetooth:
3> Includes affectedCarrerFreqCombListNRU if there is an NRU
combination configured with one or more measurement object NRUs affected
by IDC problems in nru-AssistanceInfo;
2> Otherwise (i.e., if the terminal does not configure victimSystemType as
nru or laa or wlan or Bluetooth):
3> Selectively includes affectedCarrierFreqCombListNRU if there is an
NRU combination configured with one or more measurement object NRUs
affected by IDC problems in nru-AssistanceInfo;
1> If idc-HardwareSharingIndicationNRU is configured and an NR-U
frequency configured with one or more measurement objects experiences a
hardware problem that is unsolvable by the terminal:
2> Includes hardwareSharingProblemNRU and suitably sets.

Figure 12:
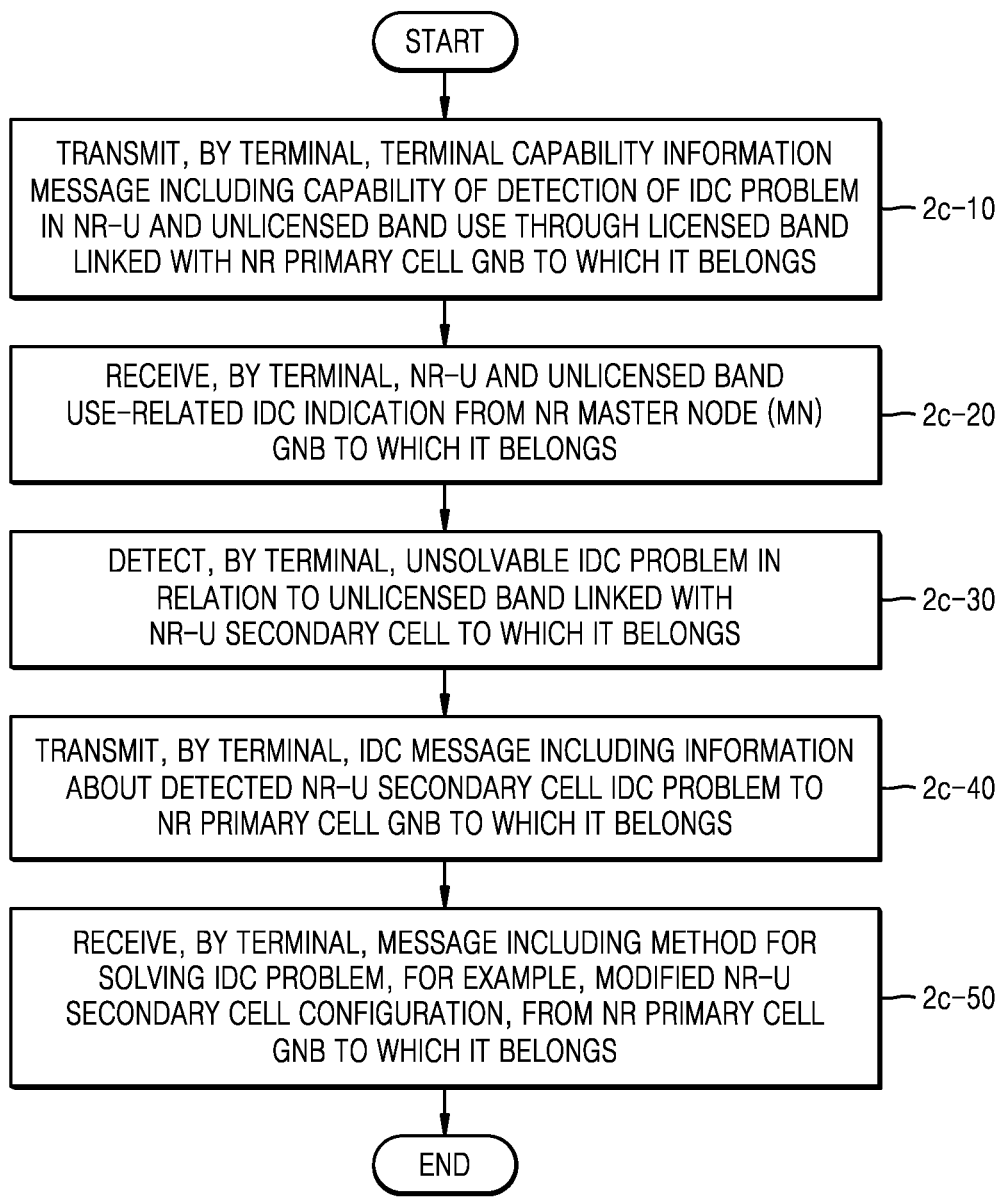
FIG. 12 is a diagram illustrating a procedure of transmitting, by a terminal, capability information to a network, according to an embodiment.

FIG. 12 is a diagram illustrating a procedure of transmitting, by a terminal, capability information to a network, according to an embodiment. Referring to FIG. 12, by using a licensed band, the terminal may be connected to an NR primary cell to communicate with an NR gNB. The terminal connected to the NR primary cell may be simultaneously connected to an NR-U secondary cell, and the terminal having this capability may have the NR-U-related capability and the capability to detect an NR-U IDC problem.

In operation 2c-10, the terminal may notify the terminal capability to the gNB by providing UECapabilityInforamtion to the NR primary cell gNB by using a licensed band, and in operation 2c-20, the gNB knowing the terminal capability may configure NR-U secondary cell-related IDC information provision to the terminal by transmitting an RRC signal in the licensed band.

In operation 2c-30, the terminal configured with the IDC information provision may monitor whether a configured IDC problem occurs in the NR-U secondary cell and the unlicensed band. When an unsolvable IDC problem occurs, in operation 2c-40, a report signal including related information may be generated and reported to the NR primary cell gNB through the licensed band.

In operation 2c-50, the gNB having receiving the IDC problem report may transmit a message including a method for solving the NR-U secondary cell-related IDC problem, for example, the changed configuration of the NR-U secondary cell or the like, to the terminal through the licensed band to solve the IDC problem described above.

However, the primary cell of the licensed band described above may be an E-UTRA LTE cell as well as an NR cell, and the gNB may be an eNB.

Figure 13:
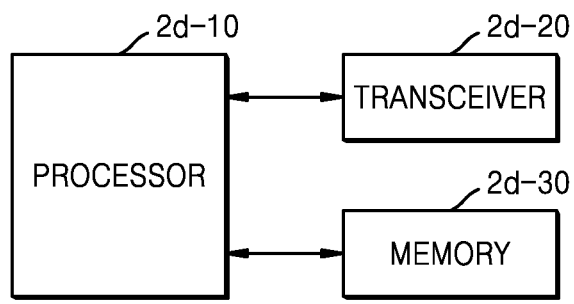
FIG. 13 is a block diagram illustrating a structure of a terminal according to an embodiment.

FIG. 13 is a block diagram illustrating a structure of a terminal according to an embodiment. Referring to FIG. 13, the terminal may include a transceiver 2d-20, a memory 2d-30, and a processor 2d-10. The transceiver 2d-20, the memory 2d-30, and the processor 2d-10 of the terminal may operate according to the communication method of the terminal described above. However, the components of the terminal are not limited thereto. For example, the terminal may include more components or fewer components than the above components. In addition, the transceiver 2d-20, the memory 2d-30, and the processor 2d-10 may be implemented as a single chip.

The transceiver 2d-20 may exchange signals with the base station. Here, the signals may include control information and data. For this purpose, the transceiver 2d-20 may include, for example, an RF transmitter for up-converting and amplifying a transmitted signal and an RF receiver for low-noise-amplifying and down-converting a received signal. However, this is merely an embodiment of the transceiver 2d-20, and the components of the transceiver 2d-20 are not limited to the RF transmitter and the RF receiver.

Also, the transceiver 2d-20 may receive a signal through a radio channel and output the signal to the processor 2d-10 and may transmit a signal output from the processor 2d-10, through a radio channel.

The memory 2d-30 may store programs and data necessary for the operation of the terminal. Also, the memory 2d-30 may store control information or data included in the signals obtained by the terminal. The memory 2d-30 may include a storage medium or a combination of storage media such as ROM, RAM, hard disk, CD-ROM, and DVD.

The processor 2d-10 may control a series of processes such that the terminal may operate according to the above embodiments. According to some embodiments, the processor 2d-10 may control the components of the terminal to perform synchronization by determining a transmission period and a synchronization signal, a synchronization signal offset, and a window duration of a synchronization signal block based on the information included in the synchronization signal block (SSB) received from the base station through the transceiver 2d-20.

Also, the processor 2d-10 may control the components of the terminal to determine whether an IDC problem has occurred, based on information for configuring Dual Connectivity (DC), Bandwidth Part (BWP), and Supplementary Uplink (SUL)-related IDC report included in the idc-Config message included in the RRCConfiguration signal received from the base station, generate, when it is determined that the IDC problem has occurred, a report signal including information about the IDC problem, and transmit the same to the base station.

Figure 14:
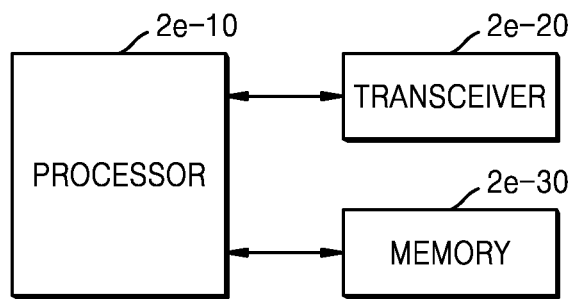
FIG. 14 is a block diagram illustrating a structure of a base station according to an embodiment.

FIG. 14 is a block diagram illustrating a structure of a base station according to an embodiment. Referring to FIG. 14, the base station may include a transceiver 2e-20, a memory 2e-30, and a processor 2e-10. The transceiver 2e-20, the memory 2e-30, and the processor 2e-10 of the base station may operate according to the communication method of the base station described above. However, the components of the base station are not limited thereto. For example, the base station may include more components or fewer components than the above components. In addition, the transceiver 2e-20, the memory 2e-30, and the processor 2e-10 may be implemented as a single chip.

The transceiver 2e-20 may exchange signals with the terminal. Here, the signals may include control information and data. For this purpose, the transceiver 2e-20 may include, for example, an RF transmitter for up-converting and amplifying a transmitted signal and an RF receiver for low-noise-amplifying and down-converting a received signal. However, this is merely an embodiment of the transceiver 2e-20, and the components of the transceiver 2e-20 are not limited to the RF transmitter and the RF receiver.

Also, the transceiver 2e-20 may receive a signal through a radio channel and output the signal to the processor 2e-10 and may transmit a signal output from the processor 2e-10, through a radio channel.

The memory 2e-30 may store programs and data necessary for the operation of the base station. Also, the memory 2e-30 may store control information or data included in the signals obtained by the base station. The memory 2e-30 may include a storage medium or a combination of storage media such as ROM, RAM, hard disk, CD-ROM, and DVD.

The processor 2e-10 may control a series of processes such that the base station may operate according to the above embodiments of the disclosure. According to some embodiments, the processor 2e-10 may control the components of the base station to configure an SSB burst length having a particular time length in relation to transmission of a synchronization signal block (SSB), configure a window duration including a plurality of durations based on the SSB burst length, configure a time point at which a synchronization signal block is transmitted within a plurality of durations, perform Listen-Before-Talk (LBT), and transmit, when succeeding in the LBT, the synchronization signal block to the terminal based on the LBT success time point and the time point of transmitting the configured synchronization signal block within the plurality of durations.

Also, the processor 2e-10 may control the components of the base station to transmit the RRCConfiguration signal including the idc-Config message to the terminal.

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored in a memory including a combination of some or all of such storage devices. Also, each of the memories may include a plurality of memories.

Also, the programs may be stored in an attachable storage device that may be accessed through a communication network such as Internet, Intranet, local area network (LAN), wide LAN (WLAN), or storage area network (SAN), or through a communication network configured as any combination thereof. Such a storage device may be connected through an external port to an apparatus performing embodiments of the disclosure. Also, a separate storage device on a communication network may be connected to an apparatus performing embodiments of the disclosure.

Figure 15:
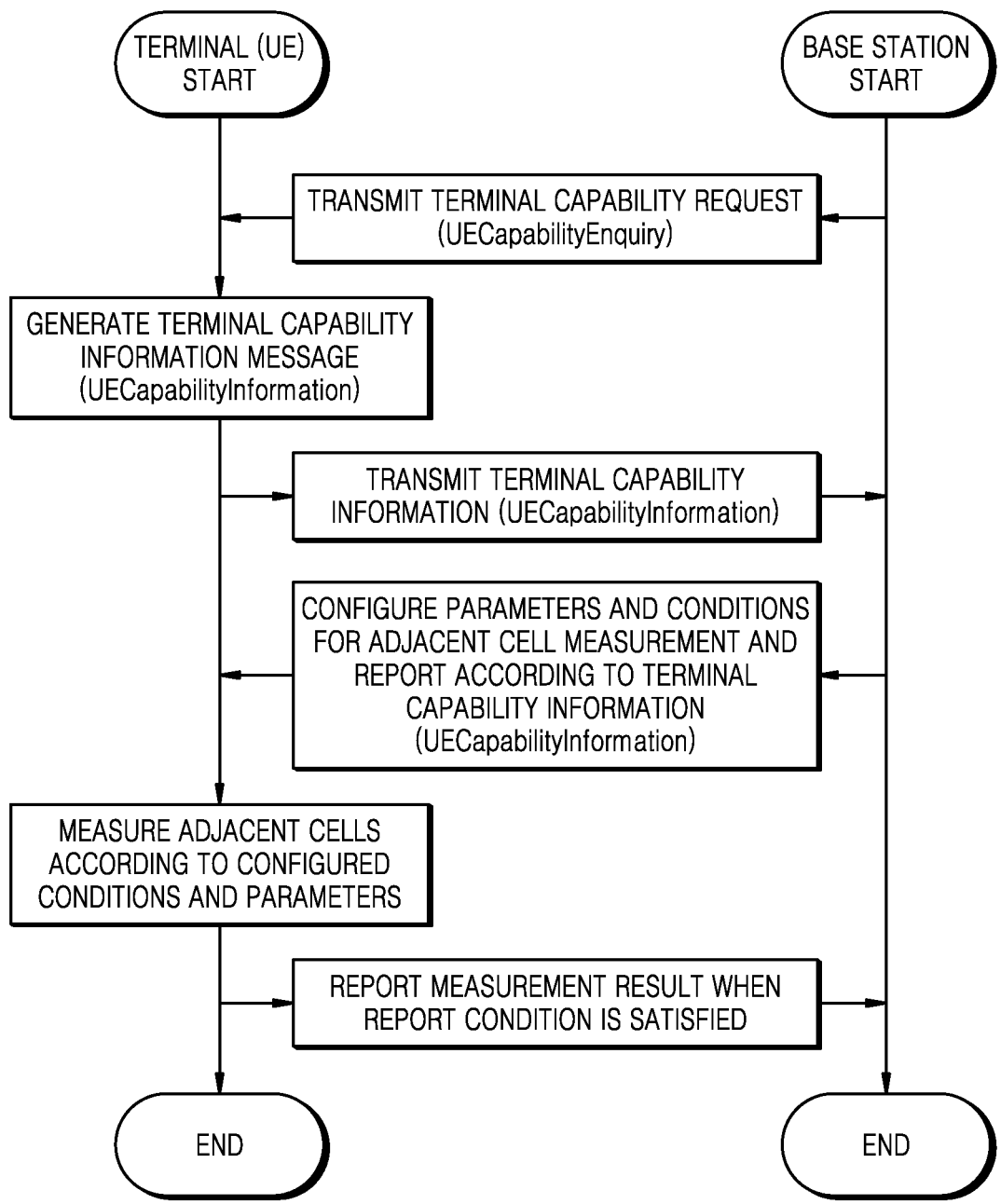
FIG. 15 is a diagram illustrating a model in which a terminal measures and reports the quality of adjacent cells, according to some embodiments of the disclosure.

FIG. 15 is a diagram illustrating a model in which a terminal measures and reports the quality of adjacent cells, according to an embodiment of the disclosure.

First, the terminal may receive a signal for requesting transmission of the terminal capability, for example, a UE Capability Enquiry signal, from the base station. Upon receiving the UE Capability Enquiry signal, the terminal may generate a UE Capability Information message and transmit the same to the base station. In this case, when the terminal is, for example, an aerial UE capable of flying, the terminal capability information may be included in the terminal capability information message and transmitted to the base station.

For example, the base station having receiving the terminal capability information may additionally configure parameters for measuring and reporting adjacent cells according to whether the terminal is capable of flying, and transmit the configured parameter information to the terminal. In this case, the base station may configure, to the terminal, various parameters such as numberOfTriggeringBeams, numberOfTriggeringBWPs, numberOfTriggeringCells, Threshold_Beam, Threshold_BWP, and Threshold_Cell, by downlink signals (e.g., RRC signals such as reportConfig in an RRC Reconfiguration signal, MAC signals such as MAC-Control Element (MAC-CE), or Physical Layer (PHY) signals such as DataCenter Interconnect (DCI) signals).

The terminal may receive a message from the base station and measure adjacent cells according to the parameter configuration for measuring and reporting the adjacent cells. Here, the adjacent cells may refer to cells within a certain range of the terminal. When the adjacent cell measurement result satisfies the report condition, the terminal may report the measurement result to the base station.

The terminal may receive various parameters configured from the network according to the capability of the terminal and measure adjacent cells according to the configurations to perform an optimized adjacent cell measurement and report suitable for its capability.

In the following embodiments, whether the terminal performs operations to measure and report adjacent cells when configured with parameters will be described in detail.

Figure 16:
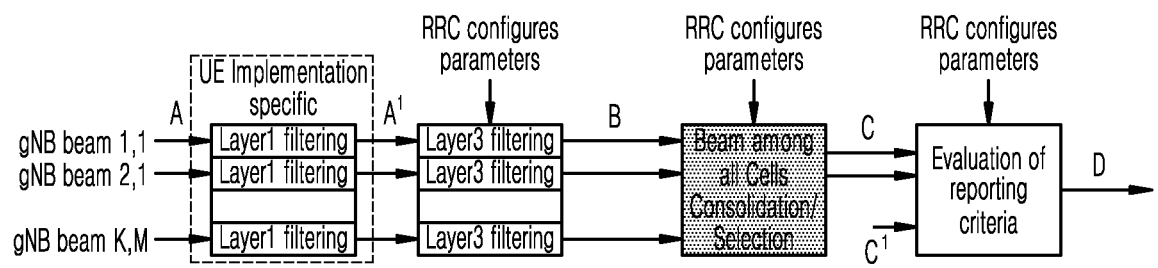
FIG. 16 is a diagram illustrating a model in which a terminal measures and reports the quality of adjacent beams, according to some embodiments of the disclosure.

FIG. 16 is a diagram illustrating a model in which a terminal measures and reports the quality of adjacent beams.

Referring to FIG. 16, the terminal may transmit a measurement report to the base station when the quality of beams measured regardless of cells satisfies particular conditions configured by the base station.

The terminal may measure all beams observed from adjacent cells by measuring each base station reference signal that is periodically received. For example, beam values may be measured for up to K beams for each cell with respect to up to M cells. The terminal may perform measurement on a synchronization or reference signal such as Single Side Band (SSB) or Channel State Information Reference Signal (CSI-RS) having the same ID indicating a distinguishable base station beam.

The maximum beam number K and the maximum cell number M to be measured by the terminal may be configured from the base station through an RRC signal such as an RRC Reconfiguration signal, or may be configured and received by using a MAC signal such as MAC-CE or a PHY signal such as DCI.

The terminal may perform Layer 1 filtering on each measured base station beam.

Thereafter, the terminal may perform L3 filtering on each base station beam on which the Layer 1 filtering has been performed. The base station may configure a particular weight factor to the terminal with a downlink signal (e.g., an RRC signal, a MAC signal, or a PHY signal), and the terminal may perform the Layer 3 filtering by using the configured weight factor.

Thereafter, the terminal may perform beam selection on the filtered beam measurement values. For beam selection, the base station may configure, to the terminal, a beam measurement threshold value such as Threshold_Beam with a downlink signal (e.g., an RRC signal such as reportConfig in an RRC Reconfiguration signal, a MAC signal such as MAC-CE, or a PHY signal such as a DCI signal), and the terminal may select beams having a measurement value exceeding Threshold_Beam according to the configured parameter.

Threshold_Beam may be configured as different values according to SSBs or CSI-RSs, and one or more threshold values may be configured for such different types of beams.

Thereafter, the terminal may perform a measurement report by using the filtered and selected beams.

The terminal may trigger the measurement report through the following procedure according to the parameter configured from the base station:

The terminal may be configured with a parameter for measurement. According to an embodiment, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBeams, and an entry condition is applicable to the event, for example, in the case where the measured value has a measurement value exceeding Threshold_Beam or in the case where the entry condition is satisfied for one or more beams regardless of the cell to which each beam belongs;

when the measurement report related to the measId is not included in VarMeasReportList, a measurement report may be generated and included in the VarMeasReportList associated with the measId.

When the number of beams currently included in the beamsTriggeredList is greater than or equal to numberOfTriggeringBeams, transmission of the measurement report may be triggered.

NumberOfTriggeringBeams may be configured as different values according to SSBs or CSI-RSs, and one or more numberOfTriggeringBeams values may be configured for different types of beams.

In the measurement report, the terminal may report the network of information about as many beams as the number of numberOfTriggeringBeams including, for example, a beam ID, a corresponding cell ID, and a measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

The parameter for the measurement report may be configured by the base station only when the terminal is a flyable terminal, and the base station may receive the terminal capability information to recognize that the terminal is a flyable terminal.

Figure 17:
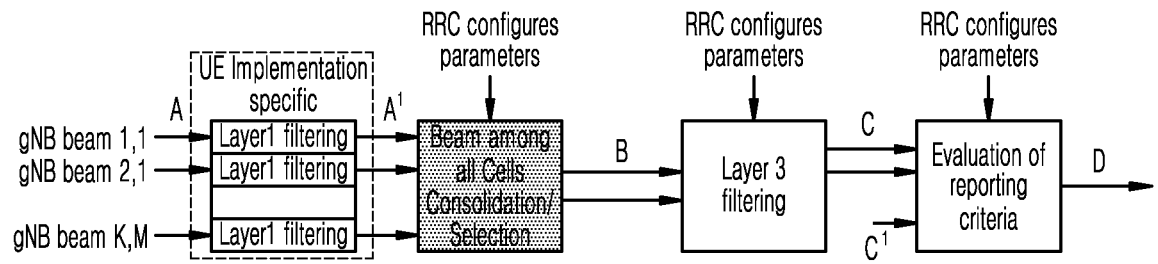
FIG. 17 is a diagram illustrating a model in which a terminal measures and reports the quality of adjacent beams, according to some embodiments of the disclosure.

FIG. 17 is a diagram illustrating a model in which a terminal measures and reports the quality of adjacent beams.

The terminal may measure all beams observed from adjacent cells by measuring each base station reference signal that is periodically received. For example, beam values may be measured for up to K beams for each cell with respect to up to M cells. The terminal may perform measurement on a synchronization or reference signal such as SSB or CSI-RS having the same ID indicating a distinguishable base station beam.

The maximum beam number K and the maximum cell number M to be measured by the terminal may be configured from the base station through an RRC signal such as an RRC Reconfiguration signal, or may be configured and received by using a MAC signal such as MAC-CE or a PHY signal such as DCI.

The terminal may perform Layer 1 filtering on each measured base station beam.

Thereafter, the terminal may perform beam selection on the filtered beam measurement values. For beam selection, the base station may configure, to the terminal, a beam measurement threshold value such as Threshold_Beam with a downlink signal (e.g., an RRC signal such as reportConfig in an RRC Reconfiguration signal, a MAC signal such as MAC-CE, or a PHY signal such as a DCI signal), and the terminal may select beams having a measurement value exceeding Threshold_Beam according to the configured parameter.

Threshold_Beam may be configured as different values according to SSBs or CSI-RSs, and one or more threshold values may be configured for such different types of beams.

Thereafter, the terminal may perform L3 filtering on each selected base station beam. The base station may configure a particular weight factor to the terminal with a downlink signal (e.g., an RRC signal, a MAC signal, or a PHY signal), and the terminal may perform the Layer 3 filtering by using the configured weight factor.

Thereafter, the terminal may perform a measurement report by using the filtered and selected beams. In this case, the base station may configure, to the terminal, a beam count such as numberOfTriggeringBeams with a downlink signal (e.g., an RRC signal such as reportConfig in an RRC Reconfiguration signal, a MAC signal such as MAC-CE, or a PHY signal such as a DCI signal).

The terminal may trigger the measurement report through the following procedure according to the configured parameter:

The terminal may be configured with a measurement parameter configured to the terminal for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBeams, and an entry condition is applicable to the event, for example, in the case where the measured value has a measurement value exceeding Threshold_Beam or in the case where the entry condition is satisfied for one or more beams regardless of the cell to which each beam belongs;

when the measurement report related to the measId is not included in VarMeasReportList, a measurement report may be generated and included in the VarMeasReportList associated with the measId.

When the number of beams currently included in the beamsTriggeredList is greater than or equal to numberOfTriggeringBeams, transmission of the measurement report may be triggered.

NumberOfTriggeringBeams may be configured as different values according to SSBs or CSI-RSs, and one or more numberOfTriggeringBeams values may be configured for such different types of beams.

In the measurement report, the terminal may report the network of information about as many beams as the number of numberOfTriggeringBeams including, for example, a beam ID, a corresponding cell ID, and a measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

In FIG. 17, by performing L3 filtering after beam selection, the number of times the L3 filtering is performed may be reduced compared to FIG. 16 to reduce the power consumption and processing time of the terminal.

Figure 18:
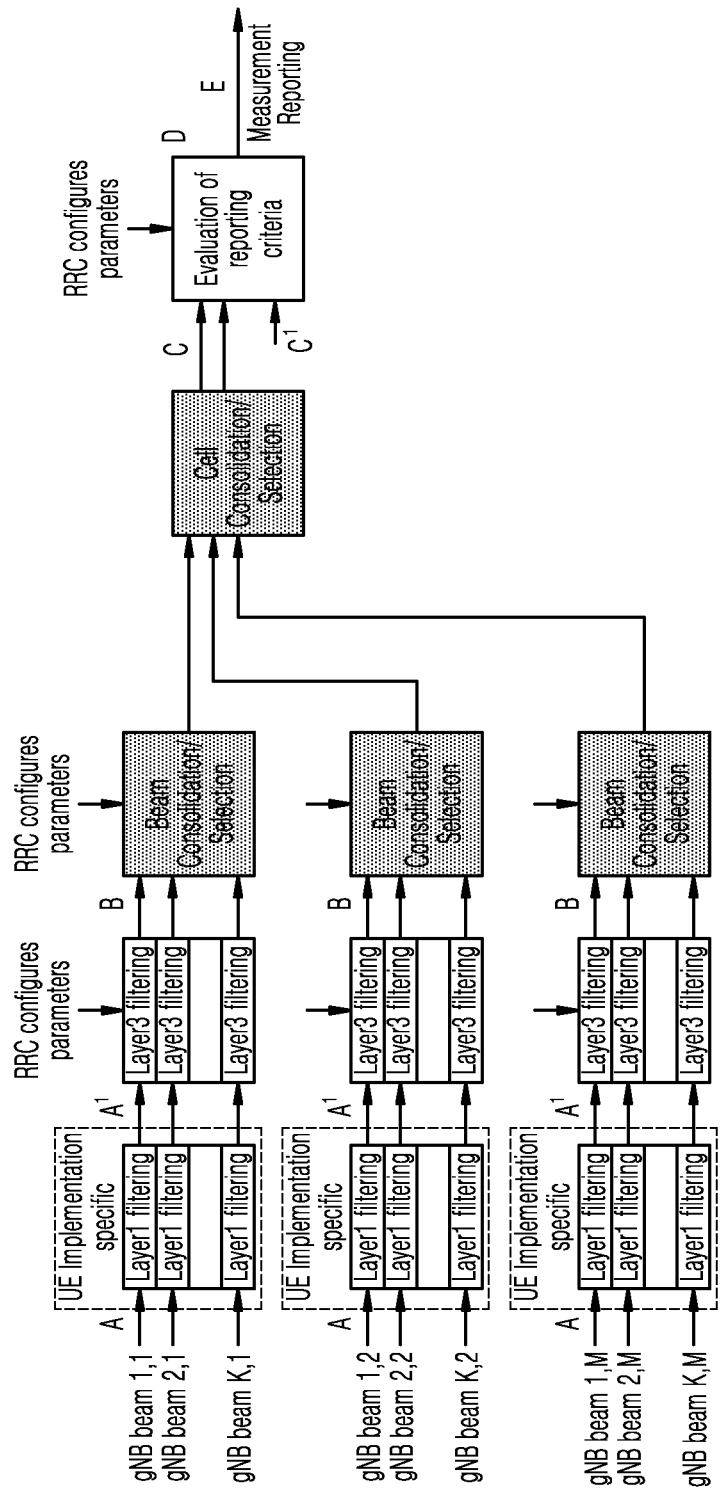
FIG. 18 is a diagram illustrating a model in which a terminal measures and reports the quality of adjacent beams, according to some embodiments of the disclosure.

FIG. 18 is a diagram illustrating a model in which a terminal measures and reports the quality of adjacent beams.

The terminal may measure all beams observed from adjacent cells by measuring each base station reference signal that is periodically received. For example, beam values may be measured for up to K beams for each cell with respect to up to M cells. The terminal may perform measurement on a synchronization or reference signal such as SSB or CSI-RS having the same ID indicating a distinguishable base station beam.

The terminal may be configured with the maximum beam number K and the maximum cell number M to be measured, from the base station through an RRC signal such as an RRC Reconfiguration signal, or may be configured by receiving a MAC signal such as MAC-CE or a PHY signal such as DCI.

The terminal may perform Layer 1 filtering on each measured base station beam.

Thereafter, the terminal may perform L3 filtering on each base station beam on which the Layer 1 filtering has been performed. The base station may configure a particular weight factor to the terminal with a downlink signal (e.g., an RRC signal, a MAC signal, or a PHY signal), and the terminal may perform the Layer 3 filtering by using the configured weight factor.

Thereafter, the terminal may perform beam selection on the filtered beam measurement values. For beam selection, the base station may configure, to the terminal, a beam measurement threshold value such as Threshold_Beam with a downlink signal (e.g., an RRC signal such as reportConfig in an RRC Reconfiguration signal, a MAC signal such as MAC-CE, or a PHY signal such as a DCI signal), and the terminal may select beams having a measurement value exceeding Threshold_Beam according to the configured parameter.

Threshold_Beam may be configured as different values according to SSBs or CSI-RSs, and one or more threshold values may be configured for different types of beams.

Thereafter, the terminal may perform cell selection by using information about beams selected for each cell. For cell selection, the base station may configure, to the terminal, a cell count such as numberOfTriggeringBeams with a downlink signal (e.g., an RRC signal such as reportConfig in an RRC Reconfiguration signal, a MAC signal such as MAC-CE, or a PHY signal such as a DCI signal), and the terminal may select cells in which the number of beams having a measurement value, which is measured in each cell, exceeding Threshold_Beam is greater than or equal to numberOfTriggeringBeams, according to the configured parameter.

Thereafter, the terminal may perform a measurement report by using the filtered and selected cells. In this case, the base station may configure, to the terminal, a cell count such as numberOfTriggeringCells with a downlink signal (e.g., an RRC signal such as reportConfig in an RRC Reconfiguration signal, a MAC signal such as MAC-CE, or a PHY signal such as a DCI signal).

The terminal may trigger the measurement report through the following procedure according to the configured parameter:

According to an embodiment, the terminal may be configured with a parameter for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBeams and numberOfTriggeringCells, and an entry condition is applicable to the event, for example, in the case where there is/are one or more cells in which the number of beams having a measurement value, which is measured in each cell, exceeding Threshold_Beam is greater than or equal to numberOfTriggeringBeams;

when the measurement report related to the measId is not included in VarMeasReportList, a measurement report may be generated and included in the VarMeasReportList associated with the measId.

When the number of cells currently included in the cellsTriggeredList is greater than or equal to numberOfTriggeringCells, transmission of the measurement report may be triggered.

NumberOfTriggeringBeams and numberOfTriggeringCells may be configured as different values according to SSBs or CSI-RSs, and one or more numberOfTriggeringBeams and numberOfTriggeringCells values may be configured for different types of beams.

In the measurement report, the terminal may report the network of information about as many cells as the number of numberOfTriggeringCells including, for example, a cell ID and a cell measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

In the measurement report, the terminal may report the network of information about as many beams as the number of numberOfTriggeringBeams including, for example, a beam ID, a corresponding cell ID, and a beam measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

Figure 19:
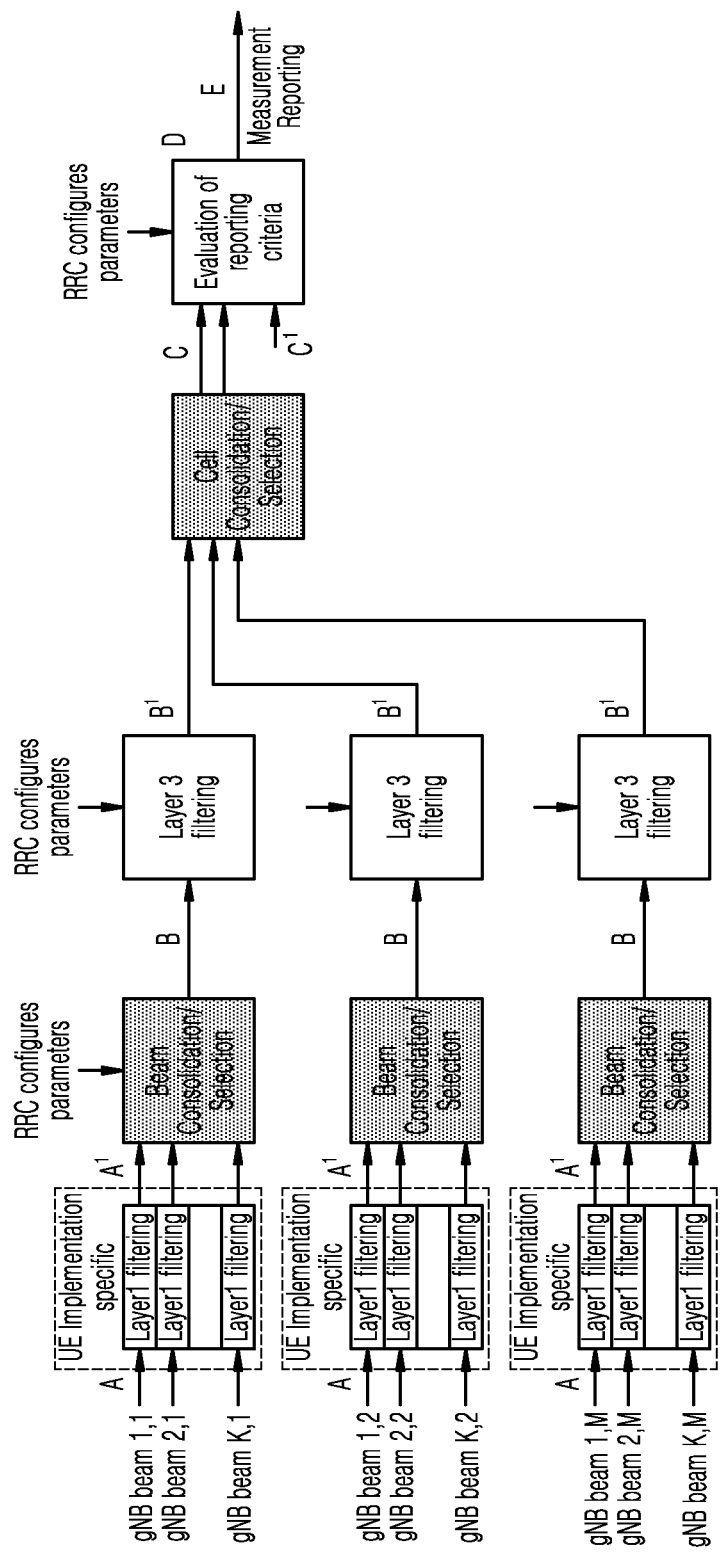
FIG. 19 is a diagram illustrating a model in which a terminal measures and reports the quality of adjacent beams, according to some embodiments of the disclosure.

FIG. 19 is a diagram illustrating a model in which a terminal measures and reports the quality of adjacent beams.

The terminal may measure all beams observed from adjacent cells by measuring each base station reference signal that is periodically received. For example, beam values may be measured for up to K beams for each cell with respect to up to M cells. The terminal may perform measurement on a synchronization or reference signal such as SSB or CSI-RS having the same ID indicating a distinguishable base station beam.

The maximum beam number K and the maximum cell number M to be measured by the terminal may be configured from the base station through an RRC signal such as an RRC Reconfiguration signal, or may be configured and received by using a MAC signal such as MAC-CE or a PHY signal such as DCI.

The terminal may perform Layer 1 filtering on each measured base station beam.

Thereafter, the terminal may perform beam selection on the filtered beam measurement values. For beam selection, the base station may configure, to the terminal, a beam measurement threshold value such as Threshold_Beam with a downlink signal (e.g., an RRC signal such as reportConfig in an RRC Reconfiguration signal, a MAC signal such as MAC-CE, or a PHY signal such as a DCI signal), and the terminal may select beams having a measurement value exceeding Threshold_Beam according to the configured parameter.

Threshold_Beam may be configured as different values according to SSBs or CSI-RSs, and one or more threshold values may be configured for different types of beams.

Thereafter, the terminal may perform L3 filtering on each selected base station beam. For the L3 filtering, the base station may configure a particular weight factor to the terminal with a downlink signal (e.g., an RRC signal, a MAC signal, or a PHY signal), and the terminal may perform the Layer 3 filtering by using the configured weight factor.

Thereafter, the terminal may perform cell selection by using information about beams selected for each cell. In this case, the base station may configure, to the terminal, a cell count such as numberOfTriggeringBeams with a downlink signal (e.g., an RRC signal such as reportConfig in an RRC Reconfiguration signal, a MAC signal such as MAC-CE, or a PHY signal such as a DCI signal), and the terminal may select cells in which the number of beams having a measurement value, which is measured in each cell, exceeding Threshold_Beam is greater than or equal to numberOfTriggeringBeams, according to the configured parameter.

Thereafter, the terminal may trigger the measurement report through the following procedure according to the configured parameter:

According to an embodiment, the terminal may configure a configuration measurement parameter to the terminal for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBeams and numberOfTriggeringCells, and an entry condition is applicable to the event, for example, in the case where there is/are one or more cells in which the number of beams having a measurement value, which is measured in each cell, exceeding Threshold_Beam is greater than or equal to numberOfTriggeringBeams;
   when the measurement report related to the measId is not included in VarMeasReportList, a measurement report may be generated and included in the VarMeasReportList associated with the measId.

When the number of cells currently included in the cellsTriggeredList is greater than or equal to numberOfTriggeringCells, transmission of the measurement report may be triggered.

NumberOfTriggeringBeams may be configured as different values according to SSBs or CSI-RSs, and one or more numberOfTriggeringBeams values may be configured for such different types of beams.

In the measurement report, the terminal may report the network of information about as many cells as the number of numberOfTriggeringCells including, for example, a cell ID and a cell measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

In the measurement report, the terminal may report the network of information about as many beams as the number of numberOfTriggeringBeams including, for example, a beam ID, a corresponding cell ID, and a beam measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

In FIG. 19, by performing L3 filtering after beam selection, the number of times the L3 filtering is performed may be reduced compared to FIG. 18 to reduce the power consumption and processing time of the terminal.

Figure 20:
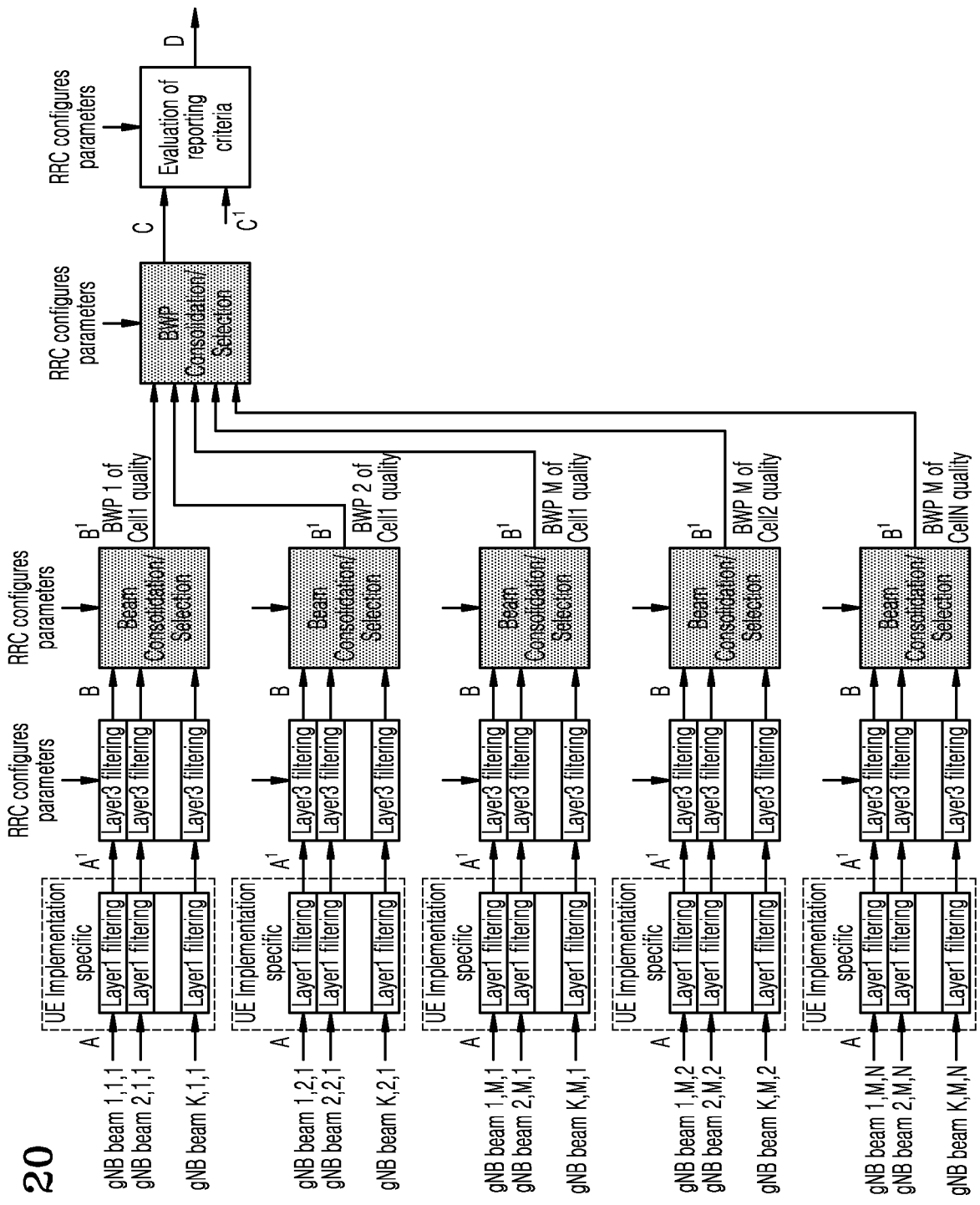
FIG. 20 is a diagram illustrating a model in which a terminal measures and reports the quality of adjacent bandwidth parts (BWPs), according to some embodiments of the disclosure.

FIG. 20 is a diagram illustrating a model in which a terminal measures and reports the quality of adjacent BWPs.

The terminal may measure all beams observed from BWPs included in adjacent cells by measuring each base station reference signal that is periodically received. For example, beam values may be measured for up to K beams for each BWP among up to M BWPs for each cell with respect to up to N cells. The terminal may perform measurement on a synchronization or reference signal such as SSB or CSI-RS having the same ID indicating a distinguishable base station beam.

The maximum beam number K, the maximum BWP number M, and the maximum cell number N to be measured by the terminal may be configured from the base station through an RRC signal such as an RRC Reconfiguration signal, or may be configured and received by using a MAC signal such as MAC-CE or a PHY signal such as DCI.

The terminal may perform Layer 1 filtering on each measured base station beam.

Thereafter, the terminal may perform L3 filtering on each base station beam on which the Layer 1 filtering has been performed. In this case, the base station may configure a particular weight factor to the terminal with a downlink signal (e.g., an RRC signal, a MAC signal, or a PHY signal), and the terminal may perform the Layer 3 filtering by using the configured weight factor.

Thereafter, in order to derive a single measurement value for determining the quality of each BWP, the terminal may derive one BWP quality measurement value through a beam selection and merging process with respect to a plurality of beams included in each BWP. In the beam selection and merging process, the terminal may derive a single BWP quality measurement value by comparing and selecting the beams through the following method:
   1. A method of selecting a beam measurement value having the best measurement value.

2. A method of selecting a beam measurement value having the best measurement value among the beam measurement values having a value greater than or equal to a particular threshold value configured by the base station with a downlink signal (e.g., an RRC signal, a MAC signal, or a PHY signal). In this case, when there is no beam measurement value having a measurement value greater than or equal to the threshold value, the terminal may determine that the corresponding BWP is not suitable for use.
3. A method of selecting and averaging N sequential beam measurement values having good measurement values from the beam having the best measurement value.
4. A method of selecting beam measurement values having a value greater than or equal to a particular threshold value configured by the base station with a downlink signal (e.g., an RRC signal, a MAC signal, or a PHY signal) and selecting and averaging N sequential beam measurement values having good measurement values from the beam having the best measurement value among the selected beam measurement values. In this case, when there are less than N beams greater than or equal to the threshold value, only these beams may be selected and averaged. In this case, when there is no beam greater than or equal to the threshold value, the terminal may determine that the corresponding BWP is not suitable for use.

In order to derive a BWP quality measurement value, when all or some of necessary parameters such as the maximum number of beams to be averaged, the beam aggregation threshold value, and the reference signal type are not configured, the terminal may not perform such derivation and may simply derive a BWP value with a beam value having the best quality. Otherwise, when all or some of the necessary parameters are configured, the terminal may perform a given operation among the above operations. In this case, the terminal may perform different operations according to the configured parameters. For example, when only the maximum number of beams to be averaged is configured, the terminal may perform three operations. Also, when only the beam aggregation threshold value is configured, the terminal may perform two operations. Also, when both the maximum number of beams to be averaged and the beam aggregation threshold value are configured, the terminal may perform four operations. Also, when none of them is configured, the terminal may perform one operation.

As for the parameters for deriving the BWP quality measurement value, common values may be configured to be commonly used in all BWPs in the cell, or different values may be configured for the respective BWPs.

Thereafter, the terminal may perform BWP selection regardless of cells. In this case, the base station may configure, to the terminal, a beam measurement threshold value such as Threshold_BWP with a downlink signal (e.g., an RRC signal such as reportConfig in an RRC Reconfiguration signal, a MAC signal such as MAC-CE, or a PHY signal such as a DCI signal), and the terminal may select BWPs having a measurement value exceeding Threshold_BWP according to the configured parameter.

Threshold_BWP may be configured as different values according to SSBs or CSI-RSs, and one or more threshold values may be configured for such different types of beams.

Thereafter, the terminal may perform a measurement report by using the filtered and selected beams. For this purpose, the base station may configure, to the terminal, a BWP count such as numberOfTriggeringBWPs with a downlink signal (e.g., an RRC signal such as reportConfig in an RRC Reconfiguration signal, a MAC signal such as MAC-CE, or a PHY signal such as a DCI signal).

Thereafter, the terminal may trigger the measurement report through the following procedure according to the configured parameter:

According to an embodiment, the terminal may be configured with a parameter for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBWPs, and an entry condition is applicable to the event, for example, in the case where there is/are one or more BWPs in which the number of beams having a measurement value, which is measured in each cell regardless of cells, exceeding Threshold_Beam is greater than or equal to numberOfTriggeringBeams;

when the measurement report related to the measId is not included in VarMeasReportList, a measurement report may be generated and included in the VarMeasReportList associated with the measId.

When the number of cells currently included in the BWPsTriggeredList is greater than or equal to numberOfTriggeringBWPs, transmission of the measurement report may be triggered.

NumberOfTriggeringBWPs may be configured as different values according to SSBs or CSI-RSs, and one or more numberOfTriggeringBWPs values may be configured for such different types of beams.

In the measurement report, the terminal may report the network of information about as many BWPs as the number of numberOfTriggeringBWPs including, for example, a BWP ID, a corresponding cell ID, and a BWP measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

Figure 21:
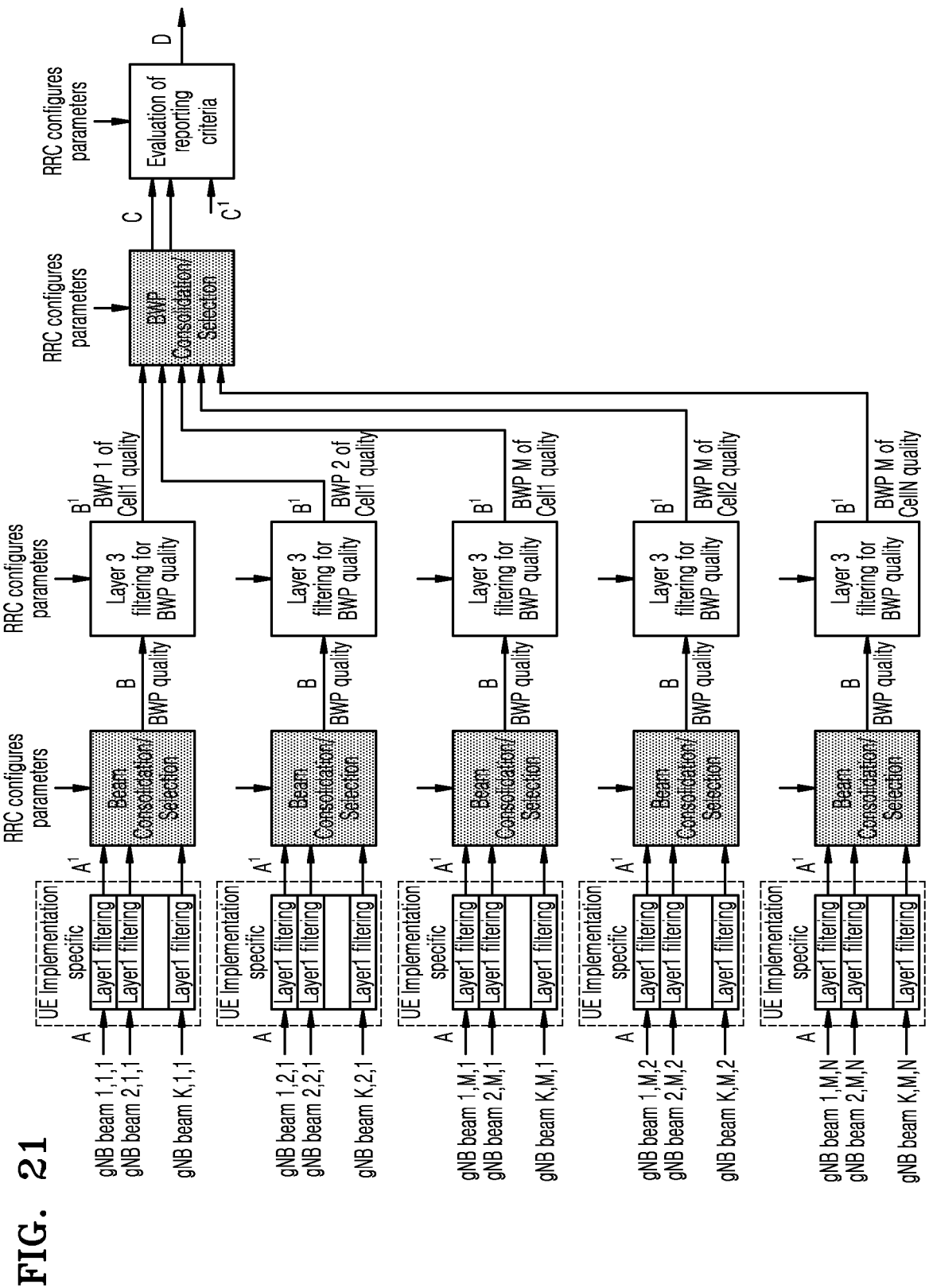
FIG. 21 is a diagram illustrating a model in which a terminal measures and reports the quality of adjacent BWPs, according to some embodiments of the disclosure.

FIG. 21 is a diagram illustrating a model in which a terminal measures and reports the quality of adjacent BWPs.

The terminal may measure all beams observed from BWPs included in adjacent cells by measuring each base station reference signal that is periodically received. For example, beam values may be measured for up to K beams for each BWP among up to M BWPs for each cell with respect to up to N cells. The terminal may perform measurement on a synchronization or reference signal such as SSB or CSI-RS having the same ID indicating a distinguishable base station beam.

The maximum beam number K, the maximum BWP number M, and the maximum cell number N to be measured by the terminal may be configured from the base station through an RRC signal such as an RRC Reconfiguration signal, or may be configured and received by using a MAC signal such as MAC-CE or a PHY signal such as DCI.

The terminal may perform Layer 1 filtering on each measured base station beam.

Thereafter, in order to derive a single measurement value for determining the quality of each BWP, the terminal may derive one BWP quality measurement value through a beam selection and merging process with respect to a plurality of beams included in each BWP. In the beam selection and merging process, the terminal may derive a single BWP quality measurement value by comparing and selecting the beams through the following method:
1. A method of selecting a beam measurement value having the best measurement value.
2. A method of selecting a beam measurement value having the best measurement value among the beam measurement values having a value greater than or equal to a particular threshold value configured by the base station with a downlink signal (e.g., an RRC signal, a MAC signal, or a PHY signal). In this case, when there is no beam measurement value having a measurement value greater than or equal to the threshold value, the terminal may determine that the corresponding BWP is not suitable for use.
3. A method of selecting and averaging N sequential beam measurement values having good measurement values from the beam having the best measurement value.
4. A method of selecting beam measurement values having a value greater than or equal to a particular threshold value configured by the base station with a downlink signal (e.g., an RRC signal, a MAC signal, or a PHY signal) and selecting and averaging N sequential beam measurement values having good measurement values from the beam having the best measurement value among the selected beam measurement values. In this case, when there are less than N beams greater than or equal to the threshold value, only these beams may be selected and averaged. In this case, when there is no beam greater than or equal to the threshold value, the terminal may determine that the corresponding BWP is not suitable for use.

In order to derive a BWP quality measurement value, when all or some of necessary parameters such as the maximum number of beams to be averaged, the beam aggregation threshold value, and the reference signal type are not configured, the terminal may not perform such derivation and may simply derive a BWP value with a beam value having the best quality. Otherwise, when all or some of the necessary parameters are configured, the terminal may perform a given operation among the above operations. In this case, the terminal may perform different operations according to the configured parameters. For example, when only the maximum number of beams to be averaged is configured, the terminal may perform three operations. Also, when only the beam aggregation threshold value is configured, the terminal may perform two operations. Also, when both the maximum number of beams to be averaged and the beam aggregation threshold value are configured, the terminal may perform four operations. Also, when none of them is configured, the terminal may perform one operation.

As for the parameters for deriving the BWP quality measurement value, common values may be configured to be commonly used in all BWPs in the cell, or different values may be configured for the respective BWPs.

Thereafter, the terminal may perform L3 filtering on each calculated BWP measurement value. For the L3 filtering, the base station may configure a particular weight factor to the terminal with a downlink signal (e.g., an RRC signal, a MAC signal, or a PHY signal), and the terminal may perform the Layer 3 filtering by using the configured weight factor.

Thereafter, the terminal may perform BWP selection regardless of cells. For BWP selection, the base station may configure, to the terminal, a beam measurement threshold value such as Threshold_BWP with a downlink signal (e.g., an RRC signal such as reportConfig in an RRC Reconfiguration signal, a MAC signal such as MAC-CE, or a PHY signal such as a DCI signal), and the terminal may select BWPs having a measurement value exceeding Threshold_BWP according to the configured parameter.

Threshold_BWP may be configured as different values according to SSBs or CSI-RSs, and one or more threshold values may be configured for such different types of beams.

Thereafter, the terminal may trigger the measurement report through the following procedure according to the configured parameter:

According to an embodiment, the terminal may be configured with a parameter for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBWPs, and an entry condition is applicable to the event, for example, in the case where there is/are one or more BWPs in which the number of beams having a measurement value, which is measured in each cell regardless of cells, exceeding Threshold_Beam is greater than or equal to numberOfTriggeringBeams;

when the measurement report related to the measId is not included in VarMeasReportList, a measurement report may be generated and included in the VarMeasReportList associated with the measId.

When the number of cells currently included in the BWPsTriggeredList is greater than or equal to numberOfTriggeringBWPs, transmission of the measurement report may be triggered.

NumberOfTriggeringBWPs may be configured as different values according to SSBs or CSI-RSs, and one or more numberOfTriggeringBWPs values may be configured for such different types of beams.

In the measurement report, the terminal may report the network of information about as many BWPs as the number of numberOfTriggeringBWPs including, for example, a BWP ID, a corresponding cell ID, and a BWP measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

Figure 22:
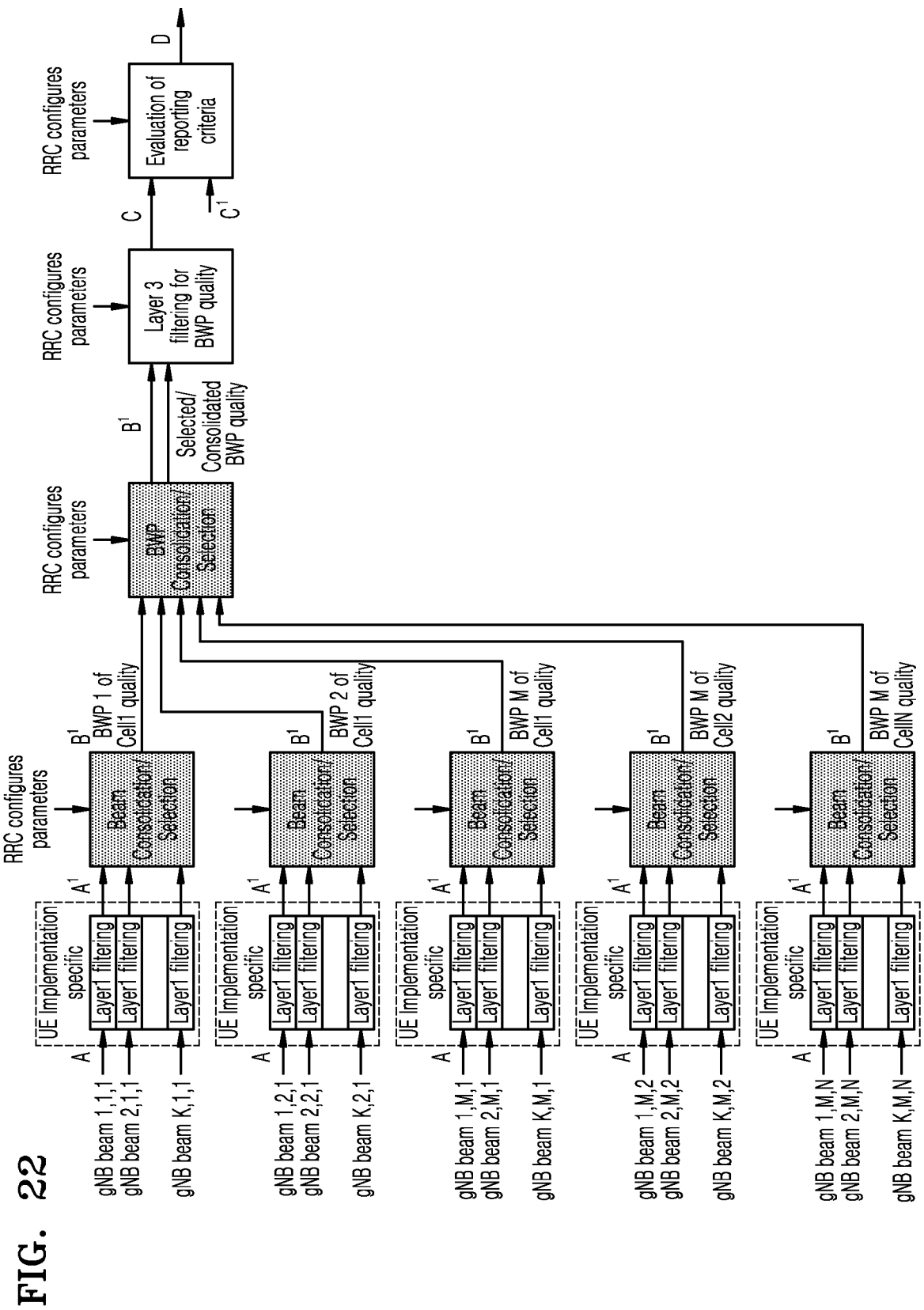
FIG. 22 is a diagram illustrating a model in which a terminal measures and reports the quality of adjacent BWPs, according to some embodiments of the disclosure.

FIG. 22 is a diagram illustrating a model in which a terminal measures and reports the quality of adjacent BWPs.

The terminal may measure all beams observed from BWPs included in adjacent cells by measuring each base station reference signal that is periodically received. For example, beam values may be measured for up to K beams for each BWP among up to M BWPs for each cell with respect to up to N cells. The terminal may perform measurement on a synchronization or reference signal such as SSB or CSI-RS having the same ID indicating a distinguishable base station beam.

The maximum beam number K, the maximum BWP number M, and the maximum cell number N to be measured by the terminal may be configured from the base station through an RRC signal such as an RRC Reconfiguration signal, or may be configured and received by using a MAC signal such as MAC-CE or a PHY signal such as DCI.

The terminal may perform Layer 1 filtering on each measured base station beam.

Thereafter, in order to derive a single measurement value for determining the quality of each BWP, the terminal may derive one BWP quality measurement value through a beam selection and merging process with respect to a plurality of beams included in each BWP. In the beam selection and merging process, the terminal may derive a single BWP quality measurement value by comparing and selecting the beams through the following method:

1. A method of selecting a beam measurement value having the best measurement value.
2. A method of selecting a beam measurement value having the best measurement value among the beam measurement values having a value greater than or equal to a particular threshold value configured by the base station with a downlink signal (e.g., an RRC signal, a MAC signal, or a PHY signal). In this case, when there is no beam measurement value having a measurement value greater than or equal to the threshold value, the terminal may determine that the corresponding BWP is not suitable for use.
3. A method of selecting and averaging N sequential beam measurement values having good measurement values from the beam having the best measurement value.
4. A method of selecting beam measurement values having a value greater than or equal to a particular threshold value configured by the base station with a downlink signal (e.g., an RRC signal, a MAC signal, or a PHY signal) and selecting and averaging N sequential beam measurement values having good measurement values from the beam having the best measurement value among the selected beam measurement values. In this case, when there are less than N beams greater than or equal to the threshold value, only these beams may be selected and averaged. In this case, when there is no beam greater than or equal to the threshold value, the terminal may determine that the corresponding BWP is not suitable for use.

In order to derive a BWP quality measurement value, when all or some of necessary parameters such as the maximum number of beams to be averaged, the beam aggregation threshold value, and the reference signal type are not configured, the terminal may not perform such derivation and may simply derive a BWP value with a beam value having the best quality. Otherwise, when all or some of the necessary parameters are configured, the terminal may perform a given operation among the above operations. In this case, the terminal may perform different operations according to the configured parameters. For example, when only the maximum number of beams to be averaged is configured, the terminal may perform three operations. Also, when only the beam aggregation threshold value is configured, the terminal may perform two operations. Also, when both the maximum number of beams to be averaged and the beam aggregation threshold value are configured, the terminal may perform four operations. Also, when none of them is configured, the terminal may perform one operation.

As for the parameters for deriving the BWP quality measurement value, common values may be configured to be commonly used in all BWPs in the cell, or different values may be configured for the respective BWPs.

Thereafter, the terminal may perform BWP selection regardless of cells. For BWP selection, the base station may configure, to the terminal, a beam measurement threshold value such as Threshold_BWP with a downlink signal (e.g., an RRC signal such as reportConfig in an RRC Reconfiguration signal, a MAC signal such as MAC-CE, or a PHY signal such as a DCI signal), and the terminal may select BWPs having a measurement value exceeding Threshold_BWP according to the configured parameter.

Threshold_BWP may be configured as different values according to SSBs or CSI-RSs, and one or more threshold values may be configured for such different types of beams.

Thereafter, the terminal may perform L3 filtering on each selected BWP measurement value. For the L3 filtering, the base station may configure a particular weight factor to the terminal with a downlink signal (e.g., an RRC signal, a MAC signal, or a PHY signal), and the terminal may perform the Layer 3 filtering by using the configured weight factor.

Thereafter, the terminal may perform a measurement report by using the filtered and selected beams. In this case, the base station may configure, to the terminal, a BWP count such as numberOfTriggeringBWPs with a downlink signal (e.g., an RRC signal such as reportConfig in an RRC Reconfiguration signal, a MAC signal such as MAC-CE, or a PHY signal such as a DCI signal), and the terminal may trigger transmission of the measurement report according to the configured parameter when the number of BWPs having a measurement value, which is measured regardless of the cell to which it belongs, exceeding Threshold_BWP is greater than or equal to numberOfTriggeringBWPs.

NumberOfTriggeringBWPs may be configured as different values according to SSBs or CSI-RSs, and one or more numberOfTriggeringBWPs values may be configured for different types of beams.

In the measurement report, the terminal may report the network of information about as many BWPs as the number of numberOfTriggeringBWPs including, for example, a BWP ID, a corresponding cell ID, and a BWP measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

Also, according to other embodiments, the terminal may trigger the measurement report through the following procedure according to the configured parameter:

According to an embodiment, the terminal may be configured with a parameter for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBeams and numberOfTriggeringBWPs, and an entry condition is applicable to the event, for example, in the case where there is/are one or more BWPs in which the number of BWPs having a measurement value, which is measured in each BWP, exceeding Threshold_Beam is greater than or equal to numberOfTriggeringBeams;

when the measurement report related to the measId is not included in VarMeasReportList, a measurement report may be generated and included in the VarMeasReportList associated with the measId.

When the number of cells currently included in the BWPsTriggeredList is greater than or equal to numberOfTriggeringBWPs, transmission of the measurement report may be triggered.

NumberOfTriggeringBeams and numberOfTriggeringBWPs may be configured as different values according to SSBs or CSI-RSs, and one or more numberOfTriggering- Beams and numberOfTriggeringBWPs values may be configured for such different types of beams.

In the measurement report, the terminal may report the network of information about as many beams as the number of numberOfTriggeringBeams including, for example, a beam ID, a corresponding BWP ID, a corresponding cell ID, and a beam measurement value. Also, the terminal may report the network of information about as many BWPs as numberOfTriggeringBWPs including, for example, a BWP ID and a corresponding cell ID of the BWP, and a BWP measurement value.

The terminal may be configured with an indicator indicating that the beam or BWP measurement value is to be included in the report, through a downlink signal of the base station (e.g., an RRC signal such as reportConfig in an RRC Reconfiguration signal, a MAC signal such as MAC-CE, or a PHY signal such as a DCI signal).

Figure 23:
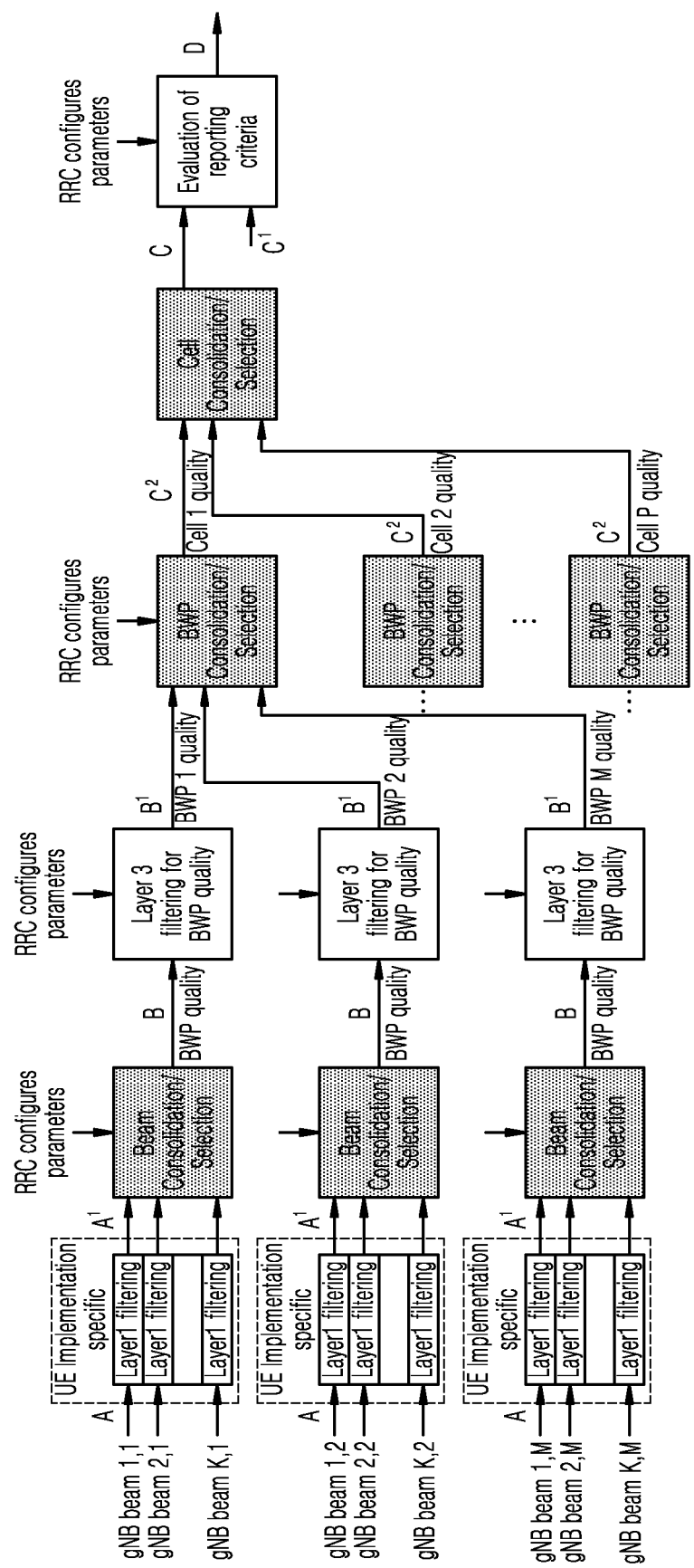
FIG. 23 is a diagram illustrating a measurement model in which a terminal derives and reports the quality of a cell, according to some embodiments of the disclosure.

FIG. 23 is a diagram illustrating a measurement model in which a terminal derives and reports the quality of a cell.

The network may configure, to the terminal, parameters for deriving a measurement result such as Reference Signal Received Power (RSRP), Reference Signal Received Quality (RSRQ), Signal-to-Noise Ratio (SINR), or Channel Quality Indicator (CQI) per cell representing each cell, for example, the maximum number of beams to be averaged, the beam aggregation threshold value, and the reference signal type. Also, the network may configure, to the terminal, parameters for deriving a measurement result such as RSRP, RSRQ, SINR, and CQI per BWP representing each BWP in the cell, for example, the maximum number of beams to be averaged, the beam aggregation threshold value, and the reference signal type.

Referring to FIG. 23, the terminal capable of measuring a serving cell and/or adjacent cells by using one or more BWPs may receive reference signals, for example, a synchronization signal block (SSB) or a CSI-RS, which are transmitted by a particular base station (gNB) by using a plurality of bandwidth parts (BWPs), and distinguish transmission beams belonging to different BWPs of different base stations with reference to a synchronization signal block index (SSB ID) or a CSI-RS ID. Thus, the terminal having received a periodic synchronization signal transmitted by the base station may continuously measure synchronization signals having the same SSB ID or CSI-RS ID to measure the quality of the base station beam indicated by the synchronization signal and may distinguish the BWP ID to which the beams belong. Also, the terminal may measure the quality of the cell and the BWP to which the synchronization signals belong, from the measured qualities of the beams.

A method of distinguishing the BWP ID may be as follows:
1. The base station may transmit a reference signal including an explicit BWP ID.
    A. The BWP ID may be included in a formula for generating a reference signal ID.
    B. The BWP ID may be included in a signal transmitted simultaneously or consecutively with a reference signal.
2. The base station may pre-configure, to the terminal, BWPs corresponding to reference signals by using an RRC signal, a MAC signal, or the like.
3. The base station and the terminal may pre-define the correlation between the BWP ID and the reference signal ID according to a determined implicit rule.

The terminal may perform Layer 1 filtering on a synchronization signal such as SSB or CSI-RS having the same ID indicating each of the periodically received base station beams, for example, a base station beam distinguishable by the terminal.

Thereafter, in order to derive a single measurement value for determining the quality of each BWP, the terminal may derive one BWP quality measurement value through a beam selection and merging process with respect to a plurality of beams included in each BWP. In the beam selection and merging process, the terminal may derive a single BWP quality measurement value by comparing and selecting the beams through the following method:
1. A method of selecting a beam measurement value having the best measurement value.
2. A method of selecting a beam measurement value having the best measurement value among the beam measurement values having a value greater than or equal to a particular threshold value configured by the base station with a downlink signal (e.g., an RRC signal, a MAC signal, or a PHY signal). In this case, when there is no beam measurement value having a measurement value greater than or equal to the threshold value, the terminal may determine that the corresponding BWP is not suitable for use.
3. A method of selecting and averaging N sequential beam measurement values having good measurement values from the beam having the best measurement value.
4. A method of selecting beam measurement values having a value greater than or equal to a particular threshold value configured by the base station with a downlink signal (e.g., an RRC signal, a MAC signal, or a PHY signal) and selecting and averaging N sequential beam measurement values having good measurement values from the beam having the best measurement value among the selected beam measurement values. In this case, when there are less than N beams greater than or equal to the threshold value, only these beams may be selected and averaged. In this case, when there is no beam greater than or equal to the threshold value, the terminal may determine that the corresponding BWP is not suitable for use.

In order to derive a BWP quality measurement value, when all or some of necessary parameters such as the maximum number of beams to be averaged, the beam aggregation threshold value, and the reference signal type are not configured, the terminal may not perform such derivation and may simply derive a BWP value with a beam value having the best quality. Otherwise, when all or some of the necessary parameters are configured, the terminal may perform a given operation among the above operations. In this case, the terminal may perform different operations according to the configured parameters. For example, when only the maximum number of beams to be averaged is configured, the terminal may perform three operations. Also, when only the beam aggregation threshold value is configured, the terminal may perform two operations. Also, when both the maximum number of beams to be averaged and the beam aggregation threshold value are configured, the terminal may perform four operations. Also, when none of them is configured, the terminal may perform one operation.

As for the parameters for deriving the BWP quality measurement value, common values may be configured to be commonly used in all BWPs in the cell, or different values may be configured for the respective BWPs.

Thereafter, the terminal may perform L3 filtering on a single BWP measurement value. For the L3 filtering, the base station may configure a particular weight factor to the terminal with a downlink signal (e.g., an RRC signal, a MAC signal, or a PHY signal), and the terminal may perform the Layer 3 filtering by using the configured weight factor.

Thereafter, in order to derive a single measurement value for determining the cell quality, the terminal may derive one cell quality measurement value through a BWP selection and merging process with respect to a plurality of BWPs. In the BWP selection and merging process, the terminal may derive a single cell quality measurement value by comparing and selecting the BWPs through the following method:

1. A method of selecting a BWP measurement value having the best measurement value.
2. A method of selecting a BWP measurement value having the best measurement value among the BWP measurement values having a value greater than or equal to a particular threshold value configured by the base station with a downlink signal (e.g., an RRC signal, a MAC signal, or a PHY signal). In this case, when there is no BWP measurement value having a measurement value greater than or equal to the threshold value, the terminal may determine that the corresponding cell is not suitable for access.
3. A method of selecting and averaging N sequential BWP measurement values having good measurement values from the BWP having the best measurement value.
4. A method of selecting BWP measurement values having a value greater than or equal to a particular threshold value configured by the base station with a downlink signal (e.g., an RRC signal, a MAC signal, or a PHY signal) and selecting and averaging N' sequential BWP measurement values having good measurement values from the BWP having the best measurement value among the selected BWP measurement values. In this case, when there are less than N' BWPs greater than or equal to the threshold value, only these BWPs may be selected and averaged. In this case, when there is no BWP greater than or equal to the threshold value, the terminal may determine that the corresponding cell is not suitable for access.

In order to derive a cell quality measurement value, when all or some of necessary parameters such as the maximum number of BWPs to be averaged, the BWP aggregation threshold value, and the reference signal type are not configured, the terminal may not perform such derivation and may simply derive a cell value with a BWP value having the best quality. Otherwise, when all or some of the necessary parameters are configured, the terminal may perform a given operation among the above operations. In this case, the terminal may perform different operations according to the configured parameters. For example, when only the maximum number of BWPs to be averaged is configured, the terminal may perform three operations. Also, when only the BWP aggregation threshold value is configured, the terminal may perform two operations. Also, when both the maximum number of BWPs to be averaged and the BWP aggregation threshold value are configured, the terminal may perform four operations. Also, when none of them is configured, the terminal may perform one operation.

Thereafter, the terminal may trigger the measurement report through the following procedure according to the configured parameter:

According to an embodiment, the terminal may be configured with a parameter for measurement. For example, in the case where a measurement report trigger type is configured as an event for the measurement configuration in a parameter VarMeasConfig including an accumulated configuration of measurements performed by the terminal, for example, the measurement configuration represented by measId in MeasIdList, reportConfig associated with the measId is configured including numberOfTriggeringBWPs and numberOfTriggeringCells, and an entry condition is applicable to the event, for example, in the case where there is/are one or more cells in which the number of BWPs having a measurement value, which is measured in each cell, exceeding Threshold_BWP is greater than or equal to numberOfTriggeringBWPs;

when the measurement report related to the measId is not included in VarMeasReportList, a measurement report may be generated and included in the VarMeasReportList associated with the measId.

When the number of cells currently included in the cellsTriggeredList is greater than or equal to numberOfTriggeringCells, transmission of the measurement report may be triggered.

NumberOfTriggeringBWPs and numberOfTriggeringCells may be configured as different values according to SSBs or CSI-RSs, and one or more numberOfTriggeringBWPs and numberOfTriggeringCells values may be configured for such different types of beams.

In the measurement report, the terminal may report the network of information about as many BWPs as numberOfTriggeringBWPs including, for example, a BWP ID and a corresponding cell ID of the BWP, and a BWP measurement value. Also, the terminal may report the network of information about as many cells as the number of numberOfTriggeringCells including, for example, a corresponding cell ID and a cell measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

Also, according to other embodiments, the terminal may trigger the measurement report through the following procedure according to the configured parameter:

According to an embodiment, the terminal may be configured with a parameter for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBeams, numberOfTriggeringBWPs, and numberOfTriggeringCells, and an entry condition is applicable to the event, for example, in the case where there is/are one or more BWPs in which the number of BWPs having a measurement value, which is measured in each BWP, exceeding Threshold_Beam is greater than or equal to numberOfTriggeringBeams; and there is/are one or more cells in which the number of BWPs having a measurement value, which is measured in each cell, exceeding Threshold_BWP is greater than or equal to numberOfTriggeringBWPs;

when the measurement report related to the measId is not included in VarMeasReportList, a measurement report may be generated and included in the VarMeasReportList associated with the measId.

When the number of cells currently included in the cellsTriggeredList is greater than or equal to numberOfTriggeringCells, transmission of the measurement report may be triggered.

NumberOfTriggeringBeams, NumberOfTriggeringBWPs, and numberOfTriggeringCells may be configured as different values according to SSBs or CSI-RSs, and one or more NumberOfTriggeringBeams, numberOfTriggeringBWPs, and numberOfTriggeringCells values may be configured for such different types of beams.

In the measurement report, the terminal may report the network of information about as many beams as the number of numberOfTriggeringBeams including, for example, a beam ID, a corresponding BWP ID, a corresponding cell ID, and a beam measurement value. Also, the terminal may report the network of information about as many BWPs as numberOfTriggeringBWPs including, for example, a BWP ID and a corresponding cell ID of the BWP, and a BWP measurement value. Also, the terminal may report the network of information about as many cells as the number of numberOfTriggeringCells including, for example, a corresponding cell ID and a cell measurement value.

The terminal may be configured with an indicator indicating that the beam, BWP, or cell measurement value is to be included in the report, through a downlink signal of the base station (e.g., an RRC signal such as reportConfig in an RRC Reconfiguration signal, a MAC signal such as MAC-CE, or a PHY signal such as a DCI signal).

Figure 24:
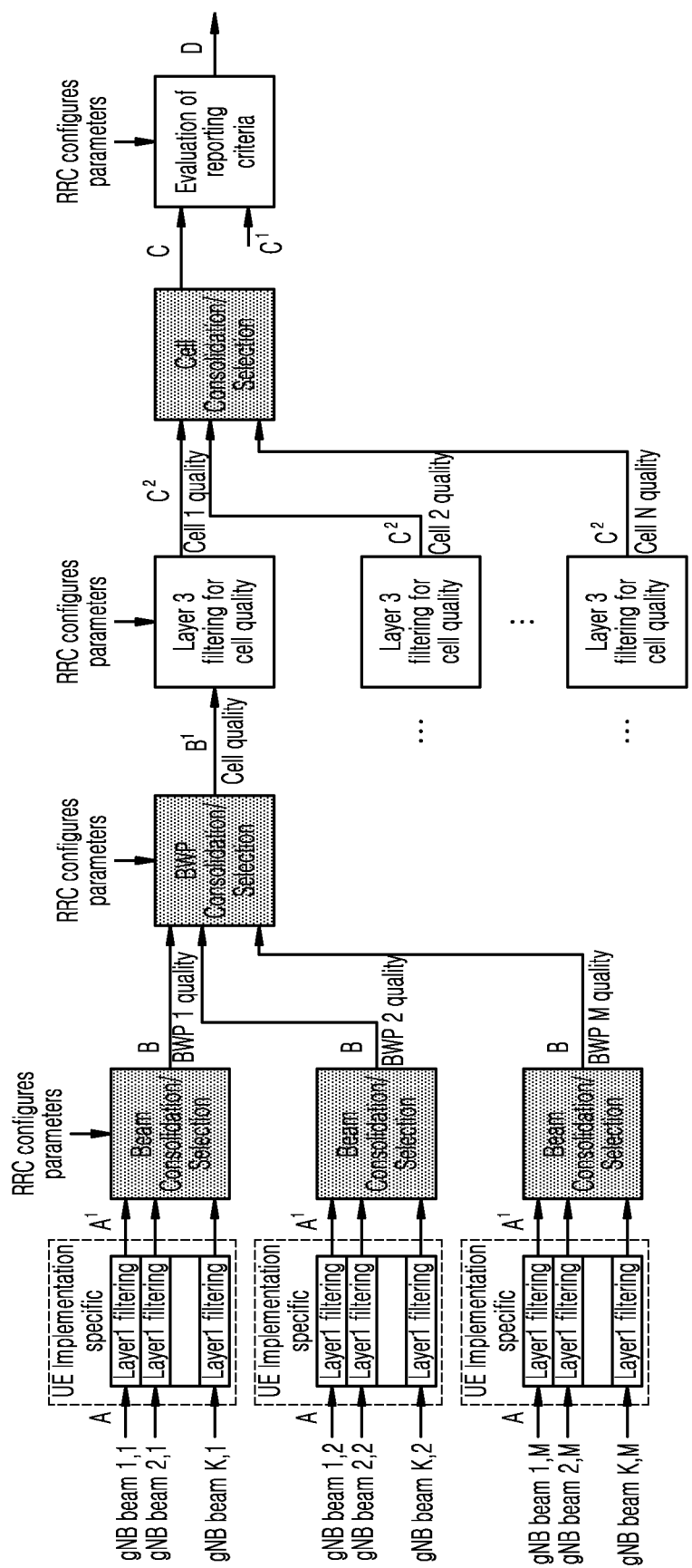
FIG. 24 is a diagram illustrating a measurement model in which a terminal derives and reports the quality of a cell, according to some embodiments of the disclosure.

FIG. 24 is a diagram illustrating a measurement model in which a terminal derives and reports the quality of a cell.

Also, the network may configure, to the terminal, parameters for deriving a measurement result such as RSRP, RSRQ, SINR, and CQI per cell representing each cell, for example, the maximum number of beams to be averaged, the beam aggregation threshold value, and the reference signal type. Also, the network may configure, to the terminal, parameters for deriving a measurement result such as RSRP, RSRQ, SINR, and CQI per BWP representing each BWP in the cell, for example, the maximum number of beams to be averaged, the beam aggregation threshold value, and the reference signal type.

Referring to FIG. 24, the terminal capable of measuring a serving cell and/or adjacent cells by using one or more BWPs may receive reference signals, for example, a synchronization signal block (SSB) or a CSI-RS, which are transmitted by a particular base station (gNB) by using a plurality of bandwidth parts (BWPs), and distinguish transmission beams belonging to different BWPs of different base stations with reference to a synchronization signal block index (SSB ID) or a CSI-RS ID. Thus, the terminal having received a periodic synchronization signal transmitted by the base station may continuously measure synchronization signals having the same SSB ID or CSI-RS ID to measure the quality of the base station beam indicated by the synchronization signal and may distinguish the BWP ID to which the beams belong. Also, the terminal may measure the quality of the cell and the BWP to which the synchronization signals belong, from the measured qualities of the beams.

A method of distinguishing the BWP ID may be as follows:
1. The base station may transmit a reference signal including an explicit BWP ID.
   A. The BWP ID may be included in a formula for generating a reference signal ID.
   B. The BWP ID may be included in a signal transmitted simultaneously or consecutively with a reference signal.
2. The base station may pre-configure, to the terminal, BWPs corresponding to reference signals by using an RRC signal, a MAC signal, or the like.
3. The base station and the terminal may pre-define the correlation between the BWP ID and the reference signal ID according to a determined implicit rule.

The terminal may perform Layer 1 filtering on a synchronization signal such as SSB or CSI-RS having the same ID indicating each of the periodically received base station beams, for example, a base station beam distinguishable by the terminal.

Thereafter, in order to derive a single measurement value for determining the quality of each BWP, the terminal may derive one BWP quality measurement value through a beam selection and merging process with respect to a plurality of beams included in each BWP. In the beam selection and merging process, the terminal may derive a single BWP quality measurement value by comparing and selecting the beams through the following method:
1. A method of selecting a beam measurement value having the best measurement value.
2. A method of selecting a beam measurement value having the best measurement value among the beam measurement values having a value greater than or equal to a particular threshold value configured by the base station with a downlink signal (e.g., an RRC signal, a MAC signal, or a PHY signal). In this case, when there is no beam measurement value having a measurement value greater than or equal to the threshold value, the terminal may determine that the corresponding BWP is not suitable for use.
3. A method of selecting and averaging N sequential beam measurement values having good measurement values from the beam having the best measurement value.
4. A method of selecting beam measurement values having a value greater than or equal to a particular threshold value configured by the base station with a downlink signal (e.g., an RRC signal, a MAC signal, or a PHY signal) and selecting and averaging N sequential beam measurement values having good measurement values from the beam having the best measurement value among the selected beam measurement values. In this case, when there are less than N beams greater than or equal to the threshold value, only these beams may be selected and averaged. In this case, when there is no beam greater than or equal to the threshold value, the terminal may determine that the corresponding BWP is not suitable for use.

In order to derive a BWP quality measurement value, when all or some of necessary parameters such as the maximum number of beams to be averaged, the beam aggregation threshold value, and the reference signal type are not configured, the terminal may not perform such derivation and may simply derive a BWP value with a beam value having the best quality. Otherwise, when all or some of the necessary parameters are configured, the terminal may perform a given operation among the above operations. In this case, the terminal may perform different operations according to the configured parameters. For example, when only the maximum number of beams to be averaged is configured, the terminal may perform three operations. Also, when only the beam aggregation threshold value is configured, the terminal may perform two operations. Also, when both the maximum number of beams to be averaged and the beam aggregation threshold value are configured, the terminal may perform four operations. Also, when none of them is configured, the terminal may perform one operation.

Thereafter, in order to derive a single measurement value for determining the cell quality, the terminal may derive one cell quality measurement value through a BWP selection and merging process with respect to a plurality of BWPs. In the BWP selection and merging process, the terminal may derive a single cell quality measurement value by comparing and selecting the BWPs through the following method:

1. A method of selecting a BWP measurement value having the best measurement value.
2. A method of selecting a BWP measurement value having the best measurement value among the BWP measurement values having a value greater than or equal to a particular threshold value configured by the base station with a downlink signal (e.g., an RRC signal, a MAC signal, or a PHY signal). In this case, when there is no BWP measurement value having a measurement value greater than or equal to the threshold value, the terminal may determine that the corresponding cell is not suitable for access.
3. A method of selecting and averaging N sequential BWP measurement values having good measurement values from the BWP having the best measurement value.
4. A method of selecting BWP measurement values having a value greater than or equal to a particular threshold value configured by the base station with a downlink signal (e.g., an RRC signal, a MAC signal, or a PHY signal) and selecting and averaging N' sequential BWP measurement values having good measurement values from the BWP having the best measurement value among the selected BWP measurement values. In this case, when there are less than N' BWPs greater than or equal to the threshold value, only these BWPs may be selected and averaged. In this case, when there is no BWP greater than or equal to the threshold value, the terminal may determine that the corresponding cell is not suitable for access.

In order to derive a cell quality measurement value, when all or some of necessary parameters such as the maximum number of BWPs to be averaged, the BWP aggregation threshold value, and the reference signal type are not configured, the terminal may not perform such derivation and may simply derive a cell value with a BWP value having the best quality. Otherwise, when all or some of the necessary parameters are configured, the terminal may perform a given operation among the above operations. In this case, the terminal may perform different operations according to the configured parameters. For example, when only the maximum number of BWPs to be averaged is configured, the terminal may perform three operations. Also, when only the BWP aggregation threshold value is configured, the terminal may perform two operations. Also, when both the maximum number of BWPs to be averaged and the BWP aggregation threshold value are configured, the terminal may perform four operations. Also, when none of them is configured, the terminal may perform one operation.

Thereafter, the terminal may perform L3 filtering on a single cell measurement value. For the L3 filtering, the base station may configure a particular weight factor to the terminal with a downlink signal (e.g., an RRC signal, a MAC signal, or a PHY signal), and the terminal may perform the Layer 3 filtering by using the configured weight factor.

Thereafter, the terminal may trigger the measurement report through the following procedure according to the configured parameter:

According to an embodiment, the terminal may be configured with a parameter for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBWPs and numberOfTriggeringCells, and an entry condition is applicable to the event, for example, in the case where there is/are one or more cells in which the number of BWPs having a measurement value, which is measured in each cell, exceeding Threshold_BWP is greater than or equal to numberOfTriggeringBWPs;

when the measurement report related to the measId is not included in VarMeasReportList, a measurement report may be generated and included in the VarMeasReportList associated with the measId.

When the number of cells currently included in the cellsTriggeredList is greater than or equal to numberOfTriggeringCells, transmission of the measurement report may be triggered.

NumberOfTriggeringBWPs and numberOfTriggeringCells may be configured as different values according to SSBs or CSI-RSs, and one or more numberOfTriggeringBWPs and numberOfTriggeringCells values may be configured for such different types of beams.

In the measurement report, the terminal may report the network of information about as many BWPs as numberOfTriggeringBWPs including, for example, a BWP ID and a corresponding cell ID of the BWP, and a BWP measurement value. Also, the terminal may report the network of information about as many cells as the number of numberOfTriggeringCells including, for example, a corresponding cell ID and a cell measurement value, and may be configured with an indicator indicating the same through a downlink signal of the base station (e.g., an RRC signal such as reportConfig in an RRC Reconfiguration signal, a MAC signal such as MAC-CE, or a PHY signal such as a DCI signal).

Also, according to other embodiments, the terminal may trigger the measurement report through the following procedure according to the configured parameter:

According to an embodiment, the terminal may be configured with a parameter for measurement. For example, the terminal may be configured with a parameter VarMeasConfig including an accumulated configuration of measurements performed by the terminal. Particularly, the terminal may use MeasIdList including measId in VarMeasConfig. For example, in the case where a measurement report trigger type is configured as an event for the measurement configuration represented by measId, reportConfig associated with the measId is configured including numberOfTriggeringBeams, numberOfTriggeringBWPs, and numberOfTriggeringCells, and an entry condition is applicable to the event, for example, in the case where there is/are one or more BWPs in which the number of BWPs having a measurement value, which is measured in each BWP, exceeding Threshold_Beam is greater than or equal to numberOfTriggeringBeams; and there is/are one or more cells in which the number of BWPs having a measurement value, which is measured in each cell, exceeding Threshold_BWP is greater than or equal to numberOfTriggeringBWPs;

when the measurement report related to the measId is not included in VarMeasReportList, a measurement report may be generated and included in the VarMeasReportList associated with the measId.

When the number of cells currently included in the cellsTriggeredList is greater than or equal to numberOfTriggeringCells, transmission of the measurement report may be triggered.

NumberOfTriggeringBeams, NumberOfTriggeringBWPs, and numberOfTriggeringCells may be configured as different values according to SSBs or CSI-RSs, and one or more NumberOfTriggeringBeams, numberOfTriggeringBWPs, and numberOfTriggeringCells values may be configured for such different types of beams.

In the measurement report, the terminal may report the network of information about as many beams as the number of numberOfTriggeringBeams including, for example, a beam ID, a corresponding BWP ID, a corresponding cell ID, and a beam measurement value. Also, the terminal may report the network of information about as many BWPs as numberOfTriggeringBWPs including, for example, a BWP ID and a corresponding cell ID of the BWP, and a BWP measurement value.

Also, the terminal may report the network of information about as many cells as the number of numberOfTriggeringCells including, for example, a corresponding cell ID and a cell measurement value.

The terminal may be configured with an indicator indicating that the beam, BWP, or cell measurement value is to be included in the report, through a downlink signal of the base station (e.g., an RRC signal such as reportConfig in an RRC Reconfiguration signal, a MAC signal such as MAC-CE, or a PHY signal such as a DCI signal).

Conditions may be configured such that the parameters configured in the embodiments described in the disclosure may be configured only when the base station has received capability information, for example, Aerial UE capability information, from the terminal.

It should be understood that the embodiments of the disclosure described herein should be considered in a descriptive sense only and not for purposes of limitation. That is, it will be understood by those of ordinary skill in the art that various changes in form and details may be made in the embodiments of the disclosure without departing from the spirit and scope of the disclosure. Also, the embodiments of the disclosure described above may be operated in combination when necessary. For example, portions of the embodiments of the disclosure (e.g., Embodiment 1, Embodiment 2, and Embodiment 3) may be combined with each other to operate the base station and the terminal. Also, although the above examples have been presented based on the NR system, other modified examples based on the technical concept of the embodiments may also be implemented in other systems such as FDD or TDD LTE systems.

Also, although certain embodiments of the disclosure have been described in the specification and the drawings and particular terms have been used therein, these are merely used in general meaning to easily describe the technical concept of the disclosure and to facilitate the understanding of the disclosure and are not intended to limit the scope of the disclosure. Thus, it will be understood by those of ordinary skill in the art that various changes in form and details may be made in the embodiments of the disclosure without departing from the spirit and scope of the disclosure.

The invention claimed is:

1. A method of performing, by a terminal, random access procedure, the method comprising:
   receiving a system information block 1 (SIB1) comprising first information indicating a Msg3 transmission repetition and second information indicating a number of repetitions of a Msg3 transmission;
   selecting a physical random access channel (PRACH) resource based on the first information;
   transmitting a random access preamble based on the selected PRACH resource;
   receiving a random access response (RAR) in response to the transmission of the random access preamble;
   performing the repetitions of the Msg3 transmission, based on the second information; and
   starting a timer for a contention resolution after an end of all the repetitions of the Msg3 transmission.

2. The method of claim 1,
   wherein the SIB1 further comprises third information indicating a first threshold, and
   wherein selecting the PRACH resource comprises:
      selecting a synchronization signal block (SSB) based on the third information; and
      determining a PRACH occasion corresponding to the selected SSB.

3. The method of claim 2, wherein selecting the SSB comprises selecting a first SSB with a signal strength above the first threshold.

4. The method of claim 1, wherein the RAR comprises information indicating an identifier of the random access preamble.

5. The method of claim 1, wherein the RAR comprises information indicating one or more resources for the Msg3.

6. A method of allocating, by a base station, a resource for random access procedure to a terminal, the method comprising:
   transmitting a system information block 1 (SIB1) comprising first information indicating a Msg3 transmission repetition and second information indicating a number of repetitions of a Msg3 transmission;
   receiving a random access preamble based on a physical random access channel (PRACH) resource based on the first information;
   transmitting a random access response (RAR) in response to the reception of the random access preamble; and
   receiving the repetitions of the Msg3 transmission, based on the second information.

7. The method of claim 6, wherein the RAR comprises information indicating an identifier of the random access preamble and information indicating one or more resources for the Msg3.

8. A terminal performing random access procedure, the terminal comprising:
   a transceiver; and
   at least one processor connected to the transceiver,
   wherein the at least one processor is configured to
      receive a system information block 1 (SIB1) comprising first information indicating a Msg3 transmission repetition and second information indicating a number of repetitions of a Msg3 transmission,
      select a physical random access channel (PRACH) resource based on the first information,
      transmit a random access preamble based on the selected PRACH resource,
      receive a random access response (RAR) in response to the transmission of the random access preamble, perform the repetitions of the Msg3 transmission, based on the second information, and start a timer for a contention resolution after an end of all the repetitions of the Msg3 transmission.

9. The terminal of claim 8, wherein the SIB1 further comprises third information indicating a first threshold, and wherein the at least one processor is further configured to;

select a synchronization signal block (SSB) based on the third information; and determine a PRACH occasion corresponding to the selected SSB.

10. The terminal of claim 9, wherein the at least one processor is further configured to select a first SSB with a signal strength above the first threshold.

11. The terminal of claim 8, wherein the RAR comprises information indicating an identifier of the random access preamble.

12. The terminal of claim 8, wherein the RAR comprises information indicating one or more resources for the Msg3.

13. A base station allocating a resource for random access procedure to a terminal, the base station comprising:

a transceiver; and at least one processor connected to the transceiver, wherein the at least one processor is configured to:

transmit a system information block 1 (SIB1) comprising first information indicating a Msg3 transmission repetition and second information indicating a number of repetitions of a Msg3 transmission, receive a random access preamble based on a physical random access channel (PRACH) resource based on the first information, transmit a random access response (RAR) in response to the reception of the random access preamble, and receive the repetitions of the Msg3 transmission, based on the second information.

14. The base station of claim 13, wherein the RAR comprises information indicating an identifier of the random access preamble and information indicating one or more resources for the Msg3.

* * * * *